US012189929B2

(12) United States Patent
Cho

(10) Patent No.: US 12,189,929 B2
(45) Date of Patent: Jan. 7, 2025

(54) GROUP MESSAGE PROCESSING METHOD AND GROUP MESSAGE PROCESSING PROGRAM

(71) Applicant: LY Corporation, Tokyo (JP)

(72) Inventor: Yoonkyung Cho, Tokyo (JP)

(73) Assignee: LY Corporation, Tokyo (JP)

( * ) Notice: Subject to any disclaimer, the term of this patent is extended or adjusted under 35 U.S.C. 154(b) by 0 days.

(21) Appl. No.: 18/062,810

(22) Filed: Dec. 7, 2022

(65) Prior Publication Data

US 2023/0102346 A1    Mar. 30, 2023

Related U.S. Application Data

(63) Continuation of application No. 16/719,292, filed on Dec. 18, 2019, now Pat. No. 11,543,944, and a
(Continued)

(30) Foreign Application Priority Data

Dec. 3, 2018  (JP) .................................. 2018-226442

(51) Int. Cl.
*G06F 3/0484*  (2022.01)
*H04L 12/18*  (2006.01)
(Continued)

(52) U.S. Cl.
CPC ........ *G06F 3/0484* (2013.01); *H04L 12/1822* (2013.01); *H04L 51/08* (2013.01); *H04L 51/10* (2013.01)

(58) Field of Classification Search
CPC .. G06F 3/0484; G06F 3/04842; G06F 3/0482; H04L 12/1822; H04L 12/1813; H04L 51/10; H04L 51/08
(Continued)

(56) References Cited

U.S. PATENT DOCUMENTS

2010/0037148 A1    2/2010  Harper et al.
2010/0267369 A1*  10/2010  Lim .................... H04L 51/04
                                                      455/414.1
(Continued)

FOREIGN PATENT DOCUMENTS

JP    2012-018569 A    1/2012
JP    2014096096 A  *  5/2014
(Continued)

OTHER PUBLICATIONS

Notice of Reason for Refusal for Japenese Patent Application No. 2019-016333 dated Apr. 9, 2019.
(Continued)

*Primary Examiner* — Hwei-Min Lu
(74) *Attorney, Agent, or Firm* — Harness, Dickey & Pierce, P.L.C.

(57) ABSTRACT

An information processing method to be carried out by a terminal of a user who is included in a first group including a first plurality of users and in a second group including a second plurality of users, including displaying a first image including first contents transmitted and received among first terminals of the first plurality of users in the first group on a display region of the terminal, and transmitting, via a communication interface of the terminal, information relating to a first content among the first contents included in the first image displayed on the display region and a second content inputted via the terminal, the second content associated with the first content and included in a second image including second contents transmitted and received between second terminals of the second plurality of users in the second group may be provided.

11 Claims, 30 Drawing Sheets

Related U.S. Application Data continuation of application No. PCT/JP2018/044770, filed on Dec. 5, 2018.

(51) Int. Cl.
*H04L 51/08* (2022.01)
*H04L 51/10* (2022.01)

(58) Field of Classification Search
USPC .......................................................... 715/752
See application file for complete search history.

(56) References Cited

U.S. PATENT DOCUMENTS

| | | | |
|---|---|---|---|
| 2012/0011453 A1 | 1/2012 | Shimono et al. | |
| 2012/0042265 A1* | 2/2012 | Utsuki | G06Q 10/101 715/753 |
| 2012/0185797 A1* | 7/2012 | Thorsen | G06F 16/287 715/792 |
| 2013/0069969 A1* | 3/2013 | Chang | H04L 51/04 345/589 |
| 2013/0091443 A1* | 4/2013 | Park | G06Q 10/107 715/758 |
| 2013/0227439 A1 | 8/2013 | Shin | |
| 2014/0143684 A1 | 5/2014 | Oh et al. | |
| 2014/0349627 A1 | 11/2014 | Choi et al. | |
| 2015/0293886 A1 | 10/2015 | Mohanakrishnan et al. | |
| 2015/0363092 A1* | 12/2015 | Morton | G06F 3/04817 715/752 |
| 2016/0202889 A1* | 7/2016 | Shin | G06F 3/0488 715/758 |
| 2016/0364368 A1* | 12/2016 | Chen | G06Q 10/107 |
| 2017/0171121 A1* | 6/2017 | Zhang | H04L 67/75 |
| 2017/0177169 A1* | 6/2017 | Arisada | G06F 3/04883 |
| 2018/0159812 A1* | 6/2018 | Sarafa | H04L 51/066 |
| 2018/0203586 A1* | 7/2018 | Cohen | H04L 51/04 |
| 2018/0234371 A1 | 8/2018 | Lande et al. | |
| 2018/0255007 A1* | 9/2018 | Ji | H04L 51/04 |
| 2018/0260782 A1* | 9/2018 | Bay | H04L 51/56 |
| 2018/0302357 A1 | 10/2018 | Cohen | |
| 2019/0317709 A1 | 10/2019 | Sugimoto et al. | |

FOREIGN PATENT DOCUMENTS

| | | |
|---|---|---|
| JP | 2014-142880 A | 8/2014 |
| JP | 2014-160467 A | 9/2014 |
| JP | 2015-106337 A | 6/2015 |
| JP | 2015-201100 A | 11/2015 |
| JP | 2017-111817 A | 6/2017 |
| JP | 2017-157100 A | 9/2017 |
| JP | 2017-182296 A | 10/2017 |
| JP | 6307604 B2 | 4/2018 |
| KR | 10-2014-0065075 A | 5/2014 |
| WO | WO-2016001999 A1 | 1/2016 |

OTHER PUBLICATIONS

Notice of Reason for Refusal for Japenese Patent Application No. 2018-226442 dated Jan. 17, 2019.
International Search Report PCT/ISA/210 for International Application No. PCT/JP2018/044770 dated Jan. 29, 2019.
Written Opinion PCT/ISA/237 for International Application No. PCT/JP2018/044770 dated Jan. 29, 2019.
Notice of Reason for Refusal for Japanese Patent Application No. 2019-150150 dated Jun. 16, 2020.
Decision of Refusal for Japanese Patent Application No. 2019-150150 dated Aug. 12, 2020.
Notice of Reasons of Refusal for Japanese Patent Application No. 2019-150150 dated Jan. 5, 2021.
Notice of Refusal for Japanese Patent Application No. 2020-182590 dated Jan. 26, 2021, English translation provided.
Notice of Refusal for Japanese Patent Application No. 2019-150150 dated Apr. 6, 2021. English translation has been provided.

* cited by examiner

FIG.3A

| Talkroom ID | Name | User ID | Contents List |
|---|---|---|---|
| tr01 | User B | User A, User B | List 1 |
| tr02 | User C | User A, User C | List 2 |
| tr03 | User D | User A, User D | List 3 |
| tr04 | Baseball Club | User A, User B, User C, User D | List 4 |
| ⋮ | ⋮ | ⋮ | ⋮ |

FIG.3B

| Content ID | Transmission User ID | Content | Association Information |
|---|---|---|---|
| tr01c01 | User A | How about holding an event? | NULL |
| tr01c02 | User B | Let's ask the Baseball Club | NULL |
| tr01c03 | User A | Okay | NULL |
| ⋮ | ⋮ | ⋮ | ⋮ |

FIG.3C

| Content ID | Transmission User ID | Content | Association Information |
|---|---|---|---|
| tr04c01 | User A | How's your schedule? | tr01c01 |
| tr04c02 | User C | I'm free next Saturday and Sunday | NULL |
| tr04c03 | User D | I prefer the evening | NULL |
| ⋮ | ⋮ | ⋮ | ⋮ |

FIG.17

| Talkroom ID | Name | User ID | Contents List | Type | Theme |
|---|---|---|---|---|---|
| tr01 | User B | User A, User B | List 1 | Private | NULL |
| tr02 | User C | User A, User C | List 2 | Private | NULL |
| ⋮ | ⋮ | ⋮ | ⋮ | ⋮ | ⋮ |
| tr11 | Music | User A, User B User C, ⋯ | List 11 | Public | Music |
| tr12 | Rock | User A, User B User C, ⋯ | List 12 | Public | Rock |
| ⋮ | ⋮ | ⋮ | ⋮ | ⋮ | ⋮ |

FIG.26
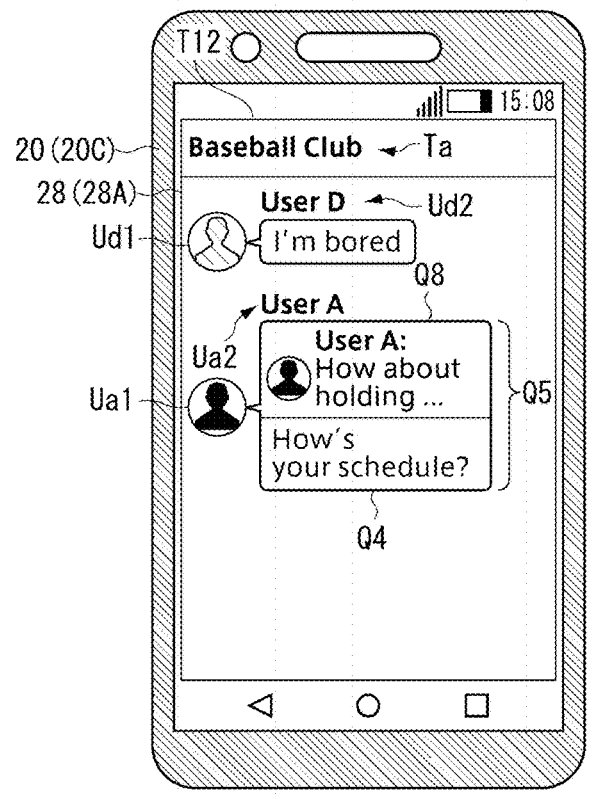
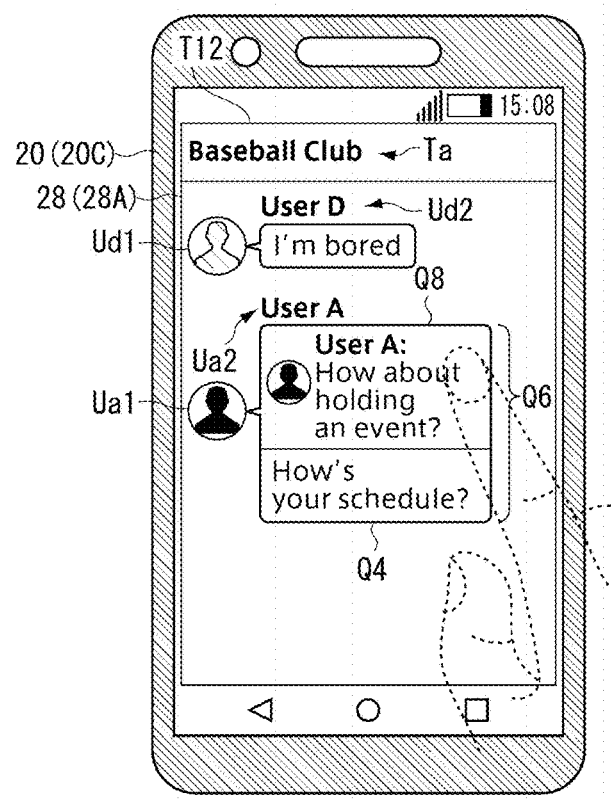

FIG.29
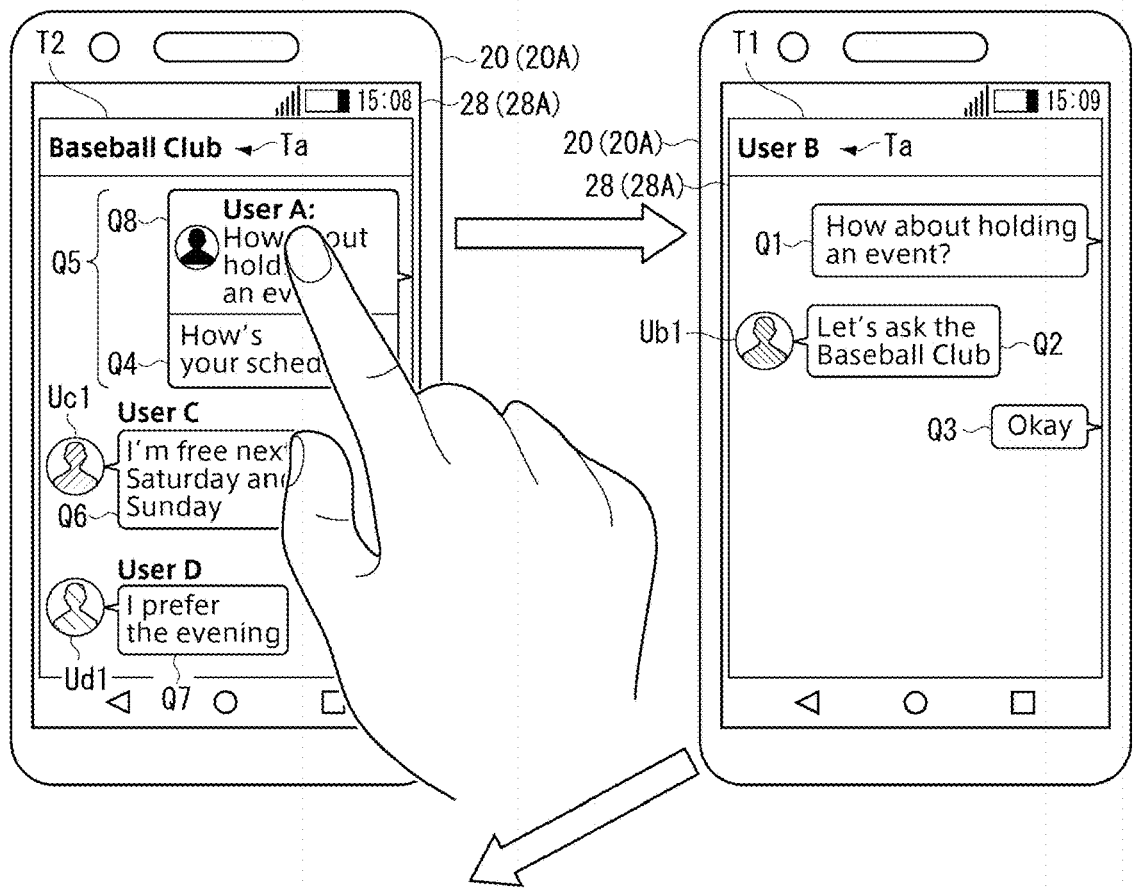
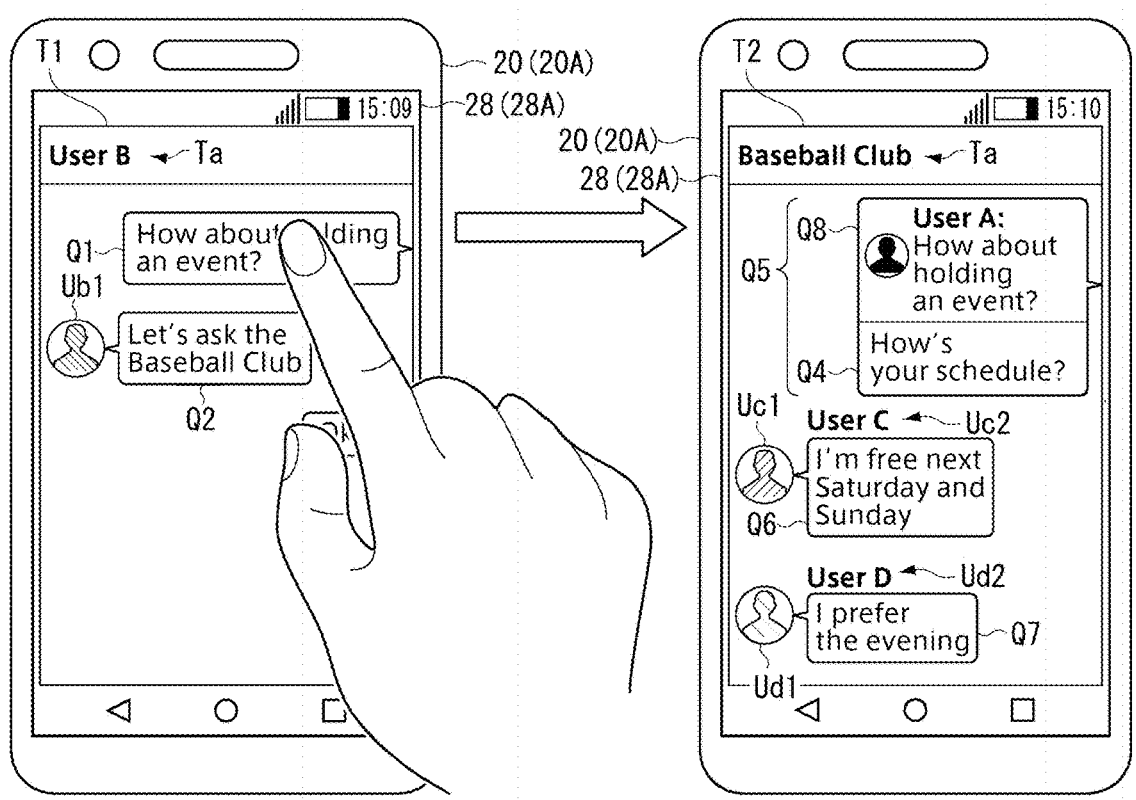

GROUP MESSAGE PROCESSING METHOD AND GROUP MESSAGE PROCESSING PROGRAM

CROSS-REFERENCE TO RELATED APPLICATIONS

This application is a continuation of U.S. application Ser. No. 16/719,292, filed on Dec. 18, 2019, which is a continuation of, and claims the benefit of priority under 35 U.S.C. § 365(c) from PCT International Application No. PCT/JP2018/044770, which has an International filing date of Dec. 5, 2018 and designates the United States of America, which claims priority under 35 U.S.C. § 119 to Japanese Patent Application No. 2018-226442, filed on Dec. 3, 2018 in the Korean Intellectual Property Office (KIPO), the entire disclosure of each of which is incorporated herein by reference.

BACKGROUND

Field

The present disclosure relates to information processing methods and information processing programs.

Description of Related Art

Techniques have been proposed in relation to instant messengers that allow a plurality of users to transmit and receive messages among their terminals. In such techniques, it is desirable, for example, to be able to easily share information among users.

SUMMARY

According to an example embodiment of the present disclosure, an information processing method is provided. The information processing method is to be carried out by a terminal of a user who is included in a first group including a first plurality of users and in a second group including a second plurality of users. The information processing method includes displaying a first image including first contents transmitted and received among first terminals of the first plurality of users in the first group on a display region of the terminal, and transmitting, via a communication interface of the terminal, information relating to a first content among the first contents included in the first image displayed on the display region and a second content inputted via the terminal, the second content associated with the first content and included in a second image including second contents transmitted and received between second terminals of the second plurality of users in the second group.

According to an example embodiment of the present disclosure, an information processing program is provided. The information processing program is to be executed by a terminal of a user who is included in a first group including a first plurality of users and in a second group including a second plurality of users, the information processing program, when executed, causes the terminal to display a first image including first contents transmitted and received among first terminals of the first plurality of users in the first group on a display region of the terminal, and transmit, by a communication interface of the terminal, information relating to a first content among the first contents included in the first image displayed on the display region and a second content inputted via the terminal, the second content associated with the first content and included in a second image including second contents transmitted and received between second terminals of the second plurality of users in the second group.

According to an example embodiment of the present disclosure, an information processing method is provided. The information processing method is to be carried out by a terminal of a user who is included in a second group including a second plurality of users. The information processing method includes displaying a second image including a second content among second contents transmitted and received among second terminals of the second plurality of users in the second group on a display region of the terminal, the second content being associated with a first content in a first image including first contents transmitted and received from first terminals of a first plurality of users included in a first group, and displaying, a third image including the first content associated with the second content on the display region based on an input of the user of the terminal to the second image displayed on the display region.

According to an example embodiment of the present disclosure, an information processing program is provided. The information processing program is to be executed by a terminal of a user who is included in a second group including a second plurality of users, the information processing program, when executed, causes the terminal to display a second image including a second content among second contents transmitted and received among second terminals of the second plurality of users in the second group on a display region of the terminal, the second content being associated with a first content in a first image including first contents transmitted and received among first terminals of a first plurality of users included in a first group, and display a third image including the first content associated with the second content on the display region based on an input of the user of the terminal to the second image displayed on the display region.

BRIEF DESCRIPTION OF THE DRAWINGS

FIGS. 3A, 3B, and 3C are diagrams illustrating Talkroom information and content information.

FIG. 17 is a diagram illustrating Talkroom information.

FIG. 26 is a diagram illustrating processes relating to the displaying of a second image in cases where the displaying of a third image is not permitted.

FIG. 29 is a diagram illustrating an information processing method according to a thirteenth example embodiment.

DETAILED DESCRIPTION

{Compliance with Legal Requirements}

It should be noted that the disclosure provided herein is premised on compliance with legal requirements in terms of secrecy of communication in a country/region in which techniques or methods according to the present disclosure are to be implemented.

Some example embodiments of information processing methods and information processing programs according to the present disclosure will be described with reference to the drawings.

{System Configuration}

Figure 1:
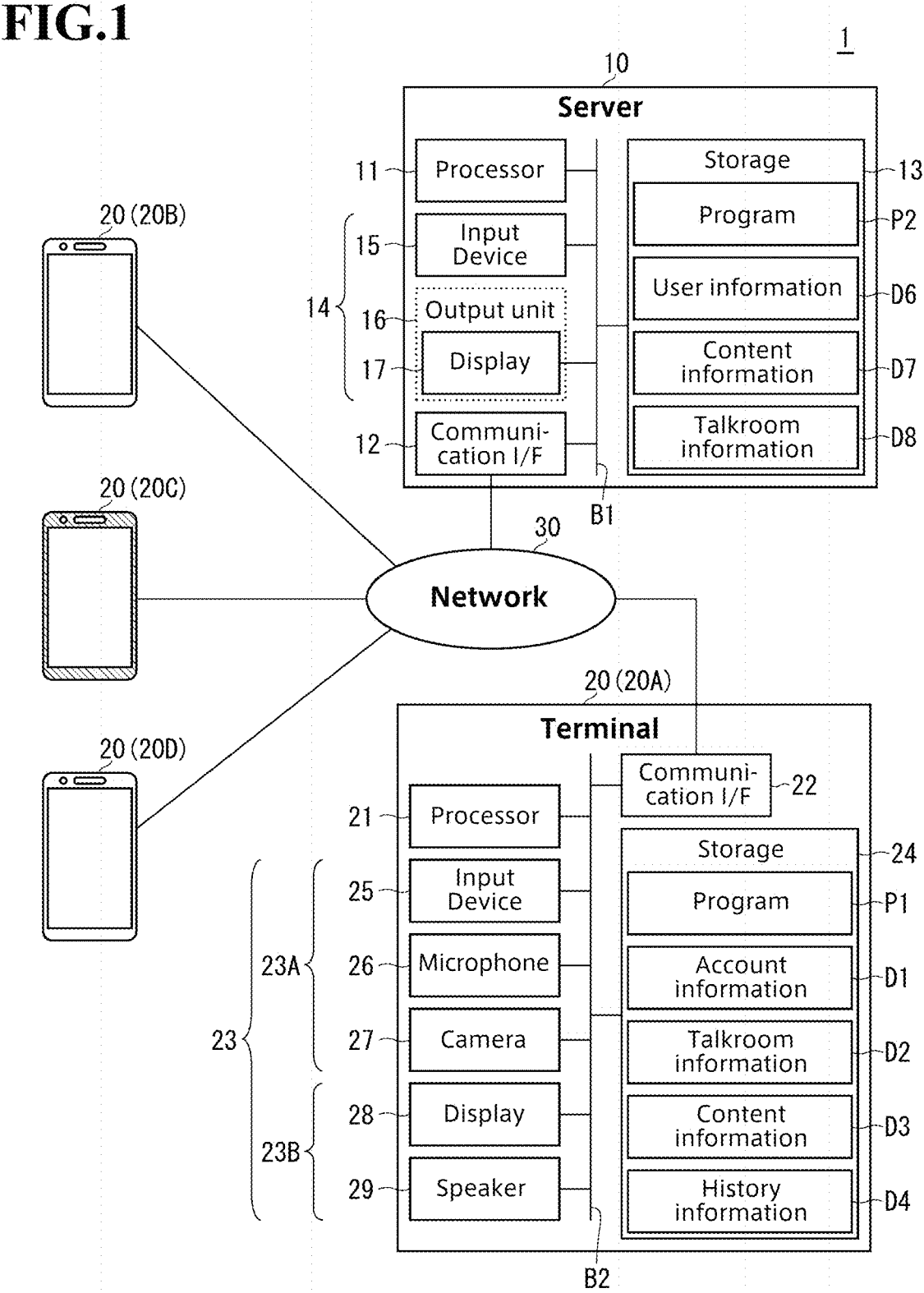
FIG. 1 is a diagram illustrating a communication system according to an example embodiment.

FIG. 1 is a diagram illustrating a configuration of a communication system according to an example embodiment of the present disclosure. As illustrated in FIG. 1, a communication system 1 includes a server 10 and a plurality of terminals 20. The terminals 20 are connected to the server 10 via a network 30. The network 30 may be a portion of the communication system 1, or may be a portion of a system other than the communication system 1. The server 10 provides, via the network 30 to the terminals 20 used by respective users, a service for allowing the terminals 20 to transmit and receive message(s) (referred to as "a content" or "contents" as appropriate).

In FIG. 1, the plurality of terminals 20 include a terminal 20A, a terminal 20B, a terminal 20C, and a terminal 20D. In the following description, for the purpose of distinguishing the terminals 20 from one another, each terminal is indicated by reference signs 20A, 20B, 20C or 20D as appropriate. The number of terminals 20 to be connected to the network 30 is not limited to the number illustrated in FIG. 1, and any number of the terminals may be employed. The number of servers 10 to be connected to the network 30 is not limited to the number illustrated in FIG. 1, and any number of the servers may be employed.

The network 30 serves to connect one or more of the terminals 20 to one or more of the servers 10. That is, the network 30 serves as a communication network that provides a connection path to enable the terminal(s) 20, once connected to the server(s) 10, to transmit and receive data.

One or a plurality of portions of the network 30 may be a wired network or a wireless network. For example, without limitation, the network 30 may include one, or a combination of two or more, communication forms of an ad hoc network, an intranet, an extranet, a virtual private network (referred to as "VPN" as appropriate), a local area network (referred to as "LAN" as appropriate), a wireless LAN (referred to as "WLAN" as appropriate), a wide area network (referred to as "WAN" as appropriate), a wireless WAN (referred to as "WWAN" as appropriate), a metropolitan area network (referred to as "MAN" as appropriate), a portion of the Internet, a portion of the public switched telephone network (referred to as "PSTN" as appropriate), a mobile phone network, integrated service digital networks (referred to as "ISDNs" as appropriate), radio LANs, long term evolution (referred to as "LTE" as appropriate), code division multiple access (referred to as "CDMA" as appropriate), Bluetooth (registered trademark), or satellite communication. The network 30 may be constituted by a single network, or may be constituted by a plurality of networks.

The terminals 20 may each be any kind of terminal that is an information processing terminal capable of implementing functions. For example, without limitation, each of the terminals 20 may be a smartphone, a mobile phone (such as a feature phone), a computer (for example, without limitation, a desktop, a laptop, a tablet, etc.), a media computer platform (for example, without limitation, a set-top box for receiving signals for cable TV broadcasting, satellite broadcasting, terrestrial TV broadcasting and/or IP broadcasting and converting the signals into video signals, a digital video recorder, etc.), a handheld computer device (for example, without limitation, a personal digital assistant (referred to as "PDA" as appropriate), a communication terminal installed with an electronic mail client, etc.), a wearable terminal (for example, without limitation, an eyeglasses-type device, a watch-type device, etc.), or any one of other types of computers and/or communication platforms. The terminals 20 may also be referred to as information processing terminals.

Among the plurality of terminals 20, at least one of the terminals may have the same configuration as another terminal, or at least one of the terminals may have a different configuration from the other terminals. FIG. 1 illustrates a configuration of a terminal 20A as an example of a configuration of the terminal 20. One or more of the terminals 20B, 20C, and 20D may have the same configuration as the terminal 20A, or may have a different configuration from the terminal 20A.

In the following description, information relating to a user in a desired (or alternatively, predetermined) service, being associated with a terminal 20 or the user of a terminal 20 is referred to as user information, as appropriate. The user information is information relating to a user associated with an account that is employed by the user in the desired (or alternatively, predetermined) service. The user information may include information inputted by the user, and/or information assigned by the desired (or alternatively, predetermined) service. For example, without limitation, the user information includes at least a piece of information among a plurality of pieces of information including user's name, an icon image of the user, user's age, user's gender, user's address, user's hobbies/preferences, and user's identifier. The user information may include information that is associated with the user, but is different from the aforementioned plurality of pieces of information.

The server 10 functions to provide a desired (or alternatively, predetermined) service to the terminal 20. The server 10 may be any information processing device capable of implementing functions. For example, without limitation, the server 10 may be a server device, a computer (e.g., without limitation, a desktop, a laptop, or a tablet), a media computer platform (e.g., without limitation, a set-top box for receiving signals for cable TV broadcasting, satellite broadcasting, terrestrial TV broadcasting and/or IP broadcasting and converting the signals into video signals, or a digital video recorder), a handheld computer device (e.g., without limitation, a PDA or a communication terminal installed with an electronic mail client), or any one of other types of computers and/or communication platforms. The server 10 may also be referred to as an information processing device. The type of hardware may not be distinguished between the server 10 and the terminal 20. For example, the two may be referred to as an information processing device or may be named differently.

{Hardware Configuration}

A hardware configuration of each device included in the communication system 1 will be described with reference to FIG. 1. In the following description, hardware is referred to as HW, as appropriate.

(1) HW Configuration of Terminal

The terminal 20 includes a processor 21, a communication interface (I/F) (alternatively referred to as communication interface circuitry) 22, an input/output device 23, and a storage 24. For example, without limitation, the constituent elements of the HW of the terminal 20 are interconnected via a bus B2.

The communication I/F 22 is a communication interface that is configured to transmit and/or receive various data via the network 30. The communication may be carried out in a wired and/or wireless manner, and may be based on any communication protocol that enables mutual communication to be carried out. The communication I/F 22 functions to communicate with the server 10 via the network 30. The communication I/F 22 is configured to transmit various data to the server 10 in accordance with instructions from the processing unit 21. Further, the communication I/F 22 is configured to receive various data transmitted from the server 10 and convey the data to the processing unit 21. The communication I/F 22 may be referred to as a communication unit. The communication I/F 22 may also be referred to as a communication circuit in cases where the communication I/F is constituted by a physically structured circuit.

For example, without limitation, the input/output device 23 includes an input unit 23A that is configured to accept an input to the terminal 20, and an output unit 23B that is configured to output a processing result that is processed by the terminal 20.

The input unit 23A may be implemented by any one of, or a combination of two or more of, all types of devices capable of accepting an input from an outside of the terminal 20 and conveying information about the input to the processor 21. For example, without limitation, the input unit 23A may include one or a combination of two or more of hardware keys such as a keyboard, a pointing device such as a mouse, a touch pad; an operation unit of a touch panel, a camera, a microphone, and/or other input devices. The input unit 23A of FIG. 1 includes an input device 25, a microphone 26, and a camera 27.

The input device 25 is an operation unit that is configured to accept an input via user operation. For example, without limitation, the input device 25 may include one or a combination of two or more of an operation unit of a touch panel, a touch pad, hardware keys, and/or a pointing device. For example, without limitation, the input device 25 is configured to detect contact to the input device 25 by, for example, user's finger, and convey the detection result to the processing unit 21.

The microphone 26 is an audio input unit employed for inputting audio data. For example, without limitation, the microphone 26 is configured to convert inputted audio into digital-format audio data. The terminal 20 may convey the audio data acquired via the microphone 26 to the processor 21, and/or may store the data in the storage 24. The processor 21 may recognize the audio inputted to the microphone 26, and/or may acquire a command or information which is associated in advance with the recognized audio. The terminal 20 may accept an operation input via audio.

The camera 27 is an image-capturing unit that is configured to carry out image capturing. For example, without limitation, the camera 27 is configured to generate digital-format image data as a result of image capturing. The camera 27 may acquire a moving image by repeatedly acquiring still images. The terminal 20 may convey the image data acquired by the camera 27 to the processor 21, and/or may store the data in the storage 24. The processor 21 may recognize the image acquired by the camera 27, and/or may acquire a command or information which is associated in advance with the recognized image. The terminal 20 may accept an operation input via a moving image.

The input unit 23A may not include at least one of the input device 25, the microphone 26, or the camera 27. The input unit 23A may include devices (e.g., without limitation, various sensors such as an acceleration sensor) other than the input device 25, the microphone 26, and the camera 27. One or more of the input device 25, the microphone 26, and the camera 27 may be an external device connected to the terminal 20. The input/output unit 23 may include an input interface, such as an input terminal, for connection with the external device. For example, the input/output unit 23 may not include the microphone 26, but instead, may have an input terminal to be connected with an output terminal of an external microphone. The input/output unit 23 may not include the input interface.

The output unit 23B may be implemented by any one of, or a combination of two or more of, all the types of devices capable of outputting a processing result from processing performed by the processor 21. For example, without limitation, the output unit may include one or a combination of two or more of an audio output unit (e.g., a speaker) that is configured to output audio, a display that is configured to display an image, an optical output unit (e.g., a lens, three-dimensional (referred to as "3D" as appropriate) output unit and/or hologram output unit, or a projector) that is configured to output light, or a printer. The output unit 23B of FIG. 1 includes a display 28 and a speaker 29.

The display 28 may be implemented by any one of, or a combination of two or more of, all the types of devices capable of providing display in accordance with display data written in a frame buffer. For example, without limitation, the display 28 may include one or a combination of two or more of a liquid crystal display, an organic electroluminescence display (referred to as "OELD" as appropriate), an electrophoretic display, a plasma display, a head mounted display (referred to as "HMD" as appropriate), or a projector.

The display 28 may be a device that is configured to display an object on a panel, a screen, or the like, or may be a device, such as a hologram device, that is configured to display an object in a space in the air, in other gases, or in a vacuum, for example. The display 28 may be a device that is configured to display a two-dimensionally visible image, or may be a device that is configured to display a three-dimensionally visible image. The display 28 may display, as an image, information including one or a combination of two or more of a shape, a pattern, a figure, a symbol, and/or text.

For example, without limitation, the input device 25 and the display 28 may be a touch panel. In this case, the input device 25 may include an operation unit of the touch panel, and the display 28 may include a display region of the touch panel. The display 28 may have substantially the same size and shape as the input device 25, and may be superposed on and integrated with the input device 25. The input device 25 and the display 28 may not have to be a touch panel, and/or the input device 25 and the display 28 may be separate.

The speaker 29 is employed for outputting audio data. For example, without limitation, the speaker 29 is configured to convert digital-format audio data into an analog-format electric signal, and reproduce the audio by causing vibration of an object by the electric signal.

The output unit 23B may not have to include one, or both, of the display 28 and the speaker 29. The output unit 23B may include devices other than the display 28 and the speaker 29. The display 28 and/or the speaker 29 may be an external device other than the terminal 20. The input/output unit 23 may include an output interface, such as an output terminal, for connection with the external device. For example, the input/output unit 23 may not include the speaker 29, but instead, may have an output terminal to be connected with an input terminal of an external speaker. The input/output unit 23 may not have to include the output interface.

For example, without limitation, the processor 21 may carry out one or a combination of two or more of: control processing for controlling the various constituent elements of the terminal 20, various types of computation processing, and/or various types of image processing. The processor 21 may be implemented by, for example, without limitation, a data processing device embedded in hardware and including a physically structured circuit for executing functions implemented by codes or commands included in a program. Thus, the processor 21 may be referred to as a processing circuit, or may be named differently.

For example, without limitation, the processor 21 may include one or a combination of two or more of, a central processing unit (referred to as "CPU" as appropriate), a microprocessor, a processor core, a multiprocessor, an application-specific integrated circuit (referred to as "ASIC" as appropriate), a field programmable gate array (referred to as "FPGA" as appropriate), and/or other circuits. The processor 21 may include a general-purpose processor, and/or include a processing circuit or an integrated system that performs only processes determined in advance.

The storage 24 functions to store various programs and/or various data necessary for the terminal 20 to operate. For example, without limitation, the storage 24 may include one or a combination of two or more of various storage media, such as a hard disk drive (referred to as "HDD" as appropriate), a solid state drive (referred to as "SSD" as appropriate), a flash memory, a random access memory (referred to as "RAM" as appropriate), a read only memory (referred to as "ROM" as appropriate), and the like. The storage 24 may be referred to as a memory, or may be named differently.

The terminal 20 stores a program P1 in the storage 24. With the program P1 executed, the processor 21 carries out processing as the various units included in the processor 21. Stated differently, the program P1 stored in the storage 24 materializes various functions via implementation of the processor 21 in the terminal 20. The program P1 causes the processor 21 (for example, without limitation, a CPU or a computer) of the terminal 20 to carry out processing. The program P1 may be referred to as a program module, or may be named differently.

The terminal 20 may include a portion of the aforementioned constituent elements of the HW. The terminal 20 may include constituent elements other than the aforementioned constituent elements of the HW.

(2) HW Configuration of Server

The server 10 includes a processor 11, a communication I/F 12, a storage 13, and an input/output unit 14. For example, without limitation, the constituent elements of the HW of the server 10 are interconnected via a bus B1. Note that the HW of the server 10 does not necessarily have to include all the constituent elements as the configuration of the HW of the server 10. For example, without limitation, the HW of the server 10 may or may not be configured such that at least a portion of the input/output unit 14 is removable.

For example, without limitation, the processor 11 may carry out one or a combination of two or more of control processing for controlling the various constituent elements of the server 10, various types of computation processing, and/or various types of image processing. The processor 11 may be implemented by, for example, without limitation, a data processing device embedded in hardware and including a physically structured circuit for executing functions implemented by codes or commands included in a program. Thus, the processor 11 may be referred to as a processing circuit, or may be named differently.

For example, without limitation, the processor 11 may include one or a combination of two or more of a CPU, a microprocessor, a processor core, a multiprocessor, an ASIC; a FPGA, and/or other circuits. The processor 11 may include a general-purpose processor, and/or include a processing circuit or an integrated system that performs only processes that are determined in advance.

The communication I/F 12 is a communication interface that is configured to transmit and/or receive various data via the network 30. Communication may be carried out in a wired and/or wireless manner and may be based on any communication protocol that enables mutual communication to be carried out. The communication I/F 12 functions to communicate with the terminal 20 via the network 30. The communication I/F 12 is configured to transmit various data to the terminal 20 in accordance with instructions from the processor 11. Further, the communication I/F 12 is configured to receive various data transmitted from the terminal 20 and convey the data to the processor 11. The communication I/F 12 may be referred to as a communication unit. The communication I/F 12 may also be referred to as a communication circuit in cases where the communication I/F is constituted by a physically structured circuit.

The storage 13 functions to store various programs and/or various data desired for the server 10 to operate. For example, without limitation, the storage 13 may include one or a combination of two or more of various storage media, such as a HDD, a SSD, a flash memory, a RAM, a ROM, and the like. The storage 13 may be referred to as a memory, or may be named differently.

For example, without limitation, the input/output unit 14 includes an input unit 15 that is configured to accept an input to the server 10, and an output unit 16 that is configured to output a processing result from processing performed by the server 10. The input unit 15 may be implemented by any one of, or a combination of two or more of, all types of devices capable of accepting an input from outside the server 10 and conveying information about the input to the processor 11. For example, without limitation, the input unit 15 may include one or a combination of two or more of hardware keys (e.g., a keyboard), a pointing device (e.g., a mouse), a touch pad, an operation unit of a touch panel, a camera, a microphone, and/or other input devices. The output unit 16 may be implemented by any one of, or a combination of two or more of, all the types of devices capable of outputting processing results from processing performed by the processor 11. For example, without limitation, the output unit 16 may include one or a combination of two or more of an audio output unit (e.g., a speaker) that is configured to output audio, a display that is configured to display an image, an optical output unit (e.g., a lens, a 3D output device, a hologram output device, or a projector) that is configured to output light, a printer, and/or other output devices.

For example, without limitation, the output unit 16 includes a display 17. The display 17 may be implemented by any one of, or a combination of two or more of, all the types of devices capable of providing display in accordance with display data written in a frame buffer. For example, without limitation, the display 17 may include one or a combination of two or more of a liquid crystal display, an OELD, an electrophoretic display, a plasma display, a HMD, a projector, and/or other display devices. The display 17 may be a device that is configured to display an object on a panel, a screen, or the like, or may be a device, such as a hologram, that is configured to display an object in a space in the air, in other gases, or in a vacuum, for example. The display 17 may be a device that is configured to display a two-dimensionally visible image, or may be a device that is configured to display a three-dimensionally visible image. The display 17 may display, as an image, information including one or a combination of two or more of a shape, a pattern, a figure, a symbol, and/or text.

The input/output unit 14 may not include the input unit 15 and/or the output unit 16. The input/output unit 14 may instead include an interface to which the input unit 15 is to be connected. The input/output unit 14 may not include the aforementioned interface. The input/output unit 14 may not include the output unit 16, but instead include an interface to which the output unit 16 is to be connected. The input/output unit 14 may not to include the aforementioned interface.

The server 10 stores a program P2 in the storage 13. With the program P2 executed, the processor 11 carries out processing as the various units included in the processor 11. Stated differently, the program P2 stored in the storage 13 materializes various functions via implementation of the processor 11 within the server 10. The program P2 causes the processor 11 (for example, without limitation, a CPU or a computer) of the server 10 to carry out processing. The program P2 may or may not be referred to as a program module.

In some example embodiments of the present disclosure, the processor 11 of the server 10 may be described as a CPU and the processor 21 of the terminal 20 may be described as a CPU. In this case, the server 10 implements an information processing method in the server 10 by making the CPU of the server 10 execute the program P2. The program P2 makes the CPU of the server 10 function as various functional units of the server 10. The terminal 20 implements an information processing method in the terminal 20 by making the CPU of the terminal 20 execute the program P1. The program P1 makes the CPU of the terminal 20 function as various functional units of the terminal 20. For example, without limitation, the functional units include one or a combination of two or more of a control unit, a computation unit, and/or an image-processor.

The processor 21 of the terminal 20 and/or the processor 11 of the server 10 may implement at least a portion of the processes with a dedicated circuit or a logic circuit, which is hardware formed on, for example, an integrated circuit (referred to as "IC" as appropriate) or a large-scale integration (referred to as "LSI" as appropriate). The logic circuit and/or the dedicated circuit may be implemented by a single integrated circuit, or may be implemented by a plurality of integrated circuits. The various processes described in some example embodiments may be implemented by a single integrated circuit, or may be implemented by a plurality of integrated circuits. LSI may be referred to as VLSI, super LSI, ultra LSI, and/or the like depending on the degree of integration. Further, the processor 21 of the terminal 20 and/or the processor 11 of the server 10 may implement at least a portion of the processes by a CPU having a processing circuit and the aforementioned logic circuit or dedicated circuit. The processor 21 of the terminal 20 and/or the processor 11 of the server 10 may not have to include the aforementioned logic circuit or dedicated circuit.

The programs (e.g., without limitation, software programs, computer programs, and/or program modules) in the present disclosure may be provided in a state where the programs are stored on a computer-readable storage medium, or may be provided in other forms. The storage medium is capable of storing a program in a "non-transitory tangible medium". The programs according to the present disclosure may be for implementing some functions of the example embodiments, or may be for implementing all the functions of the example embodiments, or may include functions other than those of the example embodiments. The program according to the present disclosure may or may not achieve the functions of the various example embodiments in combination with a program already recorded on a storage medium, such as a differential file (differential program).

The storage medium may include one of, or a suitable combination of two or more of one or a plurality of semiconductor-based or other integrated circuits (e.g., without limitation, FPGAs and/or ASICs), HDDs, hybrid hard drives (referred to as "HHDs" as appropriate), optical discs, optical disc drives (referred to as "ODDs" as appropriate), magneto-optical discs; magneto-optical drives, floppy diskettes, floppy disk drives (FDDs), magnetic tapes, SSDs, RAM drives, Secure Digital cards, drives, and/or any other appropriate storage media. Where appropriate, the storage medium may consist only of a volatile storage medium, consist only of a non-volatile storage medium, or be a combination of volatile and non-volatile storage media. The storage medium is not limited to these examples and may be any device or medium that is capable of storing the program(s). The storage medium may be referred to as a memory, or may be named differently.

The programs according to the present disclosure may be provided to the server 10 and/or the terminal 20 via any transmission media (e.g., without limitation, a communication network, broadcast waves, etc.) that is capable of transmitting the programs, or may be provided in other forms. For example, without limitation, the server 10 and/or the terminal 20 may implement the functions of functional units (for example, without limitation, a control unit, a computation unit, and/or an image-processor) by executing a program downloaded via the Internet or the like.

Some example embodiments of the present disclosure may also be implemented in the form of a data signal that is embedded in a carrier wave and in which the program is embodied by electronic transmission. At least a portion of processes in the server 10 may or may not be implemented by cloud computing constituted by one or more computers. At least a portion of processes in the terminal 20 may or may not be implemented by cloud computing constituted by one or more computers. At least a portion of processes in the terminal 20 according to some example embodiments may be carried out by the server 10. In this case, the server 10 may execute at least a portion of processes of the various functional units (e.g., without limitation, a control unit, a computation unit, and/or an image-processor) of the processor 21 of the terminal 20. In some example embodiments, all of the processes of the terminal 20 may be executed by the terminal 20. In some example embodiments, at least a portion of processes in the server 10 may be carried out by the terminal 20. In this case, the terminal 20 may execute at least a portion of processes of the various functional units (for example, without limitation, a control unit, a computation unit, and/or an image-processor) of the processor 11 of the server 10. In some example embodiments, all of the processes of the server 10 may be executed by the server 10. In some example embodiments of the present disclosure, a configuration for determination is not be included unless explicitly mentioned otherwise, and a desired (or alternatively, predetermined) process may be activated in case a determination condition is satisfied, or a desired (or alternatively, predetermined) process may be activated in case a determination condition is not satisfied, although not limited thereto.

The programs according to the present disclosure may be implemented using, for example, without limitation, a script language such as ActionScript and/or JavaScript (registered trademark), an object-oriented programming language such as Objective-C and/or Java (registered trademark), or a markup language such as HTML5.

The information processing methods according to some example embodiments provide, for example, without limitation, a service for transmitting and receiving contents among terminals 20 corresponding to a group including a plurality of users. In the following description, the user of terminal 20A is referred to as user A, the user of terminal 20B is referred to as user B, the user of terminal 20C is referred to as user C, and the user of terminal 20D is referred to as user D. The number of users included in a single group may be any number that is two or greater. For example, a single group may be constituted by user A and user B, and in this case, the number of users included in this group is two. In some example embodiments, another group may be constituted by user A, user B, user C, and user D, and in this case, the number of users included in this group is four.

In the following description, a service provided by an information processing method according to example embodiments may be referred to as a messaging service, as appropriate. For example, without limitation, the terminal 20 is configured to display an image of a graphical user interface (referred to as "GUI" as appropriate) provided by the messaging service. In the following description, "Talkroom" may refer, as appropriate, to a GUI through which contents transmitted and received among terminals of users in a group (hereinafter, for the purpose of avoiding wording redundancy, the expression "terminals corresponding to a group" is sometimes used as the same meaning, as appropriate) including a plurality of users can be viewed by the users included therein. A Talkroom corresponding to a first group may be referred to as a first Talkroom, and a Talkroom corresponding to a second group may be referred to as a second Talkroom.

For example, without limitation, the display 28 includes a display region 28A (illustrated in FIG. 2) in which a plurality of pixels are arranged, and is configured to display an image of a Talkroom on the display region 28A. A "first image" including contents transmitted and received among terminals corresponding to a first group including a plurality of users is equivalent to an "image of a first Talkroom" or "first Talkroom image". A "second image" including contents transmitted and received among terminals corresponding to a second group including a plurality of users is equivalent to an "image of a second Talkroom" or "second Talkroom image".

For example, without limitation, the aforementioned content may include one or a combination of two or more of text, an image, and/or audio. For example, without limitation, text included in the content may include one or a combination of two or more of characters used in various countries expressed by character codes, escape characters, platform-dependent characters, numbers, symbols, figures, and/or signs. The text included in the content may not include at least one of the aforementioned characters, escape characters, platform-dependent characters, numbers, symbols, figures, or signs, and may include other types of text.

For example, without limitation, an image included in the content may include one or a combination of two or more of a captured image captured by a camera, a processed image obtained by applying image processing on a captured image, a computer graphics image (e.g., without limitation, an icon, an emoji, and/or an emoticon) generated using a computer, and/or a text image obtained by making text into an image. The image included in the content may include a composite image made by compositing two or more of the aforementioned captured images, processed images, computer graphics images, and/or text images. The image included in the content may not include at least one of the aforementioned captured image, processed image, computer graphics image, text image, or composite image, and may include other types of images. The image included in the content may be a still image, a moving image, or an image according to other types of form. For example, without limitation, a content including an image may be shown in a Talkroom image as an icon, such as a thumbnail. For example, without limitation, the terminal 20 may display an image included in the content on the basis of input to an icon representing the image included in the content.

For example, without limitation, audio included in the content may include one or a combination of two or more of recorded audio recorded with a microphone, processed audio obtained by applying processing on recorded audio, synthetic audio generated using a computer, and/or readout audio obtained by converting text using, for example, a readout function of a computer. The audio included in the content may include composite audio made by combining two or more of the aforementioned recorded audio, processed audio, synthetic audio, and/or readout audio. The audio included in the content may not include at least one of the aforementioned recorded audio, processed audio, synthetic audio, readout audio, or composite audio, and may include other types of audio. The audio included in the content may include one or a combination of two or more of sound or voice emitted by a human being or a living creature other than a human being, sound emitted by an object such as a musical instrument or a machine, a sound effect, ambient sound, noise, and/or an alarm. The audio may not include at least one of the aforementioned sounds or voices, and may include audio other than the aforementioned sounds or voices. For example, without limitation, a content including audio may be shown as an icon, etc. in a Talkroom image. For example, without limitation, the terminal 20 may reproduce audio included in the content on the basis of input to an icon representing the audio included in the content.

For example, without limitation, the content may be a content made by combining two or more of the aforementioned text, images, and/or audio. For example, without limitation, the content may be a content in which a moving image is reproduced concurrently with audio, or may be a content in which an image and text are displayed in combination, or may be a content in which text is displayed in accordance with the reproduction of audio. The content may be a content in which audio is reproduced concurrently with the displaying of text and images. For example, without limitation, the content may be a content made by combining one or a combination of two or more of text, an image and/or audio, and a content other than text, images, or audio.

For example, without limitation, the storage 24 of the terminal 20 is configured to store information to be used in the messaging service. For example, without limitation, the information may include account information D1, Talkroom information D2, content information D3, and history information D4. The Talkroom information D2, the content information D3, and the history information D4 will be described further below.

The account information D1 is information relating to an account employed by the user of the terminal 20 in the messaging service. The account information D1 is information used for user authentication in the messaging service. For example, without limitation, the account information D1 may include identification information of the user and a password. In the following description, the identification information of the user is referred to as a user ID, as appropriate. The user ID may be information registered by the user of the terminal 20, or may be information assigned by the messaging service.

The storage 24 may not store the user ID and/or the password. For example, upon user authentication in the messaging service, the user may operate the input/output unit 23 of the terminal 20 and input either the user ID and/or the password, whichever is desired. The account information D1 may include information other than the user ID and the password. For example, in cases where biometric authentication is employed for the user authentication, the account information D1 may include, as information used for biometric authentication, information such as user's fingerprints, vein patterns, and/or a photograph of their face.

The storage 24 may not store at least a portion of the information used for the messaging service (e.g., without limitation, the Talkroom information D2, the content information D3, and/or the history information D4). For example, at least a portion of the information used for the messaging service may be stored in a storage being external to the terminal 20 (for example, without limitation, the storage 13 of the server 10). For example, without limitation, the terminal 20 may acquire the information used for the messaging service from a storage being external to the terminal 20 via the network 30.

For example, without limitation, the storage 13 of the server 10 is configured to store information to be used in the messaging service. For example, without limitation, the information may include user information D6, content information D7, and Talkroom information D8. For example, without limitation, the user information D6 may include user IDs and passwords associated with the respective accounts in the messaging service. In the messaging service, the terminal 20 transmits the account information D1. When receiving the account information D1 transmitted from the terminal 20, the server 10 checks the user ID and password, which are included in the account information D1, against the user information D6, to specify the user associated with the terminal 20. The content information D7 and the Talkroom information D8 will be described further below.

Information processing methods according to some example embodiments are described below. In the following description, reference should be made, as appropriate, to FIG. 1 and the explanation thereon regarding the various constituent elements of the communication system 1.

First Example Embodiment

Figure 2:
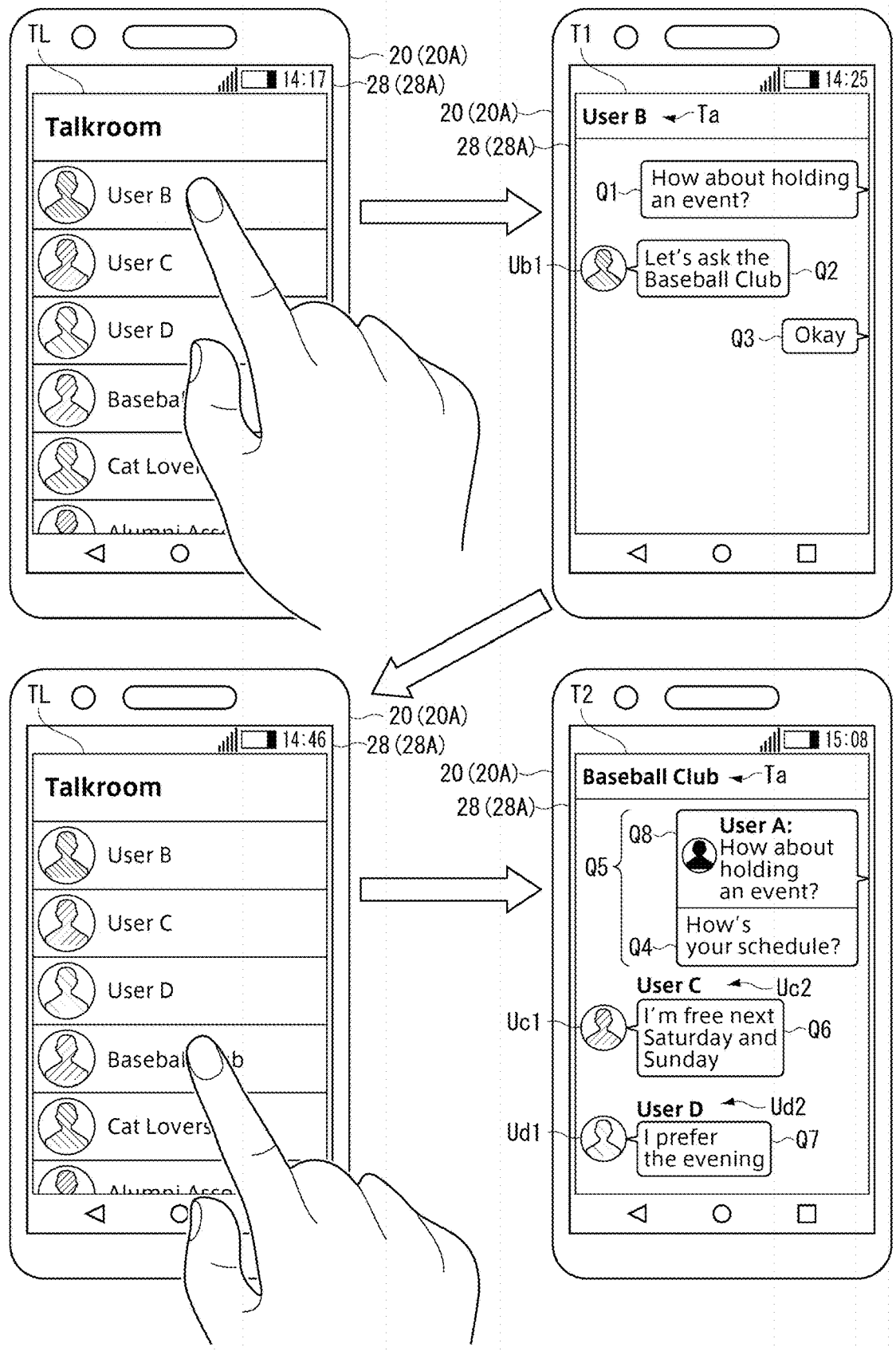
FIG. 2 is a diagram illustrating an information processing method according to a first example embodiment.

FIG. 2 is a diagram illustrating an information processing method according to a first example embodiment. First, an overview of this example embodiment will be described. This example embodiment is a configuration wherein a terminal 20 of a user who is included in a first group and also included in a second group, transmits, via a communication unit (e.g., the communication I/F 22) thereof, information relating to a first content included in a first Talkroom and a second content. In the upper-right diagram of FIG. 2, an image T1 of a first Talkroom includes a content Q1, a content Q2, and a content Q3. For example, without limitation, the user selects a first content from among the contents (Q1, Q2, and Q3) included in the first Talkroom image T1, and inputs a second content via the input unit 23A of the terminal 20. In FIG. 2, the first content is the content Q1, and the second content is a content Q4 (illustrated in the lower-right diagram). In FIG. 2, the first content Q1 is a text stating "How about holding an event?" and the second content Q4 is a text stating "How's your schedule?".

The terminal 20 transmits: information relating to the first content and the second content to a second Talkroom as the destination. For example, without limitation, when transmitting the second content associated with the first content, the terminal 20 may transmit the information relating to the first content by automatically attaching it to the second content. In FIG. 2, the terminal 20 transmits the information relating to the first content Q1, and the second content Q4. In FIG. 2, the information relating to the first content Q1 includes at least a portion of the first content Q1.

In the lower-right diagram of FIG. 2, an image T2 of a second Talkroom includes a content Q5, a content Q6, and a content Q7. For example, without limitation, the content Q5 includes a content Q8 relating to the first content Q1 and the second content Q4. For example, without limitation, the content Q8 relating to the first content is a content based on the information relating to the first content. The content relating to the first content may be a portion or the entirety of the first content, or may be a content generated by applying processing such as compression, on the first content. In the lower-right diagram of FIG. 2, the content Q8 is identical to the first content Q1. For example, without limitation, the terminal 20 displays, on the display region 28A, an image of the second Talkroom including a content reproducing at least a portion of the first content on the basis of the information relating to the first content.

For example, without limitation, the terminal 20 generates an image of the second Talkroom by arranging the content relating to the first content, and the second content, according to a desired (or alternatively, predetermined) positional relationship, and displays the generated second Talkroom image on the display region 28A. For example, without limitation, the terminal 20 displays, on the display region 28A, a second Talkroom image T2 including the content Q5, which includes a set of the content Q8 relating to the first content and the second content Q4. For example, without limitation, the content Q5 is a content citing the first content Q1. In the following description, a "citation content" refers, as appropriate, to a content (the content Q5 in FIG. 2) including a set of a content relating to the first content (the content Q8 in FIG. 2) and the second content (the content Q4 in FIG. 2).

For example, without limitation, the user of the terminal 20 that transmit the second content Q4 can convey information included in the first Talkroom (e.g., the first content Q1) to the user(s) in the second Talkroom. For example, without limitation, at the terminal 20, it is possible to include, in the second Talkroom image, a second content that is inputted via the subject terminal, and, at the same time, information relating to the first content associated with the second content. In this way, the information processing method according to this example embodiment can contribute to sharing of information among users included in the first group and users included in the second group. For example, without limitation, the user of the terminal 20, which transmits the second content Q4, can easily convey information included in the first Talkroom to users in the second Talkroom.

Next, the present example embodiment will be described in further detail. The description on the present example embodiment is applicable to the other example embodiments as appropriate. In this example embodiment, features similar to those in the foregoing example embodiments are accompanied by the same reference signs and explanation thereon is omitted or simplified, as appropriate. In FIG. 2, the first group is constituted by user A and user B, and the second group is constituted by user A, user B, user C, and user D.

The reference sign TL in the upper-left diagram of FIG. 2 indicates an image illustrating a list of Talkrooms. For example, without limitation, the terminal 20 displays, on the display region 28A, an image TL of a list of Talkrooms associated with the subject terminal or the user thereof. For example, without limitation, Talkrooms associated with the subject terminal or the user thereof are Talkrooms including the user of the subject terminal. For example, without limitation, in cases where there is a desired (or alternatively, predetermined) input via the input unit 23A with respect to the Talkroom list image TL, the terminal 20 determines that a Talkroom is selected. In the Talkroom list image TL in FIG. 2, {User B}, {User C}, {User D}, {Baseball Club}, and {Cat Lovers} are icons accompanied by the names of the respective Talkrooms. For example, without limitation, in cases where there is an input via the input unit 23A with respect to the {User B} icon, the terminal 20 determines that the Talkroom named {User B} is selected. For example, without limitation, in cases where the display region 28A is a display region of a touch panel and the input device 25 is an operation unit thereof, the terminal 20 determines that the Talkroom named {User B} is selected when the {User B} icon displayed on the display region 28A is tapped, and displays an image of the Talkroom named {User B} on the display region 28A, as illustrated in the upper-right diagram of FIG. 2.

For example, without limitation, each user can create a Talkroom. When creating a Talkroom, a user selects one or more users, to thereby create, in the messaging service, a Talkroom including the users selected by the user. Processes for creating a Talkroom may be carried out by the terminal 20, or may be carried out by the server 10, or may be carried out by both the terminal 20 and the server 10. The processes for creating a Talkroom may be carried out by a device other than the terminal 20 and the server 10.

In each image illustrating a Talkroom, reference sign Ta indicates the name of the Talkroom. In cases where the number of users included in a group is two, the name of the Talkroom may, for example, without limitation, be set to the name of the other user. In this example, the users included in the first group are user A and user B, and thus, the user name of the terminal 20B, which is the counterpart of the terminal 20A, is "User B". The terminal 20A may or may not display "User B" as the name of this Talkroom. In cases where the number of users included in a group is three or greater, the name of the Talkroom may, for example, without limitation, be set to a name inputted by the user. For example, without limitation, the name of a Talkroom may be assigned automatically in the messaging service, and/or may be expressed as the Talkroom's identification information, for example.

In the first Talkroom image T1, the content Q1 and the content Q3 are, respectively, contents inputted via the subject terminal (terminal 20A in this example). For example, without limitation, the terminal 20 displays contents inputted via the input unit 23A of the subject terminal so as to line up the inputted contents in a first direction with respect to the Talkroom image. For example, without limitation, the first direction is the longitudinal direction of the Talkroom image, and a second direction intersecting with the first direction is the lateral direction of the Talkroom image. For example, the contents Q1 and Q3 in the first Talkroom image T1 of FIG. 2 are contents inputted via the subject terminal (terminal 20A in this example), and are lined up in the longitudinal direction and are arranged closer to one side in the lateral direction of the Talkroom image T1.

In the Talkroom image T1, the content Q2 is a content transmitted from a terminal (terminal 20B in this example) other than the subject terminal (terminal 20A in this example). In the following description, terminals other than the subject terminal are referred to as object terminals, as appropriate. For example, without limitation, the terminal 20 displays a content transmitted from object terminals at a position, in the second direction, different from the content transmitted from the subject terminal. For example, without limitation, the content Q2 in the Talkroom image T1 of FIG. 2 is a content transmitted from an object terminal (terminal 20B in this example), and is arranged on the opposite side from the contents Q1 and Q3 in the lateral direction of the Talkroom image T1.

For example, without limitation, the terminal 20 arranges, a set of each content transmitted from an object terminal and information relating to the user of the terminal 20 that transmitted the content within the Talkroom image. For example, without limitation, the information relating to the user may include one or a combination of two or more of user's icon, user's name, and/or a user ID. In the Talkroom image, the reference signs Ub1, Uc1, and Ud1 respectively indicate icons of user B, user C, and user D, respectively. In the Talkroom image, the reference signs Uc2, and Ud2 respectively indicate the names of user C, and user D, respectively.

In the Talkroom image T1, the reference sign Ub1 indicates an icon of the user of the object terminal (terminal 20B in this example) that transmitted the content. The terminal 20 arranges the content Q2 and the icon Ub1 of the user of the terminal 20B that transmitted the content Q2 within the Talkroom image T1 according to a desired (or alternatively, predetermined) positional relationship. The information relating to the user may not include at least one of the user's icon, the user's name, or the user ID, and may include information other than the user's icon, the user's name, and/or the user ID. The terminal 20 may not include the aforementioned information relating to the user in the Talkroom image.

For example, without limitation, the terminal 20 displays each Talkroom image on the display region 28A by lining up the contents in that Talkroom in the first direction in an order according to time at which the respective contents were transmitted. For example, in the first Talkroom image T1, the content Q2 is a content transmitted after the content Q1, and is thus arranged below the content Q1 in the longitudinal direction of the Talkroom image T1.

For example, without limitation, the second content is a content including one or a combination of two or more of text, an image and/or audio inputted via the input unit 23A of the terminal 20. For example, without limitation, inputting of the second content may involve one or a combination of two or more of inputting a text via user operation to the input device 25, inputting audio via the microphone 26, inputting a text via voice recognition of the audio inputted via the microphone 26, inputting an image captured by the camera 27, and/or inputting a file selected via user operation to the input device 25. For example, without limitation, the file may include one or a combination of two or more of audio data, image data, and/or other data. The file may include a file of data stored in the storage 24, and/or may include a file of data stored in another storage other than the storage 24 (e.g., without limitation, a storage of a device connected via the network 30).

For example, without limitation, in case where the {Baseball Club} icon in the Talkroom list image TL illustrated in the lower-left diagram of FIG. 2 is tapped, the terminal 20 displays an image T2 of the Talkroom with the name "Baseball Club" on the display region 28A, as illustrated in the lower-right diagram of FIG. 2. In this example, the Talkroom named "Baseball Club" is considered as the second Talkroom. The second Talkroom image T2 serves as a second image including a content transmitted and received among terminals corresponding to the second group. The second content Q4 is associated with the first content Q1, and is included in the second image including a content transmitted and received among the terminals corresponding to the second group. The terminal 20 displays, on the display region 28A, the second Talkroom image T2 including the second content Q4 associated with the first content Q1 in the first Talkroom image T1. For example, without limitation, the content Q5 is a citation content that cites the first content Q1 in the first Talkroom image T1, and is included in the second Talkroom image T2. For example, without limitation, the content Q5 includes the second content Q4, and at least a portion of the first content Q1 associated with the second content Q4. A reference sign Q6 indicates a content transmitted from the terminal 20C of the user C, and a reference sign Q7 indicates a content transmitted from the terminal 20D of the user D.

For example, without limitation, the aforementioned information relating to the first content is information used by a device retaining this information to reproduce at least a portion of the first content. For example, without limitation, the device retaining the information relating to the first content may be one or a combination of two or more of the terminal 20 transmitting the information relating to the first content, the server 10 receiving the information relating to the first content, a terminal 20 receiving the information relating to the first content via the server 10, and/or a device other than the aforementioned devices.

For example, without limitation, the terminal 20 displays, on the display region 28A, an image of a Talkroom on the basis of the Talkroom information D2 and the content information D3 illustrated in FIG. 1. An example of the Talkroom information D2 and an example of the content information D3 are described below.

FIG. 3A is a diagram illustrating an example of Talkroom information. For example, without limitation, the Talkroom information D2 may include items such as a Talkroom ID, a name, a user ID, and a content. The Talkroom ID includes identification information of a Talkroom. For example, without limitation, the Talkroom ID is assigned in the messaging service when a user creates a Talkroom. In this example, the Talkroom whose {Talkroom ID} is {tr01} is considered as the first Talkroom (see the Talkroom image T1 of FIG. 2), and the Talkroom whose {Talkroom ID} is {tr04} is considered as the second Talkroom (see the second Talkroom image T2 of FIG. 2).

For example, without limitation, {Name} includes names of the Talkrooms.

{Name} is associated with {Talkroom ID}. For example, the {Name} of the Talkroom whose {Talkroom ID} is {tr01} is {User B}, and the {Name} of the Talkroom whose {Talkroom ID} is {tr04} is {Baseball Club}.

For example, without limitation, {User ID} includes identification information of users included in the group corresponding to each Talkroom. {User ID} is associated with {Talkroom ID}. For example, the users included in the group corresponding to the Talkroom whose {Talkroom ID} is {tr01} are users A and B, and the {User ID} corresponding to {tr01} includes a user ID of the user A and a user ID of the user B. Further, the users included in the group corresponding to the Talkroom whose {Talkroom ID} is {tr04} are users A, B, C, and D, and the {User ID} corresponding to {tr04} includes the user ID of the user A, the user ID of the user B, a user ID of the user C, and a user ID of the user D.

For example, without limitation, {Contents List} includes information indicating a list of contents included in each Talkroom. {Contents List} is associated with {Talkroom ID}. For example, contents included in the Talkroom whose {Talkroom ID} is {tr01} are described by {List 1} which is a portion of the content information D3. Further, contents included in the Talkroom whose {Talkroom ID} is {tr04} are described by {List 4} which is a portion of the content information D3.

FIGS. 3B and 3C are diagrams respectively illustrating some examples of content information. FIG. 3B is a portion of the content information D3 and corresponds to {List 1} of FIG. 3A). FIG. 3C is a portion of the content information D3 and corresponds to {List 4} of FIG. 3A. For example, without limitation, the content information D3 may include items such as {Content ID}, {Transmission User ID}, {Content}, and {Association Information}.

{Content ID} includes identification information of the respective contents. For example, without limitation, the identification information of each content is assigned in the messaging service when a terminal 20 transmits the content. In this example, the content whose {Content ID} is {tr01c01} corresponds to the content Q1 in the first Talkroom image T1 of FIG. 2. Similarly, the content whose {Content ID} is {tr01c02} corresponds to the content Q2, and the content whose {Content ID} is {tr01c03} corresponds to the content Q3.

For example, without limitation, {Transmission User ID} is a user ID corresponding to the terminal 20 that transmitted the respective content. {Transmission User ID} is associated with {Content ID}. For example, based on the content whose {Content ID} is {tr01c01}, a user corresponding to the terminal 20 that transmitted the content is the user A, and {Transmission User ID} corresponding to {tr01c01} includes the user ID of the user A. Based on the content whose {Content ID} is {tr01c02}, a user corresponding to the terminal 20 that transmitted the content is the user B, and {Transmission User ID} corresponding to {tr01c02} includes the user ID of the user B.

For example, without limitation, {Contents} includes data describing the respective contents. In cases where the content includes a text, the {Contents} may store text data of the content. In cases where the content includes an image, the {Content} may store image data, a link to the image data, or an address of a storage storing the image data. For example, without limitation, the image data may include still image data and/or moving image data. For example, without limitation, the image data may or may not include data expressing a stamp, a sticker, an emoji, and/or an emoticon. In cases where the content included audio, the {Contents} may store audio data, a link to the audio data, or an address of a storage storing the audio data.

{Contents} is associated with {Content ID}. For example, the content Q1 illustrated in the upper-right diagram of FIG. 2 is a text stating "How about holding an event?", and the {Contents} corresponding to the content ID {tr01c01} stores text data describing "How about holding an event?". The content Q2 illustrated in the upper-right diagram of FIG. 2 is a text stating "Let's ask the Baseball Club", and the {Contents} corresponding to the content ID {tr01c02} stores text data describing "Let's ask the Baseball Club".

For example, without limitation, {Association Information} includes information describing association with another content. In case where the content is the aforementioned second content and is associated with the first content, the {Association Information} of the second content includes, for example, without limitation, identification information of the first content. For example, without limitation, {Association Information} is at least a portion of the information relating to the first content. {Association Information} is associated with {Content ID}. In FIG. 3B, the content whose {Content ID} is {tr01c01} is not associated with any content, and the {Association Information} corresponding to {tr01c01} is {NULL}. {NULL} is information indicating that there is no data.

FIG. 3C corresponds to {List 4}, which is a content list whose {Talkroom ID} in FIG. 3A is {tr04}. The content whose {Content ID} is {tr04c01} corresponds to the content Q4 in the second Talkroom image T2 illustrated in the lower-right diagram of FIG. 2. The content Q4 is associated with the content Q1 in the first Talkroom image T1 illustrated in the upper-right diagram of FIG. 2. In this case, in FIG. 3C, the {Association Information} whose {Content ID} corresponds to {tr04c01} includes {tr01c01}, which is the identification information of the content Q1.

The terminal 20, in cases of transmitting a content from the subject terminal, registers the content to be transmitted at the content information D3 of the Talkroom including that content. Further, in cases of receiving a content from an object terminal, the terminal 20 registers the received content at the content information D3 of the Talkroom including that content. For example, without limitation, the history information D4 stored in the storage 24 illustrated in FIG. 1 includes information relating to the history of transmitted and received contents. For example, for a content transmitted from the subject terminal, the history information D4 may include information that associates the identification information of the content with transmission clock time. Further, for a content received from an object terminal, the history information D4 may include information that associates the identification information of the content with reception clock time. For example, without limitation, the history information D4 may include the time history and/or frequency as to each Talkroom has been used. The expression "Talkroom has been used" means, for example, that one or a combination of two or more of actions, such as displaying of the Talkroom in the subject terminal, transmission of a content in the Talkroom, and/or reception of a content in the Talkroom, has/have been executed.

For example, without limitation, at the time of displaying the second content on the display region 28A, the terminal 20 specifies the first content by referencing the {Association Information}. For example, at the time of displaying, on the display region 28A, the second Talkroom image T2 including the citation content Q5 illustrated in the lower-right diagram of FIG. 2, the processor 21 references the {Association Information} whose {Content ID} is {tr04c01} in FIG. 3C. Then, the processor 21 acquires {tr01c01}, which is the identification information of the first content, as the {Association Information}. Then, the processor 21 references the content information D3 of the first Talkroom illustrated in FIG. 3B, and acquires the {Contents} corresponding to {tr01c01} under {Content ID}. The processor 21 generates the second Talkroom image T2 including the citation content Q5 by arranging the {Contents} acquired from the content information D3 of the first Talkroom illustrated in FIG. 3B as the first content, and the {Contents} acquired from the content information D3 of the second Talkroom illustrated in FIG. 3C as the second content, according to a desired (or alternatively, predetermined) positional relationship. By controlling the display 28, the processor 21 displays the second Talkroom image T2 on the display region 28A.

The {Association Information} is not limited to the format illustrated in FIGS. 3(B) and 3(C). For example, without limitation, the information relating to the first content may include information other than the identification information of the first content. For example, the {Association Information} of the second content may include the entire first content, and/or may include information obtained by processing the first content. The information obtained by processing the first content is information generated on the basis of the first content, and may be, for example, information obtained by extracting a portion of the first content, or information obtained by compressing the first content.

For example, without limitation, the storage 13 of the server 10 illustrated in FIG. 1 stores the content information D7 and the Talkroom information D8. For example, without limitation, the Talkroom information D8 is information including the Talkroom information D2 of each of a plurality of terminals 20. For example, the Talkroom information D8 includes the Talkroom information D2 associated with the terminal 20A or the user A thereof, and the Talkroom information D2 associated with the terminal 20B or the user B thereof.

For example, without limitation, the content information D7 may include information of a content transmitted by each of a plurality of terminals 20. For example, the content information D7 is information including the content information D3 of each of the plurality of terminals 20. For example, without limitation, in cases of receiving a content transmitted from a terminal 20, the server 10 temporarily stores the received content in the storage 13. For example, without limitation, the server 10 checks the destination of the received content against the Talkroom information D8, to specify the users included in the destination Talkroom. For example, without limitation, the server 10 sets the terminals 20 of the specified users as the transmission destinations, and transmits (e.g., delivers) the content. As described above, for example, without limitation, the terminal 20 transmits, via the server 10, a content to terminals 20 associated with the destination Talkroom. For example, without limitation, in cases of receiving the content transmitted by the server 10, each terminal 20 transmits a reception notification. For example, without limitation, in cases of receiving the reception notification transmitted by the terminal 20, the server 10 deletes the content associated with the reception notification from the content information D7.

The server 10 may store contents received from the terminals 20 for a discretionary (or alternatively, certain) period of time. The server 10 may delete, according to an instruction from a user, at least a portion of the contents of a Talkroom including the user from the storage 13. The server 10 may not delete the contents received from the terminals 20 from the storage 13.

For example, without limitation, in cases of transmitting the second content, the terminal 20 generates a citation content including at least a portion of the first content, the identification information of the first content, and the second content. For example, without limitation, the terminal 20 generates the citation content via the processor 21, and transmits the citation content generated by the processor 21 via the communication I/F 22.

In the following description, the terminal 20 that transmits the second content is referred to as a first terminal, and the terminal 20 that displays the second Talkroom image including the second content transmitted by the first terminal is referred to as a second terminal, as appropriate. In FIG. 2, the second terminal is the first terminal. According to some example embodiments, however, the second terminal may be a terminal 20 other than the first terminal and used by a user included in the second group.

For example, without limitation, the information relating to the first content may include information for specifying the first content in the messaging service. For example, without limitation, the information for specifying the first content is the identification information of the first content. For example, without limitation, a device retaining the first content may reproduce at least a portion of the first content on the basis of the identification information of the first content. For example, without limitation, the identification information of the first content Q1 in FIG. 2 is {tr01 c01} in the content information D3 illustrated in FIG. 3(B), and a device retaining the first content may reproduce the first content Q1 by acquiring "How about holding an event?" as the content whose {Content ID} is {tr01c01}. For example, without limitation, the device retaining the first content may be one or a combination of two or more of the terminal 20 transmitting the information relating to the first content, the server 10 receiving the information relating to the first content, a terminal 20 receiving the information relating to the first content via the server 10, and/or a device other than the aforementioned devices.

It should be noted that the terminal 20 may not transmit the citation content. For example, without limitation, the server 10 may store the content information D7 including the first content in the storage 13, and the terminal 20 may transmit the identification information of the first content as the information relating to the first content. For example, without limitation, in cases of receiving the identification information transmitted by the terminal 20, the server 10 may acquire the first content from the content information D7 stored in the storage 13 on the basis of the received identification information.

For example, without limitation, the server 10 may transmit at least a portion of the first content, the identification information of the first content, and the second content. For example, without limitation, in cases of receiving at least a portion of the first content, the identification information of the first content, and the second content as transmitted from the server 10, the terminal 20 may generate a citation content (for example, the content Q5 in the lower-right diagram of FIG. 2) on the basis of such information. The terminal 20 may display, on the display region 28A, an image of a Talkroom including the generated citation content.

For example, without limitation, the server 10 may generate the citation content (e.g., the citation content Q5 in the lower-right diagram of FIG. 2) as information including at least a portion of the first content, the identification information of the first content, and the second content. The server 10 may transmit the generated citation content to, as destinations, the terminals 20 of users included in the second group.

A terminal 20 that received the second content may display, on the display region 28A, the second content and at least a portion of the first content in a format different from the citation content (e.g., the citation content Q5 in the lower-right diagram of FIG. 2). For example, without limitation, the terminal 20 that received the second content may display at least a portion of the first content (for example, the content Q8 in the lower-right diagram of FIG. 2) and the second content independently as a single content on the display region 28A. For example, without limitation, the terminal 20 may arrange the first content and the second content separately in the second Talkroom image. For example, without limitation, the terminal 20 may arrange at least a portion of the first content in a first frame and arrange the second content in a second frame that is different from the first frame, and arrange the first and second frames according to a desired (or alternatively, predetermined) positional relationship. For example, without limitation, the terminal 20 may arrange the first frame, which includes at least a portion of the first content, and the second frame, which includes the second content, so as to line up the first frame and the second frame in a desired (or alternatively, predetermined) direction (for example, the longitudinal direction) in the Talkroom image.

In cases where the content includes an image, the image may be included in the Talkroom image in a compressed form, or may be included in the Talkroom image in a non-compressed form. In cases where the content includes an image, the terminal 20 may, for example, without limitation, display a Talkroom image including a thumbnail obtained by compressing the image in the content, and may display an image (e.g., the original image) having a larger amount of information than the thumbnail on the basis of an input made to the thumbnail. In cases where the content includes audio, the terminal 20 may, for example, without limitation, display a Talkroom image including an icon for reproducing the audio as the content.

Figure 4:
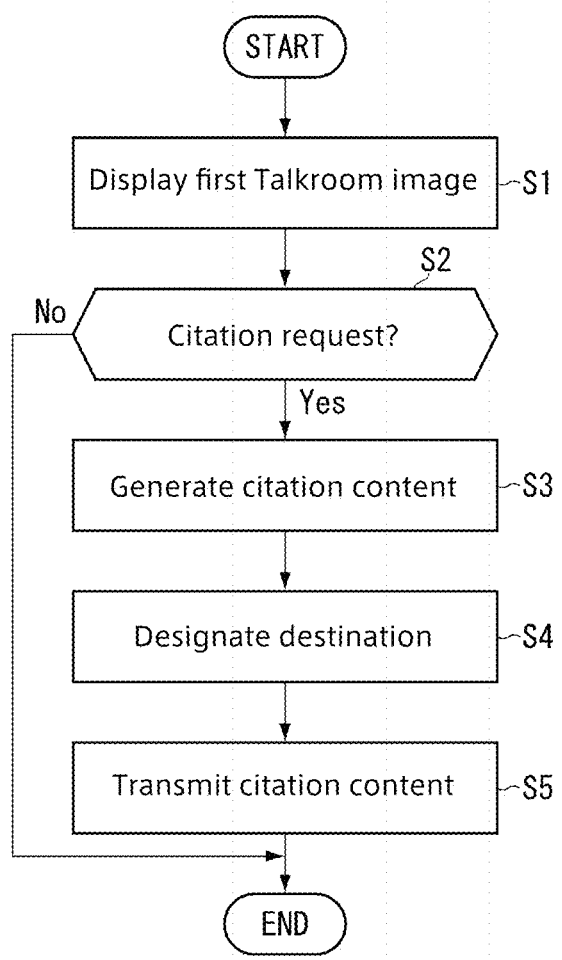
FIG. 4 is a flowchart illustrating an information processing method according to the first example embodiment.

A flow of an information processing method according to an first example embodiment will be described according to the configuration of aforementioned communication system 1 with reference to FIGS. 4 to 8. FIG. 4 is a flowchart illustrating an information processing method according to the first example embodiment.

For example, without limitation, when an application for the messaging service is activated, the terminal 20 displays a Talkroom list image TL on the display region 28A, as illustrated in the upper-left diagram of FIG. 2. For example, without limitation, the processor 21 reads out the Talkroom information D2 (see FIG. 3A) stored in the storage 24, and generates the Talkroom list image TL. Then, the processor 21 controls the display 28 so as to make the display 28 display the image TL. In case where the user selects a Talkroom via the input unit 23A, the processor 21 displays an image of the Talkroom on the display region 28A. In this example, a Talkroom selected by the user is considered as the first Talkroom.

In operation S1, the terminal 20 displays an image of the first Talkroom. For example, without limitation, the processor 21 generates the first Talkroom image T1 as illustrated in the upper-right diagram of FIG. 2 on the basis of the Talkroom information D2 and the content information D3 stored in the storage 24. For example, on the basis of the Talkroom information D2 illustrated in FIG. 3A, the processor 21 specifies {List 1} as the content information corresponding to the first Talkroom. Further, the processor 21 reads out the {List 1} illustrated in FIG. 3B from among the content information D3 stored in the storage 24. The processor 21 then generates the first Talkroom image T1 in which the contents defined in the {List 1} are arranged according to a desired (or alternatively, predetermined) positional relationship. The processor 21 then controls the display 28 to display the first Talkroom image T1 on the display region 28A.

Figure 5:
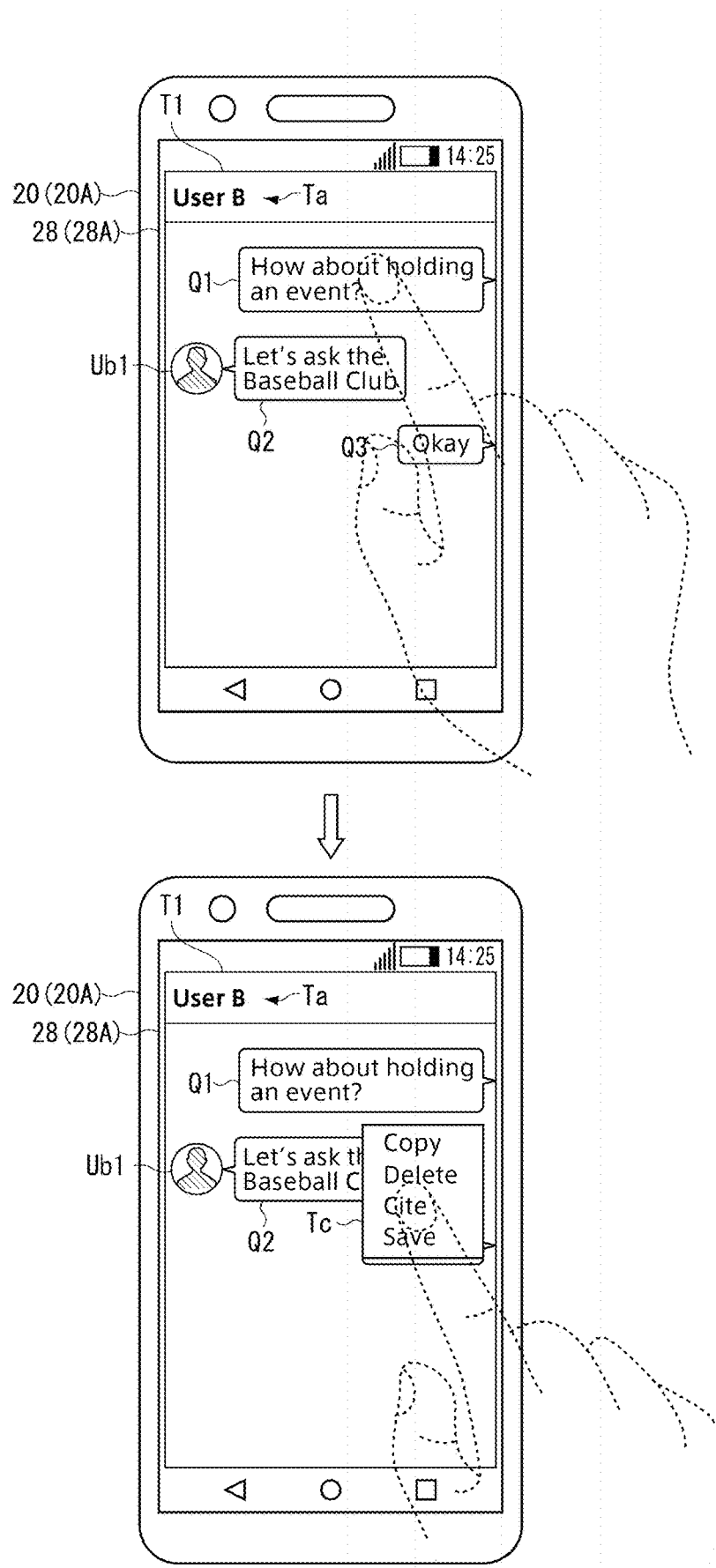
FIG. 5 is a diagram illustrating processes for accepting a citation request.

In operation S2, the terminal 20 determines whether or not there is a request for citation. FIG. 5 is a diagram illustrating an example of processes for accepting a citation request. The terminal 20 accepts an input by a user to the first Talkroom image T1. In FIG. 5, the display region 28A is a portion of a touch panel, and the user can input various types of information into the terminal 20 by operating the input device 25 (see FIG. 1) superposed on the display region 28A. For example, without limitation, in case where it is detected that the content Q1 displayed on the display region 28A has been long-pressed (e.g., pressed for more than a threshold time) as illustrated in the upper diagram of FIG. 5, the processor 21 displays a command window (e.g., a popup window) Tc on the display region 28A as illustrated in the lower diagram of FIG. 5. In FIG. 5, {Copy}, {Delete}, {Cite}, and {Save} are icons of commands for executing desired (or alternatively, predetermined) processes in relation to the selected content (the content Q1 in this example). For example, without limitation, in case where it is detected that the {Cite} icon has been tapped as illustrated in the lower diagram of FIG. 5, the processor 21 determines that there is a request for citation.

It should be noted that the process for accepting a citation request is not limited to the example illustrated in FIG. 5. For example, in the lower diagram of FIG. 5, the terminal 20 displays a command window Tc (or alternatively, referred to as a command list or a menu) in which a plurality of command icons are lined up, but only the command icon for {Cite} may be displayed. In some example embodiments, the terminal 20 may not display the {Cite} icon, but determine that there is a request for citation when, for example, it is detected that the content Q1 has been tapped. Further, the input device 25 may not be the operation unit of the touch panel. For example, in cases where the input device 25 is a mouse, the user may move the pointer within the display region 28A onto the content Q1 by operating the mouse, and click the mouse to select the content or display a command. Further, in the upper diagram of FIG. 5, the icon used for inputting a citation request is displayed by the user operation to the input device 25, but the icon may be displayed on the display region 28A in advance. In some example embodiments, the terminal 20 may accept a citation request through a device other than the input device 25. For example, the terminal may accept a citation request through audio input using the microphone 26.

Returning to the explanation of FIG. 4, in case where the processor 21 determines that there is a citation request in operation S2 (operation S2: Yes), the terminal 20, for example, without limitation, generates citation content in operation S3. Then, the terminal 20 designates or sets the destination of the citation content in operation S4, and transmits the citation content in operation S5. In case where the processor 21 determines that there is no citation request in operation S2 (operation S2: No), or after the process of operation S5, the terminal 20 ends the series of processes relating to the transmission of the second content and the information relating to the first content. Below, an example of processes after operation S2 will be described with reference to FIGS. 6 to 8.

Figure 6:
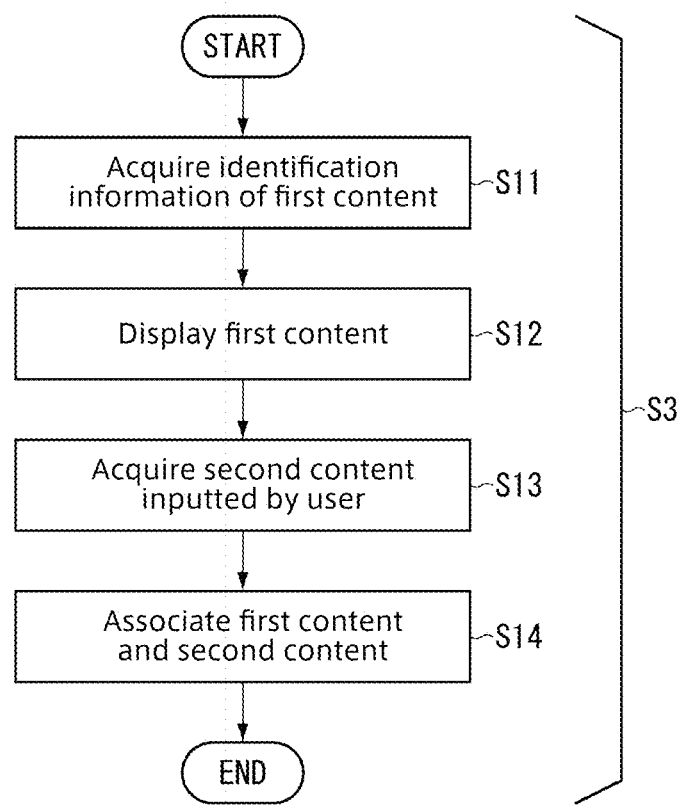
FIG. 6 is a flowchart illustrating processes relating to the generation of a citation content.
Figure 7A:
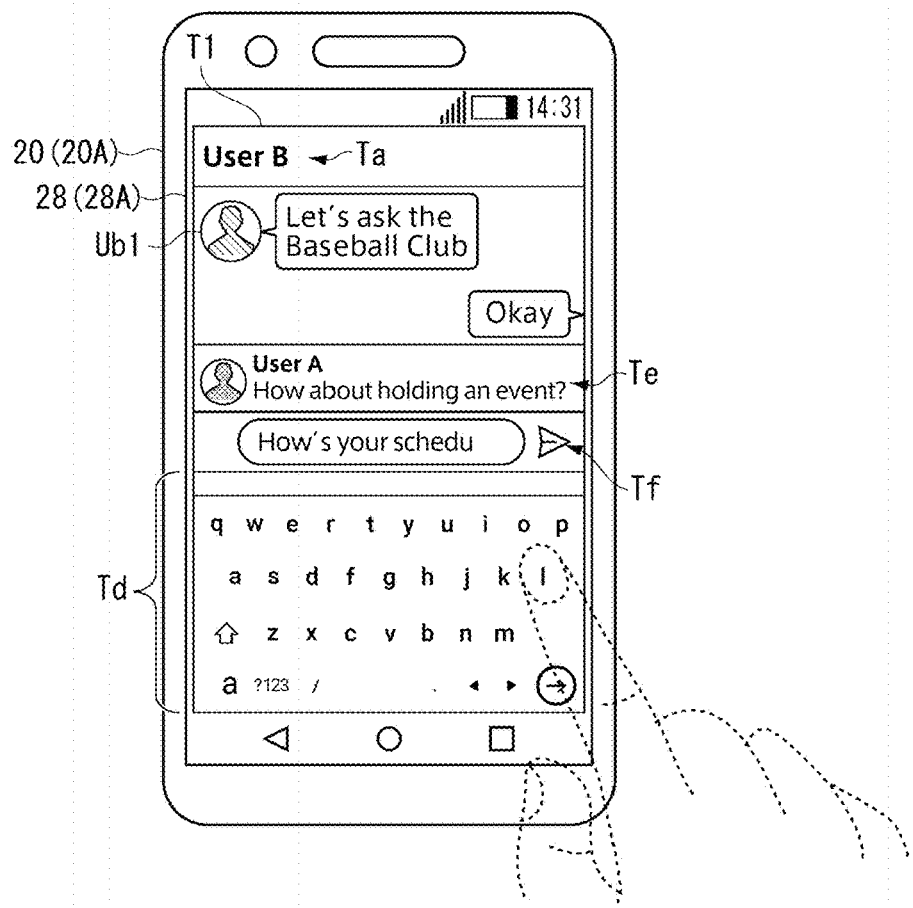
FIG. 7A is a diagram illustrating processes relating to the generation of a citation content.
Figure 7B:
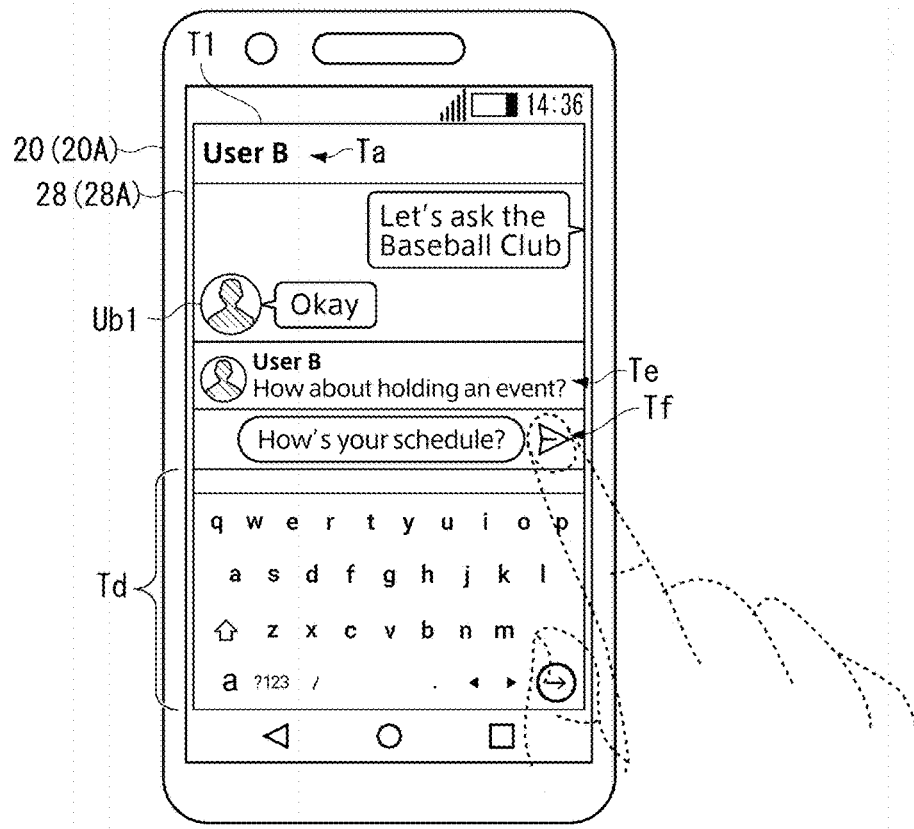
FIG. 7B is a diagram illustrating processes relating to the transmission of a citation content.
Figure 8A:
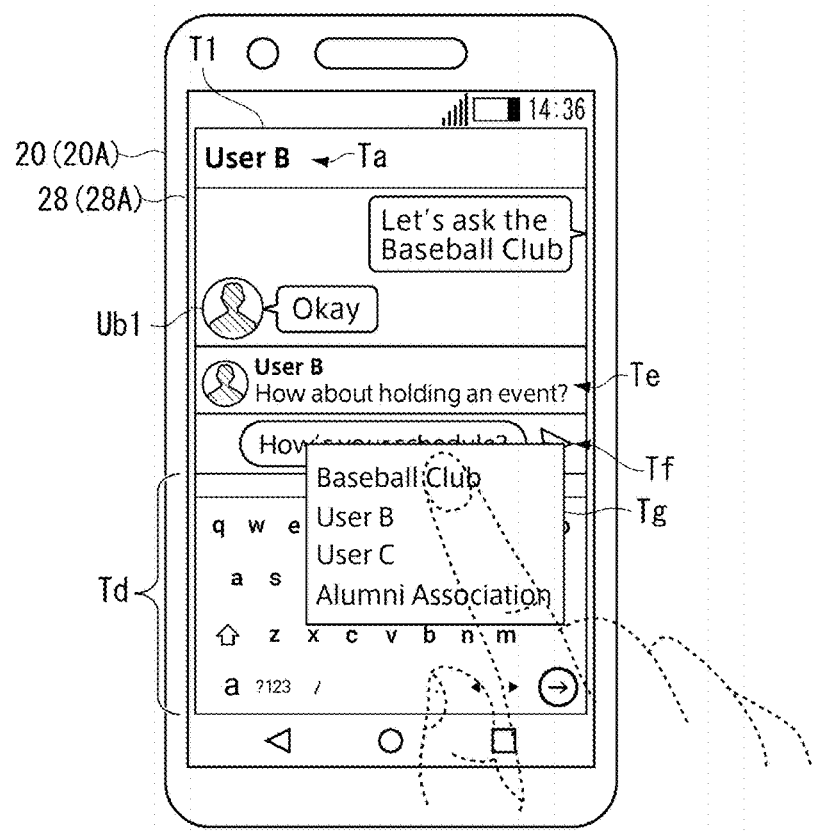
FIG. 8A is a diagram illustrating processes relating to setting a destination of the citation content.
Figure 8B:
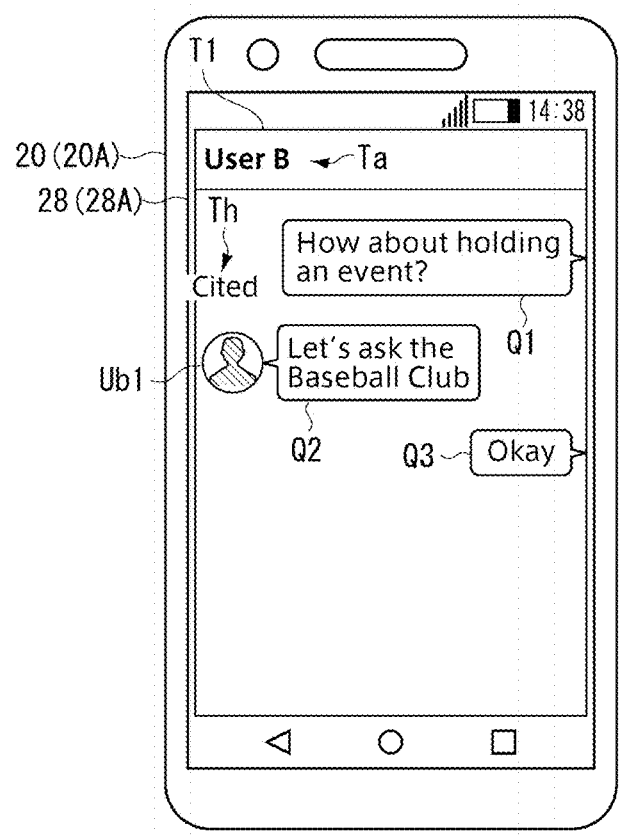
FIG. 8B is a diagram illustrating processes after the transmission of the citation content.

FIG. 6 is a flowchart illustrating an example of processes relating to the generation of a citation content. FIG. 7A is a diagram illustrating an example of processes relating to the generation of citation content, and FIG. 7B is a diagram illustrating an example of processes relating to the transmission of the citation content. FIG. 8A is a diagram illustrating an example of processes relating to setting a destination of the citation content, and FIG. 8B is a diagram illustrating an example of processes after the transmission of the citation content.

The processes in operations S11 to S14 illustrated in FIG. 6 correspond to the process in operation S3 illustrated in FIG. 4. In operation S11, the processor 21 acquires the identification information of the first content. For example, without limitation, in case where it is detected that the {Cite} icon has been tapped after the content Q1 has been selected as illustrated in the upper diagram of FIG. 5, the processor 21 acquires the identification information of the content Q1. In operation S12, the processor 21 displays the first content on the display region 28A on the basis of the identification information of the first content acquired in operation S11. For example, without limitation, in operation S11, the processor 21 acquires tr01c011 as illustrated in FIG. 3B as the identification information of the first content, and specifies "How about holding an event?", which is the {Content} corresponding to tr01c011, as the first content. Then, as illustrated in FIG. 7A, the processor 21 displays a software keyboard Td on the display region 28A, and also arranges an information window Te according to a desired (or alternatively, predetermined) positional relationship with respect to the software keyboard Td and arranges at least a portion of the specified first content in the information window Te. The user can input the second content with the software keyboard Td while referencing the first content shown in the information window Te.

In operation S13 of FIG. 6, the terminal 20 acquires the second content inputted by the user. For example, the input unit 23A detects the input from the user, and the processor 21 acquires, from the input unit 23A, the information inputted by the user. Then, in operation S14, the terminal 20 associates the first content and the second content. For example, the processor 21 associates the first content and the second content by registering the identification information of the first content acquired in operation S11 into the association information of the second content. For example, in the content information D3 illustrated in FIG. 3C, the processor 21 registers {tr01c01}, which is the {Content ID} of the first content, into the {Association Information} of the content whose {Content ID} is {tr04c01}, which is the second content. For example, without limitation, the processor 21 generates a citation content by associating, as a set, at least a portion of the first content, the identification information of the first content, and the second content.

As illustrated in FIG. 7B, after the user completes inputting the second content, the user transmits the second content via the terminal 20. Reference sign Tf in FIG. 7B indicates an icon for a command to execute transmission. By using the icon Tf, the user can transmit the second content. For example, without limitation, in case where it is detected that the icon Tf has been long-pressed (e.g., pressed for more than a threshold time), the terminal 20 displays a list Tg indicating candidates for the second group (e.g., a destination of the second content) on the display region 28A, as illustrated in FIG. 8A. For example, without limitation, the candidates for the second group are groups associated with the identification information of the subject terminal or of the user thereof. For example, the candidates for the second group are groups including the user of the subject terminal. For example, without limitation, by referencing the Talkroom information D2, the processor 21 displays the list Tg of the candidates for the second group so as to line up the names of Talkrooms included in the Talkroom information D2.

For example, without limitation, the candidates for the second group are displayed on the display region 28A so that the candidates are lined up in order based on information relating to the respective groups of the candidates for the second group. For example, as the information relating to the respective groups of the candidates for the second group, the processor 21 uses the history information D4 stored in the storage 24. For example, the processor 21 generates the list Tg on the basis of the timing at which each Talkroom was used. For example, the processor 21 generates the list Tg so as to line up the names of the Talkrooms included in the Talkroom information D2 in descending order from the Talkroom used most recently.

It should be noted that the order according to which the names of the Talkrooms are lined up in the list Tg is not limited to the aforementioned example. For example, the processor 21 may generate the list Tg on the basis of the frequency at which each Talkroom is used. For example, the processor 21 may generate the list Tg so as to line up the names of the Talkrooms included in the Talkroom information D2 in descending order from the Talkroom used most frequently. In some example embodiments, the order according to which the names of the Talkrooms are lined up in the list Tg may be set in advance by the user.

In the example of FIG. 8A, the user sets a destination from the list Tg. For example, without limitation, the user can set a destination by tapping the name of a Talkroom, as to which the second content is to be transmitted, in the list Tg displayed in the display region 28A. The terminal 20 designates the Talkroom set by the user as the destination, and transmits the citation content. In this example, {Baseball Club} has been set as the destination. The processor 21 of the terminal 20 controls the communication I/F 22, and transmit the citation content destined for {Baseball Club} to the server 10 as the transmission destination.

For example, without limitation, in case where the information relating to the first content Q1 is transmitted, the terminal 20 displays, on the display region 28A, the first image including information indicating that the information relating to the first content Q1 has been transmitted. In FIG. 8(B), the first Talkroom image T1 corresponds to the first image, and reference sign Th corresponds to the information indicating that the information relating to the first content Q1 has been transmitted. In the example of FIG. 8(B), the information Th is a text stating {Cited}. For example, without limitation, the processor 21 of the terminal 20 generates the first Talkroom image T1 including the information Th arranged at a desired (or alternatively, predetermined) positional relationship with respect to the first content Q1. The processor 21 controls the display 28 so as to display the generated first Talkroom image T1 on the display region 28A. In the present example embodiment, the program P2 stored in the storage 24 of the terminal 20 is an information processing program to be executed by a terminal of a user who is included in a first group including a plurality of users and in a second group including a plurality of users. The information processing program causes displaying a first image including contents transmitted and received among terminals corresponding to the first group on a display region of the terminal, and transmitting, (1) information relating to a first content among the contents included in the first image displayed on the display region, and (2) a second content inputted at the terminal, via the communication interface 22 of the terminal 20. The second content is associated with the first content and is included in a second image including contents transmitted and received among terminals corresponding to the second group. The program P2 causes the processor 21 (e.g., a CPU) of the terminal 20 to execute displaying a first image including contents transmitted and received among terminals corresponding to the first group on a display region of the terminal, and transmitting (1) information relating to a first content among the contents included in the first image displayed on the display region and (2) a second content inputted via the terminal, via a communication unit of the terminal.

In the present example embodiment described above, the terminal 20 transmits (1) information relating to a first content among the contents included in the first image displayed on the display region 28A and (2) a second content inputted at the terminal 20, via the communication interface 22 of the terminal 20. The second content is associated with the first content, and is included in a second image including contents transmitted and received among terminals corresponding to the second group. Thus, users in the second group can acquire, in the second image, information relating to the first content (e.g., at least a portion of the first content). In this way, the information processing method according to the present example embodiment facilitates sharing of information between the first and second groups. Thus, the information processing method according to the present example embodiment can reduce users' workloads when the users gather information, thereby contributing to improvement in the users' convenience. Further, the information processing method according to the present example embodiment contributes to reduction in the load on the terminal 20 when a user gathers information using the terminal 20.

In the present example embodiment, the second image includes, for example, without limitation, the second content, and at least a portion of the first content associated with the second content. In this case, a user viewing the second image can obtain at least a portion of the first content, and the second content, and can thus easily grasp the correlation (or the context) between the first and second contents.

For example, without limitation, the terminal 20 displays candidates for the second group, and transmits the second content to the respective terminals 20 of the plurality of users included in the second group selected from the candidates for the second group. In this case, the user can select a destination from the displayed second group candidates, thereby convenience is improved. Further, in the present example embodiment, for example, without limitation, the candidates for the second group are associated with the identification information of the terminal 20 or of the user of the terminal 20, and are displayed on the display region 28A so that the candidates are lined up in order based on information relating to the respective groups of the candidates for the second group. This increases the possibility that the user can easily designate a destination, and thus the user's convenience is improved.

For example, without limitation, in case where the information relating to the first content is transmitted, the terminal 20 displays the first image including information indicating that the information relating to the first content has been transmitted on the display region. This allows the user of the terminal 20 that has transmitted the information relating to the first content to verify that the terminal 20 has operated normally. Further, in the first group, users other than the user of the terminal 20 that has transmitted the information relating to the first content can recognize that the information relating to the first content has been transmitted.

For example, without limitation, the terminal 20 displays the second Talkroom image on the display region 28A. In this information processing method, the second Talkroom image, which includes the second content, is displayed on the display region 28A of the terminal 20 that transmitted the second content and the information relating to the first content. Thus, the user of this terminal 20 can verify the transmitted second content by looking at the second Talkroom image. This improves the user's convenience.

For example, without limitation, the second content includes at least one or a combination of a text, an image, or audio inputted via the input unit 23A of the terminal 20. A text can describe information (e.g., a comment or schedule) with a smaller amount of data than images and/or audio. Thus, in cases where the second content includes a text, the information processing method can, for example, reduce the amount of communication of the terminal 20. Further, for example, without limitation, images and/or audio have a larger amount of information compared to text, and can, for example, express information which is difficult to describe with a text. Thus, in cases where the second content includes an image and/or audio, the information processing method can convey the second content with greater expressiveness, and can thus contribute to improving the users' convenience.

For example, without limitation, in case where transmission of the second content is permitted, the terminal 20 generates the second Talkroom image on the basis of the first content and the second content inputted via the input unit 23A of the terminal 20. In this information processing method, the terminal 20 generates the second Talkroom image, and thus the second Talkroom image can be displayed more promptly on the display region 28A compared to cases where, for example, the second Talkroom image is acquired from outside the terminal 20 via communication etc. Thus, this information processing method can, for example, improve the user's convenience and reduce the amount of communication of the terminal 20.

Although the information processing method according to the present example embodiment includes processes of operations S2 to S4 in FIG. 4, at least a portion of the processes of operations S2 to S4 may not be included. For example, without limitation, the destination of the information relating to the first content may be set in advance. In such a case, the terminal 20 may skip operation S4. In some example embodiments, at least a portion of the processes of operations S2 to S4 may be executed by a device (e.g., a cloud computer) that is external to the terminal 20.

At least a portion of operations S2 to S4 may be a portion of a series of processes for transmitting the information relating to the first content and the second content. Further, the order of operations S2 to S4 may be changed. For example, the citation content may be generated after the destination is designated in operation S4. Further, in cases where a Talkroom other than the first Talkroom is designated as the destination in operation S4, the terminal 20 may consider such designation as a request for citing the content to another Talkroom.

In the content Q5 in the lower-right diagram of FIG. 2, the citation content displayed on the display region 28A is a set of contents including at least a portion of the first content and the second content. The format, however, is not limited thereto. For example, the citation content may take a format in which a content including at least a portion of the first content is arranged and displayed separately from the second content. For example, the terminal 20 may display a Talkroom image in which at least a portion of the first content and the second content are arranged independently as a single content. In this case, at least a portion of the first content may or may not be arranged in the longitudinal direction of the second Talkroom image T2 with respect to the second content.

Second Example Embodiment

Figure 9:
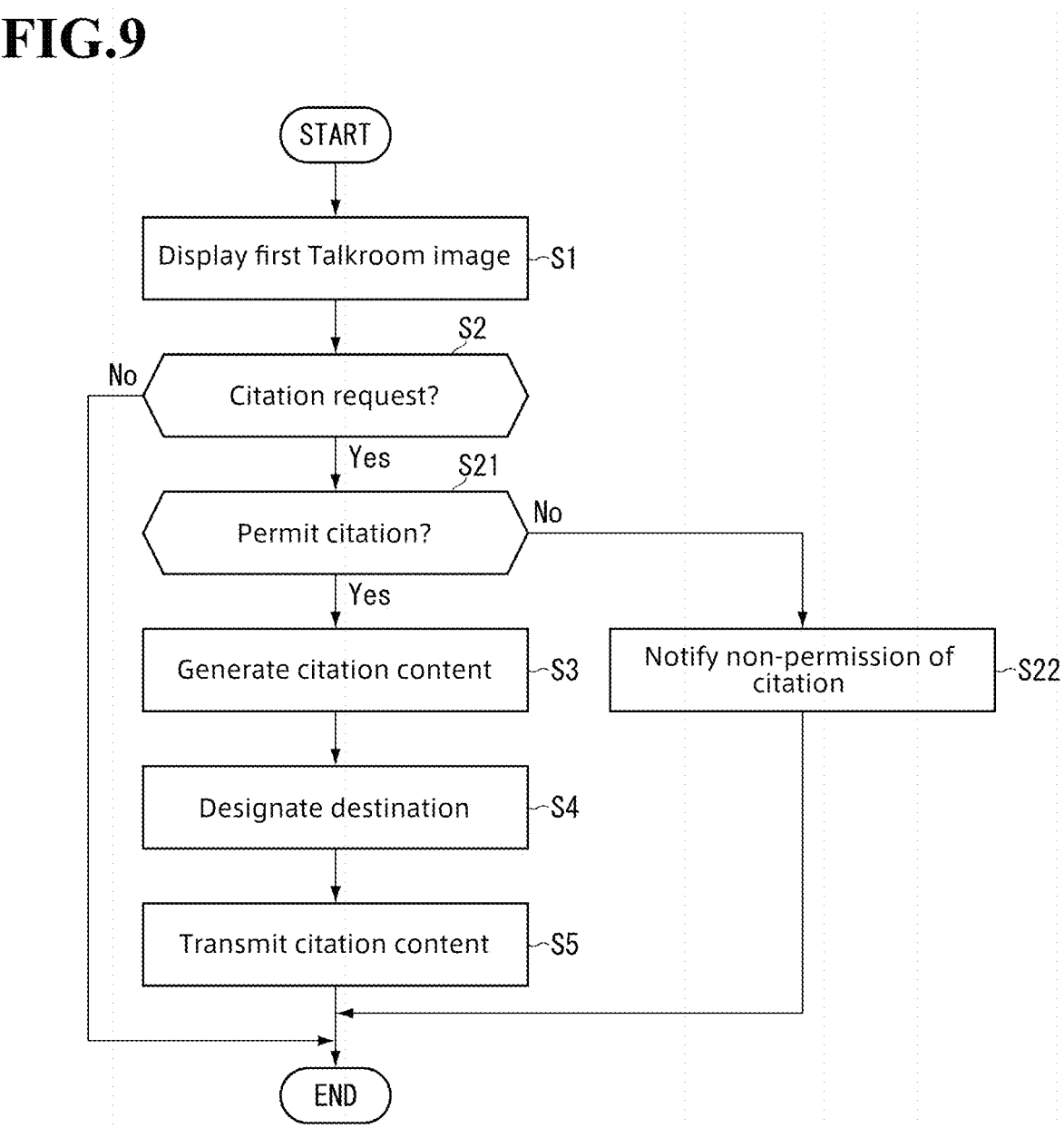
FIG. 9 is a flowchart illustrating an information processing method according to a second example embodiment.

FIG. 9 is a flowchart illustrating an information processing method according to a second example embodiment. First, an overview of this example embodiment will be described. This example embodiment is, for example, without limitation, a configuration in which citation of a content satisfying a desired (or alternatively, predetermined) condition is permitted. For example, without limitation, the terminal 20 transmits a citation content in cases where citation is permitted, and does not transmit a citation content in cases where citation is not permitted. The desired (or alternatively, predetermined) condition is, for example, without limitation, that the user who has transmitted the content to be cited is equivalent to the user of the terminal 20. For example, without limitation, the user is allowed to transmit, via the terminal 20, a content citing a content that has been inputted via the user's terminal 20 among contents included in a first Talkroom, to a second Talkroom as the destination. For example, in case where the user who has transmitted the first content is equivalent to the user of the subject terminal, the processor 21 controls the communication I/F 22 to transmit information (for example, without limitation, citation content) including the information relating to the first content.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

In FIG. 9, the processes of operations S1 and S2 are the same as those in FIG. 4. Therefore, explanation thereon is omitted or simplified. In cases where the processor 21 of the terminal 20 determines that there is a citation request in operation S2 (operation S2: Yes), the processor 21 of the terminal 20 determines whether or not to permit transmission of the information relating to the first content in operation S21. For example, without limitation, in cases where the user who has transmitted the first content is equivalent to the user of the terminal 20, the processor 21 determines that transmission of the information relating to the first content is permitted (operation S21: Yes).

For example, without limitation, the processor 21 executes the process of operation S21 by referencing the content information D3 illustrated as an example in FIG. 3(B). For example, in cases where the {Content ID} of the first content selected by the user is {tr01c01}, the processor 21 references the {Transmission User ID} corresponding to {tr01c01} and acquires the user ID of the user who has transmitted the first content. Then, the processor 21 compares the user ID of the user who has transmitted the first content with the user ID of the user of the terminal 20, and determines that transmission of the information relating to the first content is permitted in case where both user IDs match. For example, in case where a content whose {Content ID} is {tr01c01} is selected as the first content by the terminal 20A of user A, the processor 21 of the terminal 20A determines that transmission of the information relating to the first content is permitted, because the {Transmission User ID} corresponding to {tr01c01} matches the user ID of the user A of the terminal 20. In case where a content whose {Content ID} is {tr01c02} is selected as the first content by the terminal 20A of user A, the processor 21 of the terminal 20A determines that transmission of the information relating to the first content is not permitted, because the {Transmission User ID} corresponding to tr01c021 does not match the user ID of the user A of the terminal 20.

For example, without limitation, in cases where it is determined that transmission of the information relating to the first content is permitted (operation S21: Yes), the processor 21 executes the processes of operations S3 to S5 and transmits the information relating to the first content and the second content. The processes of operations S3 to S5 are the same as those in FIG. 4. Therefore, explanation thereon is omitted. For example, without limitation, in cases where it is determined that transmission of the information relating to the first content is not permitted (operation S21: No), the processor 21 notifies non-permission of citation in operation S22. For example, the processor 21 notifies non-permission of citation to the user by controlling the display 28 to display an image including a message such as "Cannot cite" in the display region 28A.

The processor 21 may notify non-permission of citation by making the speaker 29 output audio expressing non-permission of citation. In some example embodiments, the processor 21 may notify non-permission of citation in a manner (for example, vibration of the terminal 20 and/or light-up/blinking of a lamp) being different from audio or images. In some example embodiments, the processor 21 may not execute the process of operation S22.

After executing the process of operation S5, or after executing the process of operation S22, the terminal 20 ends the series of processes relating to the transmission of the information relating to the first content.

For example, without limitation, the terminal 20 transmits, via the communication unit, the information relating to the first content in cases where the user who has transmitted the first content is equivalent to the user of the terminal 20. Thus, this information processing method can reduce the possibility that the information relating to the first content is unintentionally transmitted in cases where the user who has transmitted the first content is different from the user of the terminal 20.

For example, without limitation, the processor 21 of the terminal 20 determines whether or not to permit transmission of the information relating to the first content. In this information processing method, since the terminal 20 transmitting the second content determines whether or not to permit transmission of the information relating to the first content, the determination result can be obtained promptly. Thus, the terminal 20 can transmit the information relating to the first content and the second content more promptly compared, for example, without limitation, to cases where the determination is made outside the terminal 20, and thus, the user's convenience is improved.

Further, for example, without limitation, the terminal 20 determines whether or not to permit citation in operation S21 before executing the processes of operations S3 and S4. Thus, in cases where the processor 21 determines that citation is not permitted (operation S21: No), the terminal 20 can skip the processes of operations S3 and S4, and thereby the load required for these processes can be reduced. It should be noted that the process of operation S21 only needs to be executed before the process of operation S5, and it may be executed after operation S3 or after the process of operation S4.

The terminal 20 may transmit the information relating to the first content on the basis of a condition different from the condition that the user who has transmitted the first content is equivalent to the user of the terminal 20. For example, without limitation, the terminal 20 may determine whether or not to permit transmission of the information relating to the first content on the basis of the type and/or data amount of the first content. For example, the terminal 20 may transmit the information relating to the first content in cases where the first content is a text, and may not transmit the information relating to the first content in cases where the first content is not a text. The condition according to which the terminal 20 transmits the information relating to the first content is not limited to the aforementioned examples, and will also be described in the following embodiments.

In cases where transmission of the information relating to the first content to the second Talkroom as the destination is not permitted, the terminal 20 may simply transmit the second content, without transmitting the information relating to the first content. In some example embodiments, the terminal 20 may not determine whether or not to permit transmission of the information relating to the first content to the second Talkroom as the destination. For example, without limitation, when the server 10 receives the information relating to the first content and the second content that have been transmitted from the terminal 20, the server 10 may determine whether or not to transmit, from the server 10, at least a portion of the received information to the terminals 20 of users included in the second group. In cases where it is determined not to transmit the information relating to the first content, which has been transmitted by the terminal 20, to the terminals 20 of users included in the second group, the server 10 may, for example, without limitation, transmit the second content without transmitting the information relating to the first content, or may not transmit the second content.

For example, without limitation, the terminal 20 may display a Talkroom image wherein a content for which citation is permitted is distinguished from a content for which citation is not permitted. In the following description, contents for which citation is permitted are referred to as first content candidates, as appropriate.

Figure 10A:
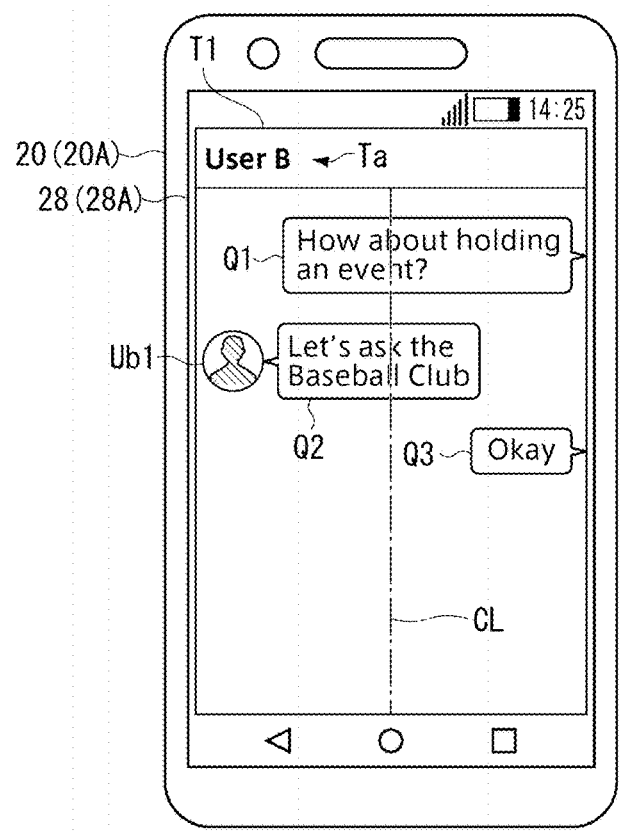
FIGS. 10A and 10B are diagrams illustrating processes relating to the displaying of first content candidates.
Figure 10B:
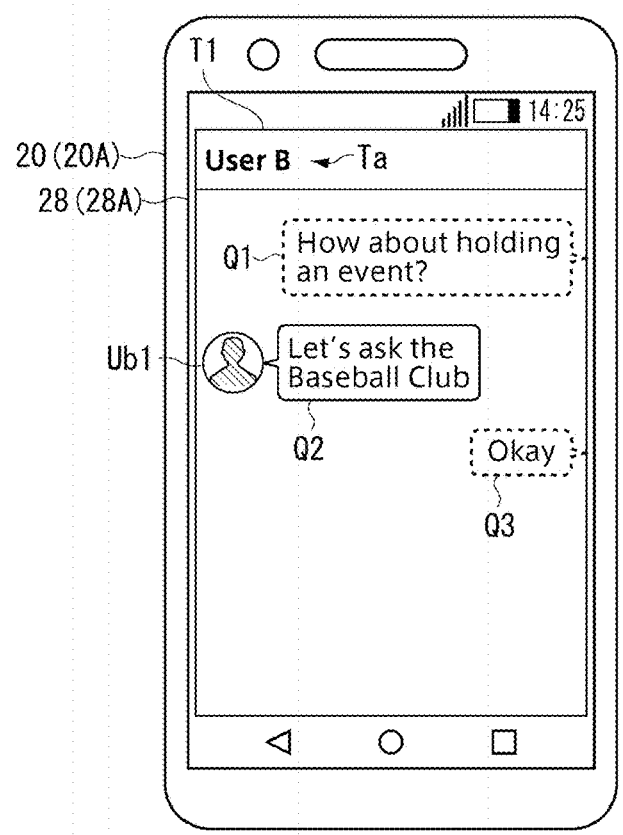

FIGS. 10A and 10B are diagrams illustrating processes relating to the displaying of first content candidates. In the first Talkroom image T1 of FIG. 10A, contents Q1 and Q3 are contents inputted by the user and transmitted by the terminal 20 thereof. The user who has transmitted the contents Q1 and Q3 is equivalent to the user of the terminal 20, and these contents are thus permitted for citation, and are therefore first content candidates. The content Q2 is a content transmitted from an object terminal, and is thus a content for which citation is not permitted because the user who has transmitted the content is different from the user of the terminal 20. The contents Q1 and Q3, which are first content candidates, are arranged according to a first positional relationship with respect to the first Talkroom image T1. Reference sign CL indicates the center line of the first Talkroom image T1. The aforementioned first positional relationship refers to a positional relationship toward one side with respect to the center line CL. For example, the contents Q1 and Q3 are arranged at positions toward the right side of the center line CL of the first Talkroom image T1. On the other hand, the content Q2—which is a content different from contents that are first content candidates—is arranged at a position toward the opposite side, with respect to the center line CL, from the contents which are first content candidates. It should be noted that the positional relationship between contents that are first content candidates and a content other than the contents that are first content candidates is not limited to the aforementioned example, and may be set discretionarily so that they can be distinguished from one another with the human eyes.

In the first Talkroom image T1 of FIG. 10B, contents in the first image that are first content candidates are displayed on the display region 28A in a manner different from a content other than the contents that are first content candidates. In FIG. 10B, contents in the first image that are first content candidates are contents Q1 and Q3, and a content other than the contents that are first content candidates is content Q2. For example, without limitation, each content is displayed as an item wherein the content body is placed within a frame (for example, a frame having a shape of a speech balloon). The contents that are first content candidates and the content other than the contents that are first content candidates are displayed in a manner such that the color and/or brightness of their frames are/is different between the two. For example, without limitation, the contents Q1 and Q3 have a first color (e.g., green) within their frames, whereas the content Q2 has a second color (e.g., white) different from the first color within its frame.

The contents that are first content candidates may differ from the content other than the contents that are first content candidates in terms of, for example, brightness within the frame, the color of the frame line, the thickness of the frame line, and/or the type of the frame line (e.g., solid line, dotted line). The difference in a display form between contents that are first content candidates and a content other than the contents that are first content candidates is not limited to the aforementioned examples, and may be set discretionarily so that they can be distinguished from one another with the human eyes.

In FIGS. 10A and 10B, the terminal 20 displays contents that are first content candidates and a content other than the contents that are first content candidates in a manner that they are distinguished from one another. In this case, the user can easily distinguish contents from which transmission of the information relating to the first content is permitted from a content for which transmission of the information relating to the first content is not permitted, and thus, the user's convenience is improved.

Third Example Embodiment

Figure 11:
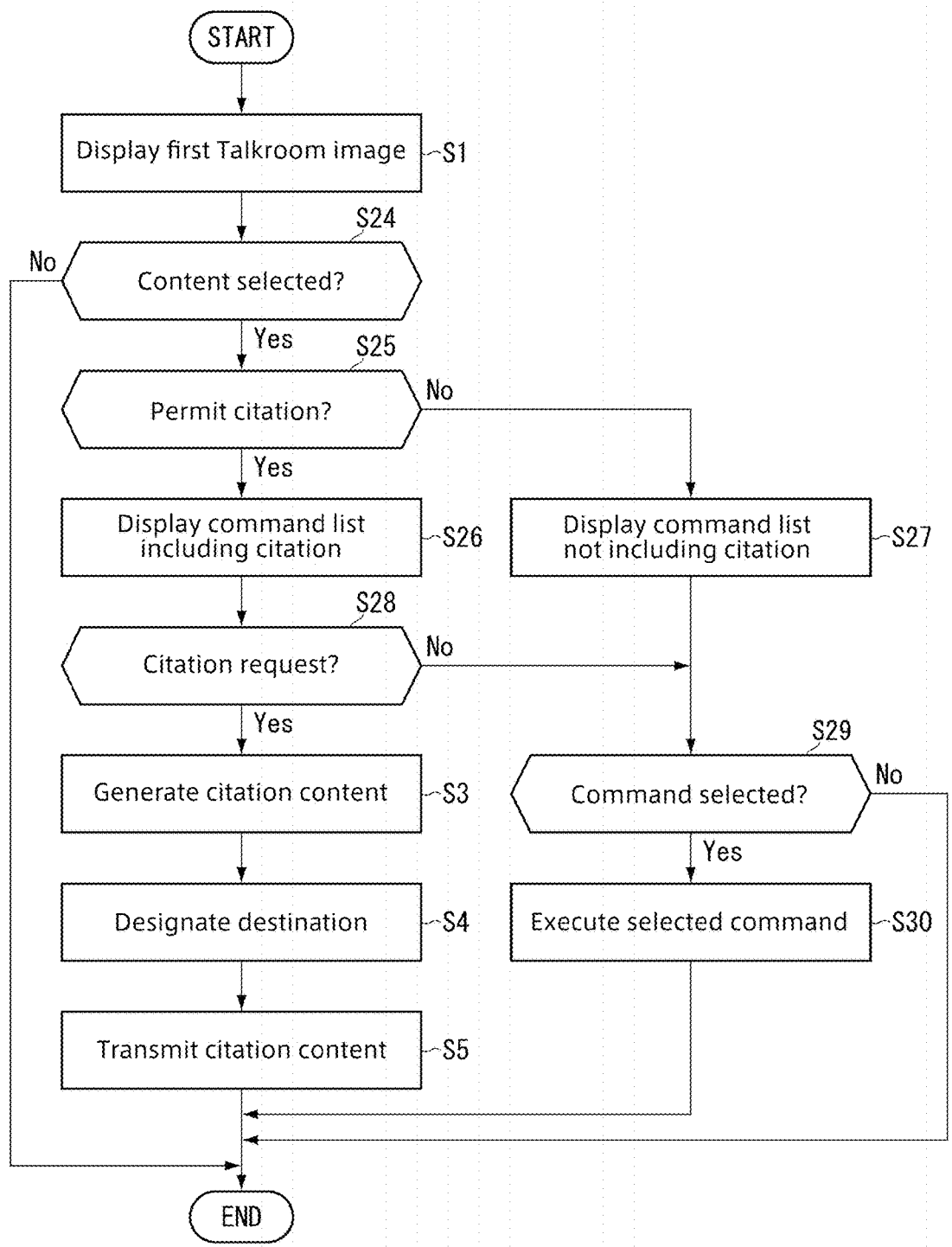
FIG. 11 is a flowchart illustrating an information processing method according to a third example embodiment.
Figure 12A:
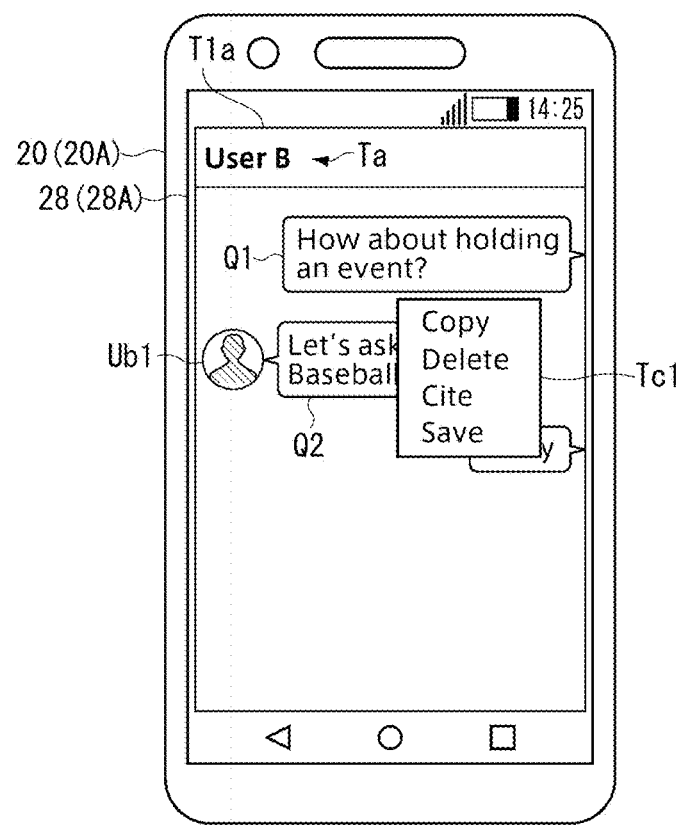
FIG. 12A is a diagram illustrating a process relating to displaying in cases where citation is permitted.
Figure 12B:
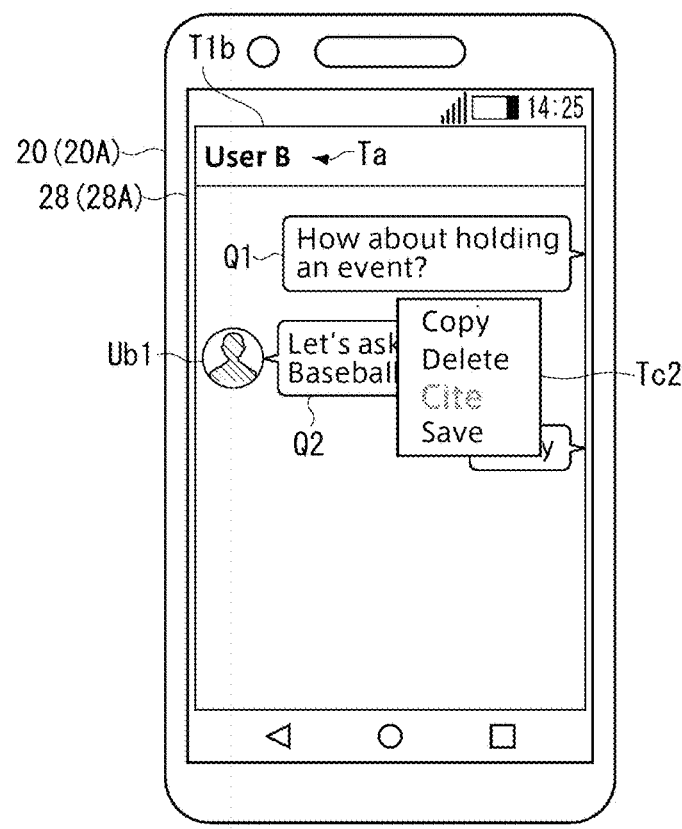
FIG. 12B is a diagram illustrating a process relating to displaying in cases where citation is not permitted.

FIG. 11 is a flowchart illustrating an information processing method according to a third example embodiment. First, an overview of this example embodiment will be described. The third embodiment is, for example, without limitation, a configuration wherein whether or not citation is permitted is determined before the second content is inputted. For example, without limitation, the terminal 20 generates a citation content in cases where citation is permitted, and does not generate a citation content in cases where citation is not permitted. FIG. 12A is a diagram illustrating a process relating to displaying in cases where citation is permitted. FIG. 12B is a diagram illustrating a process relating to displaying in cases where citation is not permitted. For example, without limitation, the terminal 20 displays the {Cite} icon, as illustrated in FIG. 12A, in cases where citation is permitted, and does not display the {Cite} icon, as illustrated in FIG. 12B, in cases where citation is not permitted.

Next, the present example embodiment will be described in further detail. The description on the present example embodiment is applicable to the other example embodiments as appropriate. In this example embodiment, features similar to those in the foregoing example embodiments are accompanied by the same reference signs and explanation thereon is omitted or simplified, as appropriate.

After displaying the first Talkroom image in operation S1, the terminal 20 determines whether or not a content has been selected in operation S24. For example, without limitation, in case where it is detected that the content Q1 in the first Talkroom image T1 displayed on the display region 28A has been long-pressed as illustrated in the upper diagram of FIG. 5, the processor 21 of the terminal 20 determines that the content Q1 has been selected. In cases where it is determined that a content has been selected (operation S24: Yes), the processor 21 determines whether or not to permit citation in operation S25. In cases where the processor 21 determines that citation is permitted for the content determined as being selected in operation S24 (operation S25: Yes), the processor 21 displays a command window including citation in operation S26. In cases where the processor 21 determines that citation is not permitted for the content determined as being selected in operation S24 (operation S25: No), the processor 21 displays a command window that does not include citation in operation S27.

In cases where citation is permitted, the processor 21 generates a first Talkroom image T1a including a command window Tc1 including a command (for example, {Cite} in the figure) for executing processes relating to citation, as illustrated in FIG. 12A. The processor 21 controls the display 28 to display the first Talkroom image T1a on the display region 28A. In FIG. 12A, {Copy}, {Delete}, {Cite}, and {Save} are icons of commands for executing desired (or alternatively, predetermined) processes in relation to the selected content (the content Q1 in this example). For example, by tapping one of the icons {Copy}, {Delete}, {Cite}, and {Save}, the user can make the terminal 20 execute processes assigned to the tapped icon.

In cases where citation is not permitted, the processor 21 generates a first Talkroom image T1b including a command window Tc2 that does not include a command for executing processes relating to citation, as illustrated in FIG. 12B. In FIG. 12B, the {Cite} icon is disabled. For example, without limitation, in cases where the {Cite} icon is tapped, the terminal 20 does not accept input of the {Cite} command. {Cite} does not function as an icon for inputting a command, but is displayed at a lower contrast compared to the other commands such as {Copy}, thereby visually showing that execution of the command is not possible. The terminal 20 may not display {Cite}. By tapping one of the active icons {Copy}, {Delete}, and {Save}, the user can make the terminal 20 execute processes assigned to the tapped icon.

Returning to the explanation of FIG. 11, after displaying the command window Tc1 including citation in operation S26, the terminal 20 determines whether or not there is a request for citation in operation S28. For example, without limitation, in case where it is detected that the {Cite} icon has been tapped as illustrated in FIG. 12A, the processor 21 determines that there is a request for citation. In case where the processor 21 determines that there is a citation request (operation S28: Yes), the terminal 20 transmits the information relating to the first content and the second content by executing the processes of operations S3 to S5. The processes of operations S3 to S5 are the same as those in FIG. 4. Therefore, explanation thereon is omitted.

For example, without limitation, in cases where it is detected that a section other than the {Cite} icon illustrated in FIG. 12A has been tapped, the processor 21 determines that there is no citation request (operation S28: No). The section other than the {Cite} icon may be, for example, without limitation, an icon other than the {Cite} icon, or a section outside the command window Tc1 in the display region 28A. In cases where it is determined that there is no citation request (operation S28: No) or after the process of operation S27, the processor 21 determines whether or not a command has been selected. In cases where it is detected that an icon indicating an available command has been tapped in the command window Tc1 illustrated in FIG. 12A or the command window Tc2 illustrated in FIG. 12(B), the processor 21 determines that a command has been selected (operation S29: Yes). In cases where the processor 21 has determined that a command has been selected (operation S29: Yes), the terminal 20 executes the selected command in operation S30. The terminal 20 ends the series of processes relating to the transmission of the second content and the information relating to the first content in any of the following cases, for example, in cases where the processor 21 has determined that no content has been selected in operation S24 (operation S24: No), after the process of operation S5, in cases where the processor 21 has determined that no command has been selected in operation S29 (operation S29: No), or after the process of operation S30.

For example, without limitation, in cases where information relating to a content transmitted/received among terminals corresponding to a first group is not permitted to be transmitted as a content to be transmitted/received among terminals corresponding to a second group different from the first group, the aforementioned terminal 20 does not accept input of a command for executing at least a portion of processes for transmitting the information relating to that content. In this case, the user is not inconvenienced by, for example, without limitation, being notified that transmission of the information relating to the first content is not permitted after inputting the second content, and thus, the user's convenience is improved. Further, the terminal 20 can skip processes relating to accepting input of a second content in relation to information relating to a content for which transmission is not permitted, and thus, processing loads can be reduced.

Fourth Example Embodiment

Figure 13:
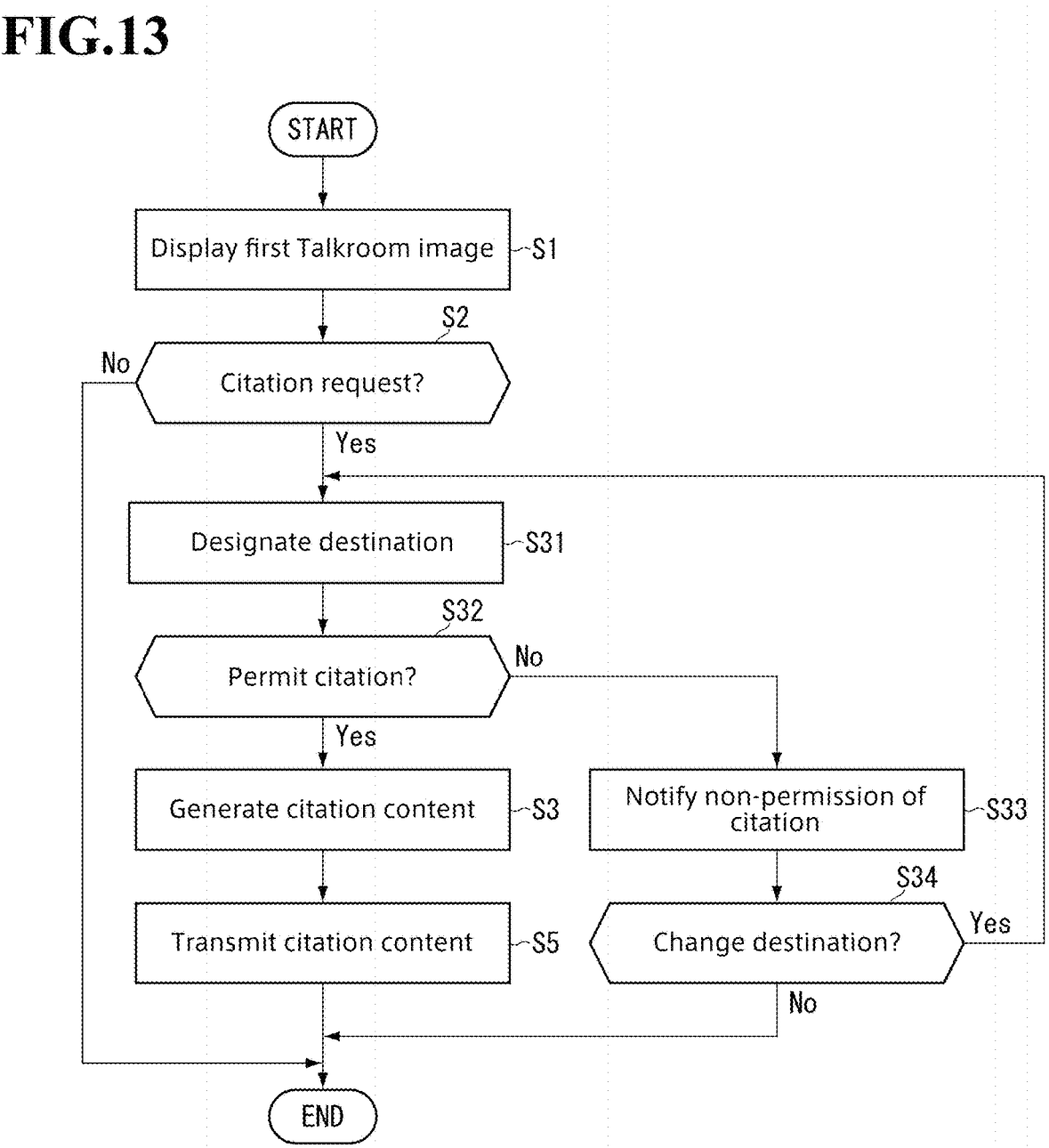
FIG. 13 is a flowchart illustrating an information processing method according to a fourth example embodiment.

FIG. 13 is a flowchart illustrating an information processing method according to a fourth example embodiment. First, an overview of this example embodiment will be described. In the present example embodiment, a condition for permitting citation is different from that in the foregoing embodiments. For example, without limitation, the terminal 20 determines whether or not to permit citation on the basis of users included in a second group. For example, without limitation, the terminal 20 determines whether or not to permit citation on the basis of the destination of a second content after the destination of the second content is designated. For example, without limitation, the terminal 20 permits citation in cases where there is an overlapping user, other than the user of the subject terminal, between users included in a first group and users included in a second group. For example, without limitation, the information relating to the first content is transmitted via the communication unit in cases where the first group includes at least one user, different from the user of the terminal 20, from among the plurality of users included in the second group.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

In FIG. 13, the processes of operations S1 and S2 are the same as those in FIG. 4. Therefore, explanation thereon is omitted or simplified. In cases where the processor 21 determines that there is a citation request in operation S2 (operation S2: Yes), the terminal 20 designates the destination for transmitting the second content and the information relating to the first content in operation S31. For example, without limitation, the terminal 20 displays, on the display region 28A, a list of names of Talkrooms which are destination candidates, and designates, as the destination, the Talkroom selected by the user from the list.

In operation S32, the terminal 20 determines whether or not to permit citation. For example, without limitation, the processor 21 of the terminal 20 executes the process of operation S32 on the basis of the destination designated in operation S31. For example, the processor 21 references the Talkroom information D2 illustrated in FIG. 3(A), and acquires the user IDs of users included in the group corresponding to the Talkroom designated as the destination in operation S31. Then, the processor 21 compares the user IDs of the users included in the first group corresponding to the first Talkroom against the user IDs of the users included in the group corresponding to the designated Talkroom. In this way, the processor 21 determines whether or not the first group includes at least one user, different from the user of the subject terminal, from among the plurality of users included in the second group. In cases where it is determined that the first group includes N1 or more users, different from the user of the subject terminal, from among the plurality of users included in the second group, the processor 21 determines to permit transmission of the information relating to the first content (operation S32: Yes). The aforementioned N1 is an integer of 1 or greater, and is, for example, without limitation, a value that is set in advance. In cases where the processor 21 determines to permit transmission of the information relating to the first content (operation S32: Yes), the terminal 20 executes the processes of operations S3 and S5, and transmits the information relating to the first content and the second content. The processes of operations S3 and S5 are the same as those in FIG. 4. Therefore, explanation thereon is omitted.

In cases where the processor 21 determines not to permit transmission of the information relating to the first content (operation S32: No), the terminal 20 notifies non-permission of citation in operation S33. The process of operation S33 is the same as the process of operation S22 in FIG. 9. Therefore, explanation thereon is omitted. After the process of operation S33, the processor 21 determines whether or not to change the destination in operation S34. For example, without limitation, the terminal 20 displays, on the display region 28A, a dialog box stating, for example, "Change the destination?", to accept user's input. In cases where user's input to change the destination is detected, the processor 21 determines to change the destination (operation S34: Yes). In cases where the processor 21 determines to change the destination (operation S34: Yes), the terminal 20 returns to the process of operation S31, and repeats the subsequent processes. In cases where the processor 21 determines not to change the destination (operation S34: No), the terminal 20 ends the series of processes relating to the transmission of the second content and the information relating to the first content.

For example, without limitation, the aforementioned terminal 20 transmits the information relating to the first content in cases where the first group includes at least one user, different from the user of the terminal 20, from among the plurality of users included in the second group. Stated differently, the terminal 20 transmits the information relating to the first content in cases where there is an overlapping user, other than the user of the subject terminal, between the first group and the second group. Thus, the terminal 20 can, for example, without limitation, convey the information relating to the first content to terminals 20 in the second group and relating to the first group. It is thus possible, for example, to share information while inhibiting unintended dissemination of information.

For example, without limitation, the terminal 20 determines whether or not to permit transmission of the information relating to the first content in operation S32 before the process of accepting input of the second content is executed in operation S3. In this case, notifying the user that citation is not permitted prevents the user from the inefficiency that, for example, the user is notified accordingly after inputting the second content, and thus, the user's convenience is improved. Further, the terminal 20 can skip processes relating to accepting input of a second content in cases where transmission of the information relating to the first content is not permitted, and thus, processing loads can be reduced.

Fifth Example Embodiment

Figure 14:
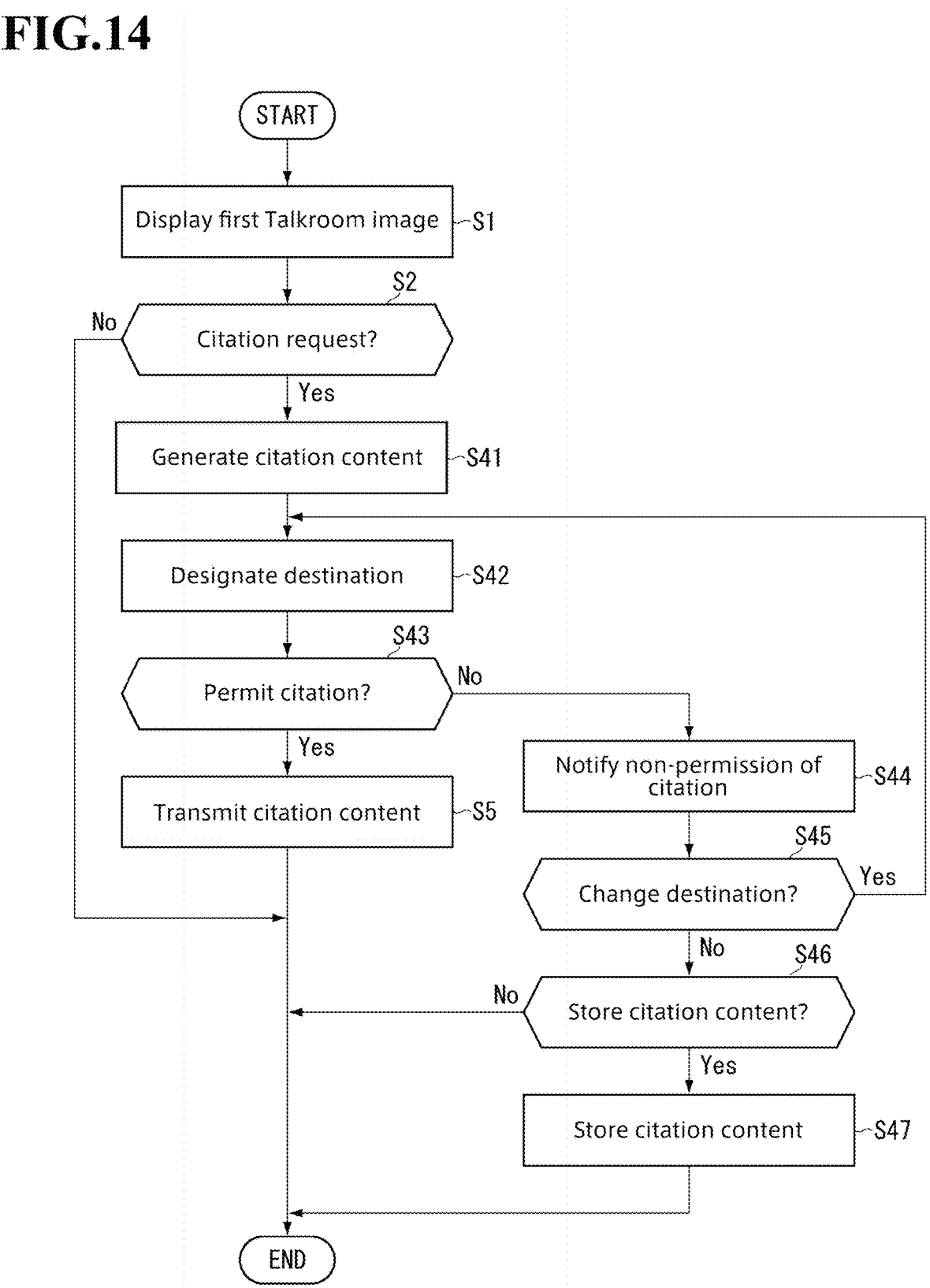
FIG. 14 is a flowchart illustrating an information processing method according to a fifth example embodiment.

FIG. 14 is a flowchart illustrating an information processing method according to a fifth example embodiment. First, an overview of this example embodiment will be described. In this example embodiment, the timing for determining whether or not citation is permitted is different from that in the foregoing embodiments. For example, without limitation, the terminal 20 determines whether or not to permit citation after a citation content is generated.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

In FIG. 14, the processes of operations S1 and S2 are the same as those in FIG. 4. Therefore, explanation thereon is omitted or simplified. In cases where the processor 21 determines that there is a citation request in operation S2 (operation S2: Yes), the terminal 20 generates a citation content in operation S41. Then, in operation S42, the terminal 20 sets the destination of the citation content. The processes of operations S41 and S42 are the same as the processes of operations S3 and S4 in FIG. 4. Therefore, explanation thereon is omitted. After the process of operation S42, the processor 21 determines whether or not to permit citation. The process of operation S43 is the same as the process of operation S32 in FIG. 13. Therefore, explanation thereon is omitted.

In cases where the processor 21 determines to permit citation (operation S43: Yes), the terminal 20 transmits the second content and the information relating to the first content in operation S5. In cases where the processor 21 determines not to permit citation (operation S43: No), the terminal 20 notifies non-permission of citation in operation S44, and determines whether or not to change the destination in operation S45. The processes of operations S44 and S45 are the same as the processes of operations S33 and S34 in FIG. 13; therefore, explanation thereon is omitted.

In cases where the processor 21 determines not to change the destination (operation S45: No), the terminal 20 determines whether or not to store the citation content in operation S46. For example, without limitation, the terminal 20 displays, on the display region 28A, a dialog box stating, for example, "Store?", to accept the user's input. In cases where the user's input to store the citation content is detected, the processor 21 determines to store the citation content (operation S46: Yes). In cases where the processor 21 determines to store the citation content (operation S46: Yes), in operation S47, the terminal 20 stores, in a storage, at least a portion of the citation content generated in operation S41. For example, without limitation, the storage is the storage 24 of the terminal 20. However, it may be a storage other than the storage 24, or a storage being external to the terminal 20. For example, without limitation, the terminal 20 may display, in accordance with a request from the user, the stored citation content on the display region 28A. The terminal 20 ends the series of processes in cases where the processor 21 has determined not to store the citation content (operation S46: No), or after the process of operation S47.

For example, without limitation, the aforementioned terminal 20 determines whether or not to permit citation after the citation content is generated, and determines whether or not to change the destination in cases where citation is not permitted. In this case, citation may be permitted by changing the destination, thus it is possible to suppress causing inconvenience to the user due to wasted effort to input the second content, and thereby the user's convenience is improved. Further, robustness of the terminal 20 is improved, since it is possible to suppress causing inconvenience such as failing to transmit the information relating to the first content as a result of, for example, incorrectly inputting the destination.

Further, for example, without limitation, the aforementioned terminal 20 determines whether or not to permit citation after the citation content is generated, and determines whether or not to store the citation content in cases where citation is not permitted. In this case, the user can, for example, view or reuse the stored citation content, and thus, the user's convenience is improved.

It should be noted that the terminal 20 may not execute the process of operation S45. Further, the terminal 20 may not execute the process of operation S46. In cases where the processor 21 determines not to permit citation (operation S43: No), the citation content may be stored automatically, or the citation content may not be stored.

Sixth Example Embodiment

Figure 15:
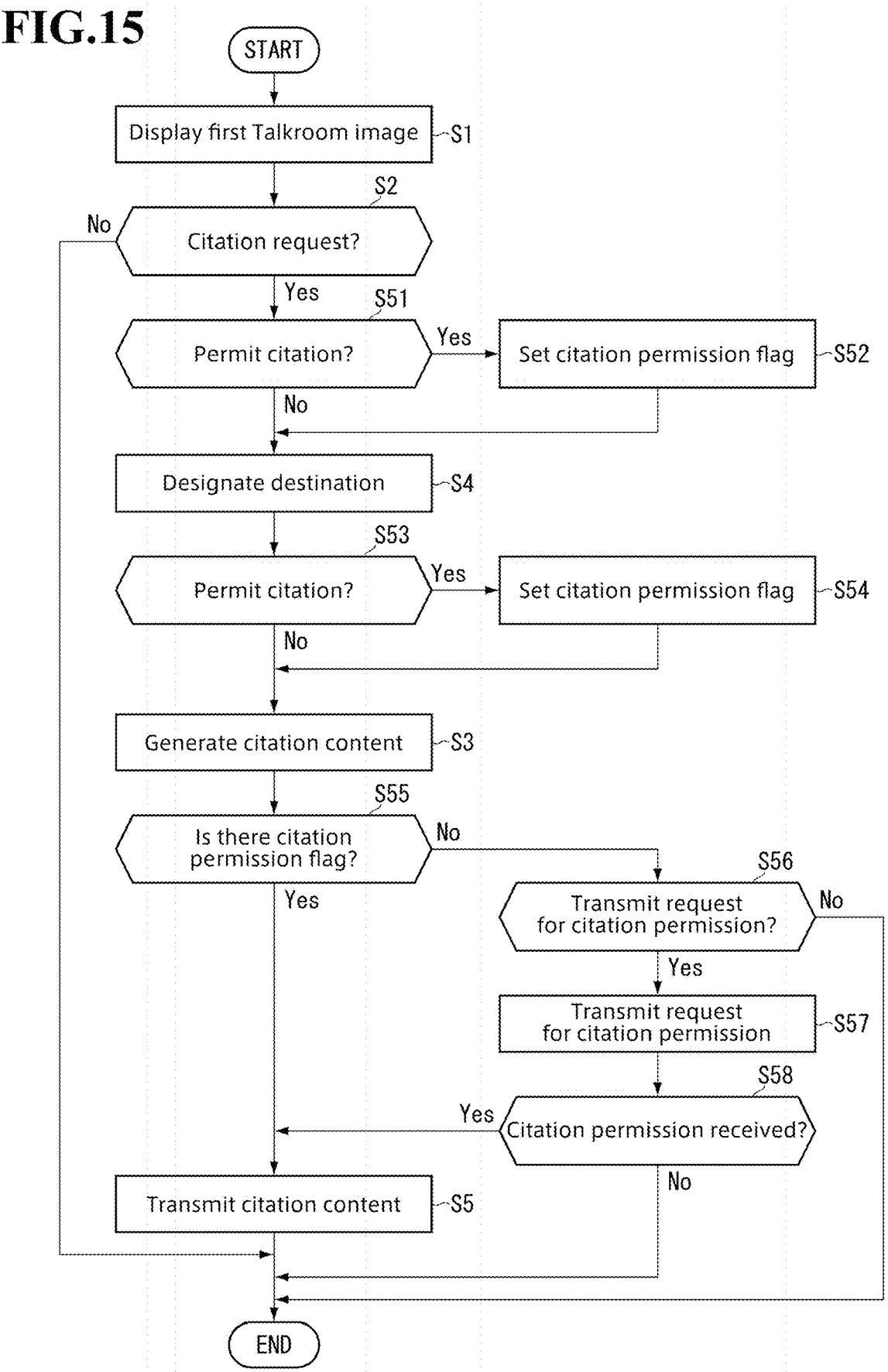
FIG. 15 is a flowchart illustrating an information processing method according to a sixth example embodiment.

FIG. 15 is a flowchart illustrating an information processing method according to a sixth example embodiment. First, an overview of this example embodiment will be described. The present example embodiment is, for example, without limitation, a configuration wherein whether or not to permit citation is determined according to a plurality of conditions. For example, without limitation, at the stage where a content to be cited is specified, the terminal 20 determines whether or not to permit citation on the basis of the user who has transmitted the specified content. Further, for example, without limitation, at the stage where the destination is specified, the terminal 20 determines whether or not to permit citation on the basis of the specified destination. Then, for example, without limitation, the terminal 20 transmits the citation content in cases where the subject terminal determines to permit citation. Further, for example, without limitation, the terminal 20 transmits a request for citation permission in cases where the subject terminal determines not to permit citation, and then transmits the citation content on the basis of a response to the request for citation permission.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

In FIG. 15, the processes of operations S1 and S2 are the same as those in FIG. 4. Therefore, explanation thereon is omitted or simplified. In case where the processor 21 determines that there is a citation request (operation S2: Yes), the processor 21 determines whether or not to permit citation in operation S51. The process of operation S51 is the same as operation S21 in FIG. 9. Thus, in cases where the user of the terminal that transmitted the first content is equivalent to the user of the subject terminal, the processor 21 determines to permit citation (operation S51: Yes), and in cases of determining that citation is permitted, the processor 21 sets a citation permission flag in operation S52. For example, without limitation, the processor 21 generates a flag indicating that citation is permitted.

In cases where the processor 21 determines not to permit citation (operation S51: No), or after the process of operation S52, the terminal 20 designates the destination in operation S4. After the process of operation S4, the terminal 20 determines whether or not to permit citation in operation S53. For example, without limitation, the process of operation S53 is the same as the process of operation S32 in FIG. 13. Thus, the processor 21 determines to permit citation in cases where the first group includes at least one user, different from the user of the subject terminal, from among the plurality of users included in the second group corresponding to the designated Talkroom, and in cases of determining to permit citation (operation S53: Yes), the processor 21 sets a citation permission flag in operation S54.

In cases of determining not to permit citation (operation S53: No), or after the process of operation S54, the processor 21 generates citation content in operation S3. After the process of operation S3, the processor 21 determines whether or not there is a citation permission flag in operation S55. In cases where a citation permission flag is set in the processing of operation S52 and/or operation S54, the processor 21 determines that there is a citation permission flag (operation S55: Yes). In cases where it is determined that there is no citation permission flag (operation S55: No), the processor 21 determines whether or not to transmit a request for citation permission in operation S56. For example, without limitation, the terminal 20 displays, on the display region 28A, a dialog box stating, for example, "Send a request for citation permission?", to accept user's input. In cases where user's input to transmit a request for citation permission is detected, the processor 21 determines to transmit a request for citation permission (operation S56: Yes).

In cases where the processor 21 determines to transmit a request for citation permission (operation S56: Yes), the terminal 20 transmits a request for citation permission in operation S57. For example, without limitation, the terminal 20 transmits information indicating a request for citation permission to a terminal 20 of a user permitting transmission of the information relating to the first content. For example, without limitation, the user permitting transmission of the information relating to the first content may be the user who has transmitted the first content.

It should be noted that the transmission destination of the request for citation permission is not limited to the aforementioned example. For example, the terminal(s) 20 may be terminals 20 of one or more users included in the first group, or may be a terminal of a user that is set in advance (for example, without limitation, an administrator, or a user that is set in advance from among users included in each group). For example, without limitation, the terminal 20 that received the request for citation permission displays, on the display region 28A, a dialog box stating, for example, "Permit citation?", to accept user's input. In cases where user's input to permit citation is detected, the processor 21 transmits permission for citation. It should be noted that, for example, without limitation, the server 10, in cases of receiving the request for citation permission transmitted from the terminal 20, may determine whether or not to permit citation and transmit permission for citation on the basis of the determination result.

In operation S58, the processor 21 determines whether or not permission for citation has been received. For example, without limitation, the processor 21 determines whether or not information indicating permission for citation has been received in response to the request for citation permission transmitted in operation S57. In cases where the processor 21 determines that there is a citation permission flag in operation S55 (operation S55: Yes), or in cases where the processor 21 determines that permission for citation has been received in operation S58 (operation S58: Yes), the terminal 20 transmits the information relating to the first content and the second content in operation S5.

Further, the terminal 20 ends the series of processes in any one of the following cases: in cases where the processor 21 determines that there is no citation request in operation S2 (operation S2: No), for example, in cases where the processor 21 determines not to transmit a request for citation permission in operation S56 (operation S56: No), or in cases where the processor 21 determines that no permission for citation has been received in operation S58 (operation S58: No).

It should be noted that, in cases where the destination is set in operation S4 but the information relating to the first content is not to be transmitted, the terminal 20 may determine whether or not to change the destination, as in the process of operation S45 in FIG. 14. Further, in cases where the user inputs a second content in operation S3 but the information relating to the first content is not to be transmitted, the terminal 20 may determine whether or not to store the information relating to the first content and/or the second content, as in the process of operation S46 in FIG. 14, may store the information without determining whether or not to store it, or may not store the information without determining whether or not to store it.

For example, without limitation, the aforementioned terminal 20 transmits the information relating to the first content and the second content in accordance with a plurality of conditions. According to this information processing method, for example, without limitation, it is possible to minutely set conditions for permitting transmission of the information relating to the first content, and thus, it is possible to share information among a plurality of users while preventing unintended leakage of information. For example, without limitation, the terminal 20 permits citation in cases where the user of the terminal 20 that transmitted the first content is equivalent to the user of the subject terminal and permits citation in cases where the first group includes users, different from the user of the subject terminal, from among the users included in the second group. In this case, users who are included in both the first group and the second group can transmit a citation content via their terminals 20, and thus the users' convenience is improved.

Further, for example, without limitation, the terminal 20 transmits the information relating to the first content and the second content in accordance with a response to a request for citation permission. According to this information processing method, for example, without limitation, it is possible to reduce the processing load of the terminal 20, because the terminal 20 does not have to determine whether or not to permit citation. Further, according to this information processing method, for example, without limitation, even when the terminal 20 does not have enough information necessary for determining whether or not to permit citation, the terminal 20 can transmit the information relating to the first content and the second content in accordance with a response to a request for citation permission. Thus, information can be shared between the first group and the second group.

Further, for example, without limitation, the terminal 20 transmits the information relating to the first content and the second content in accordance with a plurality of conditions, wherein the plurality of conditions include a condition that permission for citation has been received. With this information processing method, it is possible to prevent, for example, without limitation, unauthorized transmission of the information relating to the first content from the terminal 20 in cases where the determination on whether or not to permit citation is made outside the terminal 20. Thus, the information processing method can share information among a plurality of users while preventing unintended leakage of information.

It should be noted that the number of conditions according to which the terminal 20 transmits the information relating to the first content and the second content may be one, or more. For example, without limitation, there may be a single condition according to which the terminal 20 transmits the information relating to the first content and the second content, and the condition may be that permission for citation has been received. In some example embodiments, for example, without limitation, the terminal 20 may transmit the information relating to the first content and the second content according to a plurality of conditions, and the plurality of conditions may not include a condition that permission for citation has been received. The plurality of conditions may or may not include at least one of the conditions described in the foregoing embodiments. The plurality of conditions may include conditions other than the conditions described in the foregoing embodiments.

Seventh Example Embodiment

Figure 16:
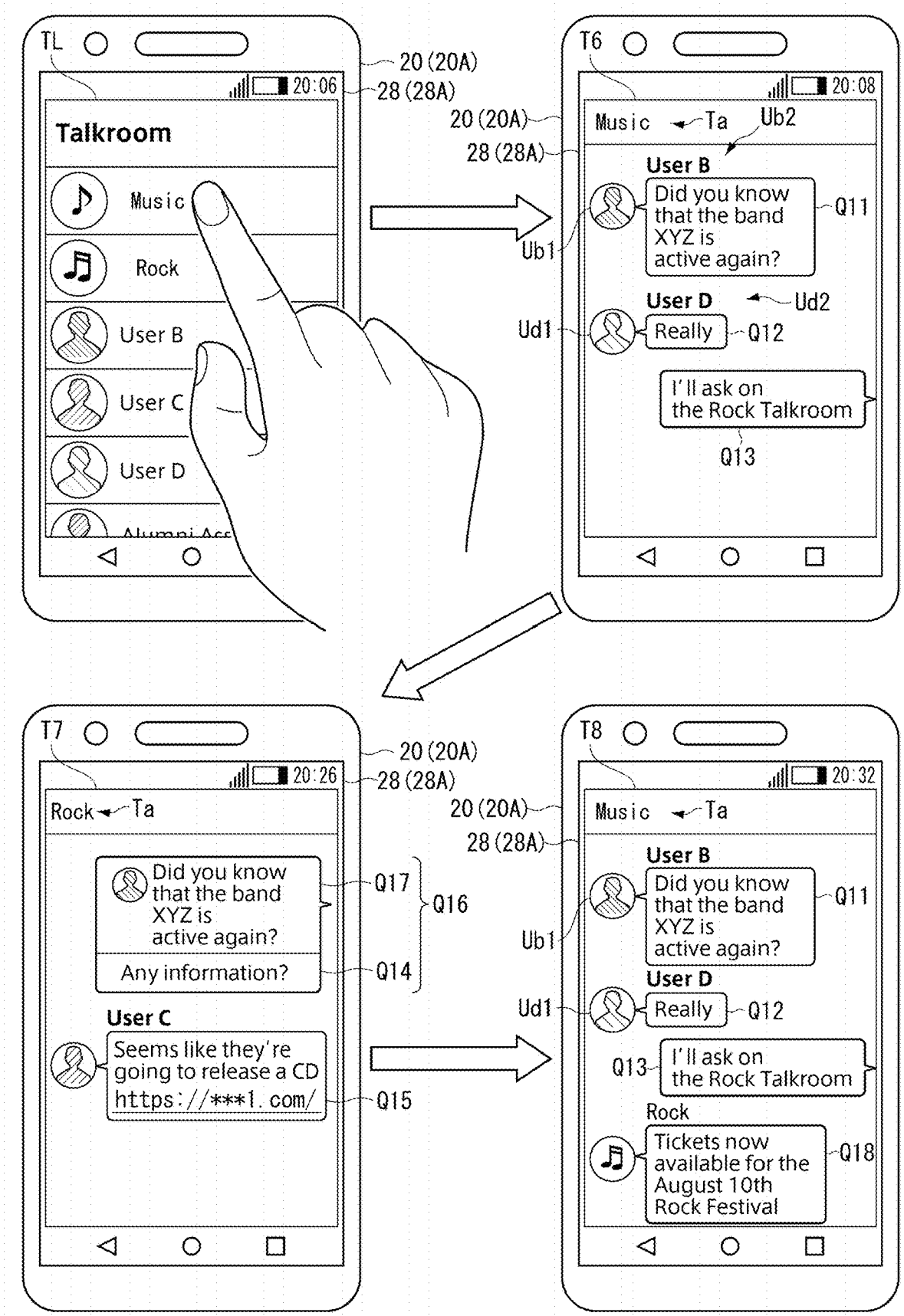
FIG. 16 is a diagram illustrating an information processing method according to a seventh example embodiment.

FIG. 16 is a diagram illustrating an information processing method according to a seventh example embodiment. First, an overview of this example embodiment will be described. The present example embodiment is, for example, without limitation, a mode wherein information relating to a Talkroom is displayed on the display region 28A in cases where a citation content is transmitted. For example, without limitation, in cases where a citation content is transmitted, the terminal 20 displays a second Talkroom image including, for example, an advertisement relating to a first Talkroom. For example, without limitation, in cases where a citation content is transmitted, the terminal 20 displays a first Talkroom image including, for example, an advertisement relating to a second Talkroom.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

The reference sign TL in the upper-left diagram of FIG. 16 indicates an image illustrating a list of Talkrooms. In the image TL, {Music} and {Rock}, for example, are names of Talkrooms. For example, without limitation, the {Music} Talkroom and the {Rock} Talkroom are Talkrooms with set themes. For example, the theme of the Talkroom named {Music} is music, and this Talkroom is intended for posting and viewing information relating to music in general. The theme of the Talkroom named {Rock} is rock music, and this Talkroom is intended for posting and viewing information relating to rock in general. The theme of each Talkroom can be set discretionarily, with examples including food, fashion, travel, movies, work, love, etc. For example, without limitation, a user can create a Talkroom by setting a discretionary theme.

In the present example embodiment, Talkrooms provided by the messaging service include public Talkrooms and private Talkrooms. For example, without limitation, public Talkrooms are Talkrooms in which any user using the messaging service can participate. For example, without limitation, the messaging service provides users with a list of public Talkrooms, and each user can register themselves into a group corresponding to the Talkroom selected from the list. For example, without limitation, the messaging service provides a system via which a user can search for public Talkrooms, and by conducting keyword search etc., the user can find a Talkroom having a theme they is interested in.

For example, without limitation, a user can set the type of Talkroom to "public" at the time of creating a Talkroom, and can thereby create a public Talkroom. For example, without limitation, a public Talkroom may be created by the messaging service provider or an outsourcer thereof. For example, an event holder may outsource the creation of a Talkroom to the provider of the messaging service, and the messaging service provider may create a public Talkroom under the theme of the event.

For example, without limitation, in cases where a user of a terminal 20 registers themselves as a user of a group corresponding to a public Talkroom, the terminal 20 can display an image of the Talkroom (for example, without limitation, the user of the terminal 20 can view the Talkroom image). For example, without limitation, in cases where a user of a terminal 20 registers themselves as a user of a group corresponding to a public Talkroom, the terminal 20 can transmit a content to the Talkroom as the destination (for example, without limitation, the user of the terminal 20 can post the content).

It should be noted that, even in cases where a user of a terminal 20 is not registered as a user of a group corresponding to a public Talkroom, the terminal 20 may be allowed to display an image of the Talkroom. For example, a user may be allowed to view the Talkroom without registering themselves into the group corresponding to the Talkroom, and may be required to register into the group in cases of making a post in the Talkroom. The user may determine whether or not to register themselves into the group after viewing the Talkroom. In some example embodiments, at the time the terminal 20 displays an image of a public Talkroom, the user of the terminal 20 may be registered into the group corresponding to that Talkroom.

It should be noted that, even in cases where a user of a terminal 20 is not registered as a user of a group corresponding to a public Talkroom, the terminal 20 may, for example, without limitation, be allowed to transmit a content to the Talkroom as the destination. For example, the user of the terminal 20 may be registered into the group corresponding to the Talkroom when the content is transmitted from the terminal 20 to the public Talkroom as the destination.

The aforementioned private Talkroom is, for example, without limitation, a Talkroom wherein a terminal 20 of a user who is not included in the group corresponding to the Talkroom is restricted from displaying an image of the Talkroom and transmitting contents to the Talkroom as the destination. A user included in the group corresponding to a private Talkroom can add other users to the group. In the image TL of the list of Talkrooms in the upper-left diagram of FIG. 16, {User B} is the name of a Talkroom, and herein, the Talkroom named {User B} is private.

For example, without limitation, the terminal 20 displays, on the display region 28A, an image TL of a list of Talkrooms associated with the subject terminal or the user thereof. For example, without limitation, when {Music} in the image TL is tapped as illustrated in the upper-left diagram of FIG. 16, the terminal 20 displays, on the display region 28A, an image T6 of a Talkroom whose name Ta is {Music}, as illustrated in the upper-right diagram. In this example, the group corresponding to the {Music} Talkroom is considered the first group, and the Talkroom image T6 is considered the first image. In this example, the group corresponding to the {Rock} Talkroom is considered the second group, and an image T7 of the {Rock} Talkroom as illustrated in the lower-left diagram is considered the second image.

The terminal 20 transmits, by the communication unit (for example, without limitation, the communication I/F 22) of the terminal 20, information relating to a first content among the contents included in the first image displayed on the display region 28A and a second content inputted via the terminal 20. In the Talkroom image T6 in the upper-right diagram, reference signs Q11 to Q13 indicate contents transmitted and received among terminals corresponding to the first group. In this example, content Q11 is considered as the first content. For example, without limitation, on the basis of input by the user with respect to the first content Q11 displayed on the display region 28A, the terminal 20 transmits the information relating to the first content Q11 and a second content.

In the Talkroom image T7 illustrated in the lower-left diagram, reference signs Q14 and Q15 indicate contents transmitted and received among terminals corresponding to the second group. The reference sign Q16 includes a citation content Q17 that cites the first content Q11, and the content Q14 (e.g., a second content) inputted by user A via the terminal 20. For example, without limitation, in cases where the information relating to the first content Q11 and the second content Q14 are transmitted, the terminal 20 displays a first image including information relating to the second group in which the second content Q14 is transmitted and received.

As illustrated in the lower-right diagram, after transmitting the information relating to the first content Q11, the terminal 20 displays, on the display region 28A, the Talkroom image T8 corresponding to the first group. In the Talkroom image T8, the reference sign Q18 indicates a content including information relating to the second group. In this example, the Talkroom corresponding to the second group is the Talkroom named {Rock}. For example, without limitation, the content Q18 includes, as information relating to the {Rock} Talkroom, information in line with the theme of the {Rock} Talkroom. For example, without limitation, the content Q18 is a content generated and transmitted by the server 10. For example, without limitation, in cases where the server 10 receives the information relating to the first content Q11 and the second content Q14 transmitted from the terminal 20, the server 10 first transmits the information relating to the first content Q11 and the second content Q14 to terminals 20 of users included in the second group, and then transmits information relating to the second group to terminals 20 of users included in the first group. For example, without limitation, the processor 11 of the server 10 generates a content including the information relating to the second group on the basis of the Talkroom information D8 stored in the storage 13.

FIG. 17 is a diagram illustrating Talkroom information. The Talkroom information D8 includes, for example, without limitation, the items {Type} and {Theme}.

{Type} is information indicating whether the Talkroom is public or private. For example, without limitation, the {Type} is associated with {Talkroom ID}. For example, the Talkroom whose {Talkroom ID} is {tr01} is a Talkroom whose {Name}, as illustrated in FIG. 2 etc., is {User B}, and the {Type} thereof is {Private}. The Talkroom whose {Talkroom ID} is {tr11} is a Talkroom whose name is {Music} (see the upper-right diagram of FIG. 16), and the type thereof is {Public}. The Talkroom whose {Talkroom ID} is {tr12} is a Talkroom whose name is {Rock} (see the lower-left diagram of FIG. 16), and the type thereof is {Public}.

For example, without limitation, {Theme} is information relating to the Talkroom. For example, without limitation, the {Theme} is associated with {Talkroom ID}. For example, the Talkroom whose {Talkroom ID} is {tr11} has the {Theme} as {Music}. The Talkroom whose {Talkroom ID} is {tr12} has the {Theme} as {Rock}. For example, without limitation, {Music} and {Rock} may be keywords indicating the theme of each Talkroom and/or may be information, such as an advertisement, registered by the messaging service provider, etc. The {Theme} of the Talkroom whose {Talkroom ID} is {tr01} is {NULL}. {NULL} is information indicating that there is no data.

After the information relating to the first content Q11 and the second content Q14 is transmitted to the terminals 20 of users who are included in the second group, the server 10 acquires information relating to the second group from, for example, without limitation, the Talkroom information D8. For example, in FIGS. 16 and 17, the processor 11 of the server 10 acquires, as the information relating to the second group, information included in {Rock}, which is the {Theme} corresponding to the Talkroom whose {Talkroom ID} is {tr12}. For example, without limitation, in cases where the information included in {Rock} is a keyword indicating the theme of the Talkroom, the server 10 acquires, for example, information that is permitted to be made public as information relating to the keyword via a network. On the basis of the acquired information, the server 10 generates a content Q18 with the processor 11, and transmits the content Q18 to the terminals 20 of users who are included in the first group. In some example embodiments, the information included in {Rock} may be, for example, an advertisement in line with the theme of the Talkroom. In this case, the server 10 transmits information, such as an advertisement, registered in advance, to the terminals 20 of users who are included in the first group. In cases where the {Theme} of the Talkroom corresponding to the second group is {NULL}, for example, without limitation, the server 10 does not transmit information relating to the Talkroom to the terminals 20 of users who are included in the first group.

For example, without limitation, the aforementioned terminal 20 displays, on the display region 28A, a first image including information relating to the second group in cases where information relating to the first content is transmitted. In this case, for example, without limitation, the topic being discussed in the first group may be related to the second group, and thus, the terminal 20 can provide, to users included in the first group, information relating to the second group as information relating to the topic being discussed in the first group. Thus, it is possible for the users included in the first group, for example, to reduce the time and trouble to search the Internet for information derived from the information relating to the first content, and thus, the users' convenience is improved. Further, it is possible for the terminals 20 for example, to reduce processes required for the users to search the Internet for information derived from the information relating to the first content.

In cases where each Talkroom is set to either public or private, the terminal 20 may, for example, without limitation, transmit the information relating to the first content and the second content on the basis of whether the Talkroom is public or private. For example, without limitation, in the process of operation S21 in FIG. 9, the terminal 20 may determine to transmit the information relating to the first content and the second content (operation S21: Yes) in cases where the {Type} of the Talkroom corresponding to the first group is {Public}. This process may or may not be a process executed separately from the process of operation S21 in FIG. 9.

It should be noted that each Talkroom may not be set to either public or private. For example, without limitation, all the Talkrooms may be private, or all the Talkrooms may be public. In cases where all the Talkrooms are public, for example, without limitation, the terminal 20 may not determine whether or not to permit transmission of the information relating to the first content and the second content.

The aforementioned terminal 20 displays, for example, without limitation, a first image including information relating to the second group in FIG. 16 on the display region 28A in cases where information relating to the first content and the second content are transmitted, but instead, the terminal 20 may display, on the display region 28A, a second image including information relating to the first group. In some example embodiments, in cases where information relating to the first content and the second content are transmitted, for example, without limitation, the terminal 20 may display, on the display region 28A, a first image including information relating to the second group, and may display, on the display region 28A, a second image including information relating to the first group. In FIG. 16, for example, without limitation, the aforementioned terminal 20 displays, on the display region 28A, information relating to a group as a content, but instead, the information may be displayed in a form (for example, without limitation, a popup or a banner) different from a content.

Eighth Example Embodiment

Figure 18:
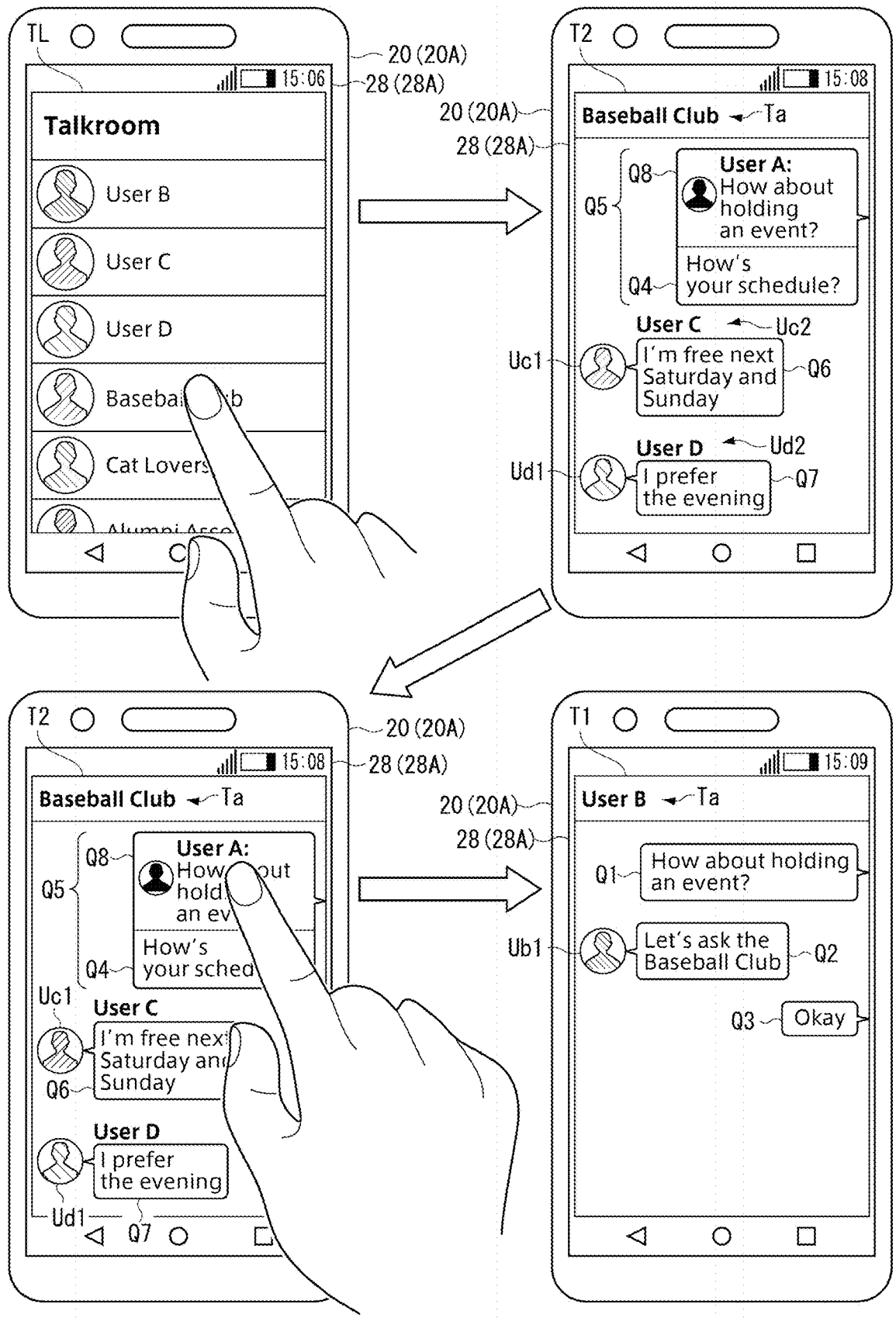
FIG. 18 is a diagram illustrating an information processing method according to an eighth example embodiment.

FIG. 18 is a diagram illustrating an information processing method according to an eighth example embodiment. First, an overview of this example embodiment will be described. The present example embodiment is, for example, without limitation, a configuration wherein, on the basis of input to a second Talkroom image T2 as illustrated in the lower-left diagram, a third image including at least a portion of the first content is displayed on the display region 28A. In FIG. 18, the terminal 20A displaying the third image is equivalent to the terminal 20 that transmitted the second content. The terminal 20 displaying the third image may be a terminal different from the terminal 20 that transmitted the second content. This configuration will be described as a ninth embodiment. For example, without limitation, the third image is the first Talkroom image T1 illustrated in the lower-right diagram. For example, without limitation, in cases where there is a desired (or alternatively, predetermined) input to the second Talkroom image T2, the terminal 20 displays, on the display region 28A, the first Talkroom image T1 illustrated in the lower-right diagram, without delivering a state of displaying the Talkroom list image TL illustrated in the upper-left diagram.

For example, without limitation, in cases where a Talkroom is selected on the basis of the Talkroom list image TL, the terminal 20 displays a Talkroom image including contents transmitted most recently among the contents included in the selected Talkroom. For example, without limitation, in cases where the amount of contents included in the Talkroom exceeds an amount that can be displayed on the display region 28A at once, the Talkroom image does not include the exceeding amount of contents. For example, without limitation, a user can view, by scrolling the display, contents that are included in the Talkroom but are not included in the Talkroom image.

For example, without limitation, in cases of displaying the first Talkroom image T1 on the basis of input to the second Talkroom image T2, the terminal 20A generates the first Talkroom image T1 so as to include at least a portion of the first content. For example, without limitation, in cases where the amount of contents included in the first Talkroom exceeds an amount that can be displayed on the display region 28A at once, the terminal generates the first Talkroom image T1 by extracting, from the contents included in the first Talkroom, an amount of contents that can be displayed on the display region 28A at once in a manner so as to include at least a portion of the first content. For example, without limitation, in cases where the terminal 20 displays the first Talkroom image T1 on the basis of input to the second Talkroom image T2, the user can view the first Talkroom image T1, including at least a portion of the first content Q1, without scrolling the display.

In the second Talkroom image T2 in the lower-left diagram, the content Q8 is a content based on the first content Q1 in the lower-right diagram. For example, without limitation, in cases where the display region 28A is a display region of a touch panel and the input device 25 is an operation unit of the touch panel, the terminal 20 displays, on the display region 28A, the first Talkroom image T1 including the first content Q1 in cases where it is detected that the content Q8 based on the first content Q1 has been tapped in the second Talkroom image T2 in the lower-left diagram.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

In the upper-left diagram of FIG. 18, the talkroom list image TL is an image of a list of Talkrooms. In this example, the second Talkroom corresponding to the second group is {Baseball Club}, and the first Talkroom corresponding to the first group is {User B}. Further, as described in FIG. 2, it is assumed that the information relating to the first content Q1 and the second content Q4 have already been transmitted by the terminal 20 to the second Talkroom as the destination.

As illustrated in the upper-right diagram, the terminal 20 displays the second Talkroom image T2 on the display region 28A. For example, without limitation, the terminal 20 displays the second Talkroom image T2 on the basis of input to the Talkroom list image TL. For example, without limitation, in cases where it is detected that the {Baseball Club} icon has been tapped on the touch panel serving as the input device 25 and the display 28, the terminal 20 displays the second Talkroom image T2 which is associated with this icon.

On the basis of the input to the second Talkroom image displayed on the display region 28A, the terminal 20 displays a third image (in FIG. 18, the first Talkroom image T1 in the lower-right diagram) including the first content Q1 associated with the second content. For example, without limitation, the terminal 20 displays the first Talkroom image T1 on the basis of input to the second content Q4 and/or the information relating to the first content Q1, which are included in the second Talkroom image T2. In the example of the lower-left diagram, the information relating to the first content Q1 is the first content Q1. For example, without limitation, the terminal 20 displays the first Talkroom image T1 in cases where it is detected that the second content Q4 and/or the information relating to the first content Q1, which are included in the second Talkroom image T2, have/has been tapped on the touch panel serving as the input device 25 and the display 28. The terminal 20 displays the first Talkroom image T1 in cases where it is detected that at least a portion (for example, without limitation, the first content Q1) of the citation content Q5 has been tapped.

For example, without limitation, the command for executing a process of switching the image displayed on the display region 28A from the second Talkroom image T2 to the first Talkroom image T1 is associated with a desired (or alternatively, predetermined) input to the second Talkroom image T2. In the example of FIG. 18, the desired (or alternatively, predetermined) input is tapping of the first content Q1 included in the citation content Q5. For example, without limitation, in cases where it is detected that there has been a desired (or alternatively, predetermined) input to the second Talkroom image T2, the terminal 20 switches the state of the display region 28A on which the second Talkroom image T2 is displayed to a state where the first Talkroom image T1 is displayed on the display region 28A, without delivering a state of displaying the Talkroom list image TL on the display region 28A. The desired (or alternatively, predetermined) input may be input other than tapping, and may be, for example, without limitation, input made via a mouse operation as the input device 25, input of audio using the microphone 26, input of an image captured by the camera 27, or input via other input devices.

It should be noted that, in cases where the amount of contents included in each Talkroom exceeds an amount that can be displayed on the display region 28A at once, for example, without limitation, the terminal 20 extracts, with the processor 21, an amount of contents that can be displayed on the display region 28A from the contents included in the Talkroom, and displays an image of the Talkroom including the extracted contents. For example, without limitation, the processor 21 generates an image of the Talkroom such that the content transmitted most recently is arranged at the bottom of the display region 28A and that the contents are arranged in reverse-chronological order, from the most-recent content toward above, on the basis of the timings that the respective contents were transmitted. Further, for example, without limitation, on the basis of input to the Talkroom image, the terminal 20 changes the contents to be included in the Talkroom image.

For example, without limitation, in cases where it is detected that the Talkroom image has been flicked upward in the longitudinal direction on the touch panel serving as the input device 25 and the display 28, the processor 21 generates an image of the Talkroom so as to include a content transmitted earlier than the currently displayed content. The terminal 20 then displays, on the display region 28A, the image of the Talkroom generated by the processor 21. On the other hand, in cases where it is detected that the Talkroom image has been flicked downward in the longitudinal direction, the processor 21 generates an image of the Talkroom so as to include a content transmitted later than the currently displayed content. The terminal 20 then displays, on the display region 28A, the image of the Talkroom generated by the processor 21. For example, without limitation, the user can make the display region 28A of the terminal 20 display a Talkroom image including a desired content by scrolling the display by operating the input device 25 as the operation unit of the touch panel.

At the time of displaying the first Talkroom image T1 on the basis of a desired (or alternatively, predetermined) input to the second Talkroom image T2, in cases where the amount of contents included in the first Talkroom exceeds an amount that can be displayed on the display region 28A at once, for example, without limitation, the processor 21 selects a content to be included in the first Talkroom image T1, from among the contents included in the first Talkroom, such that the first content Q1 is included. For example, without limitation, the processor 21 extracts, from among the contents included in the first Talkroom, one or more contents whose order in time at which the contents were transmitted is consecutive with the order of the first content Q1. For example, without limitation, the processor 21 generates the first Talkroom image T1 such that the extracted contents and the first content Q1 are lined up in the order according to which the contents were transmitted. The terminal 20 displays, on the display region 28A, the first Talkroom image T1 generated by the processor 21.

The third image to be displayed by the terminal 20 on the display region 28A on the basis of a desired (or alternatively, predetermined) input to the second Talkroom image T2 may be identical to the first image, or may be different from the first image. For example, without limitation, the third image to be displayed by the terminal 20 on the display region 28A on the basis of a desired (or alternatively, predetermined) input to the second Talkroom image T2 may be an image that is different from the first Talkroom image T1 displayed by the terminal 20 on the display region 28A on the basis of input to the Talkroom list image TL. For example, without limitation, in the third image, at least one of the contents included in the first Talkroom image T1 may be omitted and/or shortened.

Eighth Example Embodiment

Figure 19:
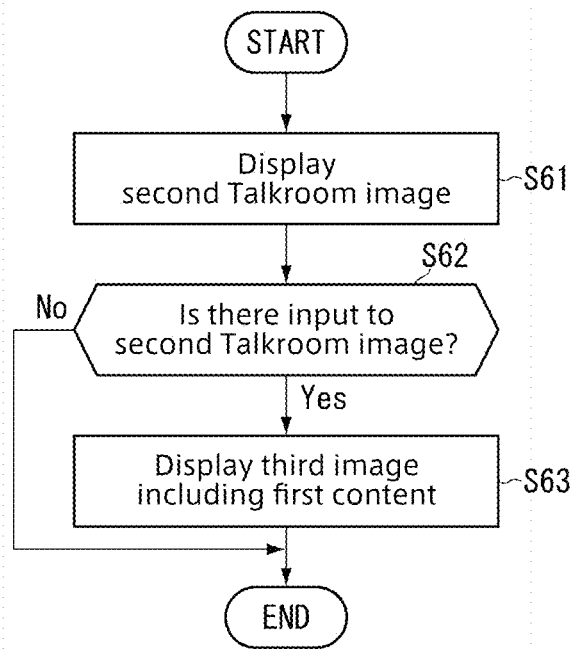
FIG. 19 is a flowchart illustrating an information processing method according to the eighth embodiment.

FIG. 19 is a flowchart illustrating an information processing method according to an eighth example embodiment. For example, without limitation, when an application for the messaging service is activated, the terminal 20 displays, on the display region 28A, a Talkroom list image TL as illustrated in the upper-left diagram of FIG. 18. For example, without limitation, the processor 21 reads out the Talkroom information D2 (see FIG. 3(A)) stored in the storage 24, and generates the Talkroom list image TL. Then, the processor 21 controls the display 28 and makes the display 28 display the image TL. In case where the user selects a Talkroom via the input unit 23A, the processor 21 displays an image of the Talkroom on the display region 28A. In this example, it is considered that a second content associated with a first content included in a first Talkroom has already been transmitted to a second Talkroom as the destination, and the user has selected the second Talkroom. Further, in this example, the first Talkroom is the {User B} Talkroom in the Talkroom list image TL, and the second Talkroom is the {Baseball Club} Talkroom in the image TL.

In operation S61, the terminal 20 displays an image of the second Talkroom.

For example, without limitation, the processor 21 generates the second Talkroom image T2 as illustrated in the upper-right diagram of FIG. 18 on the basis of the Talkroom information D2 and the content information D3 stored in the storage 24. For example, on the basis of the Talkroom information D2 illustrated in FIG. 3(A), the processor 21 specifies {List 4} as the content information corresponding to the second Talkroom. Further, the processor 21 reads out the {List 4} illustrated in FIG. 3(C) from among the content information D3 stored in the storage 24. The processor 21 then generates the second Talkroom image T2 by arranging respective contents defined in the {List 4} according to a desired (or alternatively, predetermined) positional relationship. The processor 21 then controls the display 28, and makes the display region 28A display the second Talkroom image T2.

In operation S62, the terminal 20 determines whether or not there is input to the second Talkroom image T2. The terminal 20 accepts an input by the user to the second Talkroom image T2. For example, without limitation, in cases where the display region 28A is a display region of a touch panel and the input device 25 is an operation unit of the touch panel, the user can input various types of information into the terminal 20 by operating the input device 25 superposed on the display region 28A. For example, without limitation, in case where it is detected that the citation content Q5 displayed on the display region 28A has been tapped as illustrated in the lower-left diagram of FIG. 18, the processor 21 determines that there was a desired (or alternatively, predetermined) input to the second Talkroom image T2 (operation S62: Yes).

It should be noted that the process for accepting an input to the second Talkroom image T2 is not limited to the example illustrated in FIG. 18. For example, without limitation, the input device 25 may be a device other than the operation unit of the touch panel. For example, in cases where the input device 25 is a mouse, the user may move the pointer within the display region 28A onto the citation content Q5 (for example, the content Q1) via the mouse operation, and click the mouse to input a command to display the first Talkroom image T1 on the display region 28A. In some example embodiments, the terminal 20 may accept a desired (or alternatively, predetermined) input through a device other than the input device 25. For example, the terminal may accept a desired (or alternatively, predetermined) input through audio input using the microphone 26.

In cases where the processor 21 determines that a desired (or alternatively, predetermined) input was made to the second Talkroom image T2 (operation S62: Yes), the terminal 20 displays, on the display region 28A, a third image including the first content in operation S63. For example, without limitation, the first content is the cited content that is being cited in the second content, and the terminal 20 displays the first Talkroom image T1 including the cited content. In cases where the processor 21 determines that there was no desired (or alternatively, predetermined) input to the second Talkroom image T2 (operation S62: No), or after the process of operation S63, the terminal 20 ends the series of processes.

Figure 20:
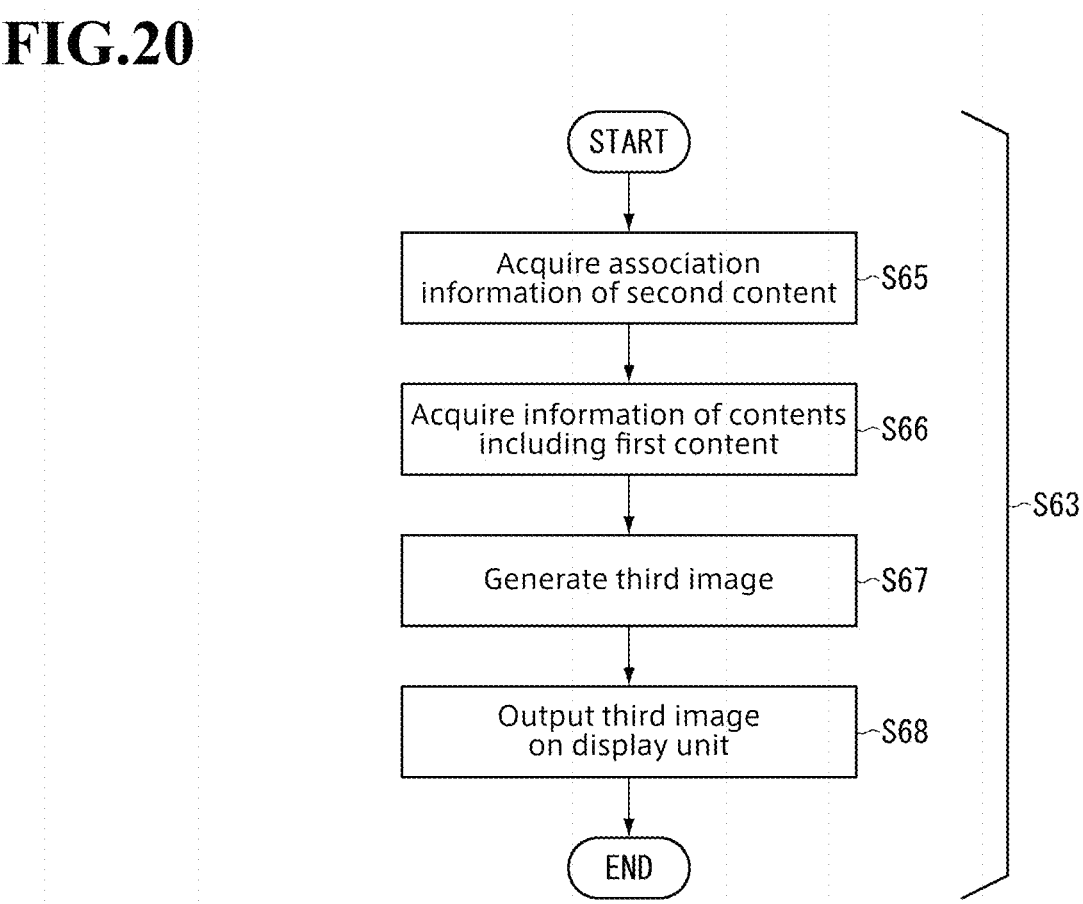
FIG. 20 is a flowchart illustrating processes relating to the displaying of a third image.

FIG. 20 is a flowchart illustrating processes relating to the displaying of a third image. Operation S63 includes, for example, without limitation, processes of operations S65 to S68. In operation S65, the processor 21 acquires information relating to the second content (for example, without limitation, the {Association Information} in FIG. 3(C)). In FIG.

3(C), the {Association Information} includes {tr01c01}, which is the {Content ID} of the first content associated with the second content.

In operation S66, the processor 21 acquires information of one or more contents, including the first content. For example, without limitation, on the basis of the content ID of the first content acquired in operation S65, the processor 21 specifies the first Talkroom as the Talkroom including the first content. Then, for example, without limitation, the processor 21 extracts, from contents included in the specified first Talkroom, one or more contents that satisfy a desired (or alternatively, predetermined) condition with respect to the first content.

The aforementioned desired (or alternatively, predetermined) condition may include, for example, without limitation, a condition that the extracted contents include the first content. The order in time at which the contents were transmitted is consecutive and the total amount of the contents falls within an amount that can be displayed on the display region 28A at once. For example, without limitation, among the contents displayed on the display region 28A at once, only a portion of the content arranged at the upper end of the Talkroom image and/or a portion of the content arranged at the lower end needs to be displayed on the display region 28A. As for the contents to be displayed on the display region 28A at once, for example, without limitation, the entire contents may be displayed on the display region 28A, or a portion thereof may be cropped at the ends of the Talkroom image.

The aforementioned desired (or alternatively, predetermined) condition may include, for example, without limitation, a condition that the contents were transmitted within a desired (or alternatively, predetermined) time period including the time instant at which the first content was transmitted. For example, the desired (or alternatively, predetermined) condition may include a condition that the contents were transmitted on the same day as the first content was transmitted, or may include a condition that the contents were transmitted within a desired (or alternatively, predetermined) length of time (e.g., 6 hours, a day, or a week) including the time instant at which the first content was transmitted. In some example embodiments, the aforementioned desired (or alternatively, predetermined) condition may include a condition relating to the terminal 20 or the user thereof that transmitted the content. The aforementioned desired (or alternatively, predetermined) condition may include, for example, without limitation, a condition that the extracted contents are the ones transmitted by the terminal 20 that transmitted the first content, or a condition that the extracted contents are the ones transmitted by the terminal 20 that transmitted the second content.

The aforementioned desired (or alternatively, predetermined) condition is not limited to the aforementioned examples, and may not include at least one of the example conditions, or may include conditions other than the example conditions. As regards the contents extracted by the processor 21 in operation S66, the order in time at which the contents were transmitted may not be consecutive.

In operation S67, the processor 21 generates the third image. For example, without limitation, the processor 21 generates the third image on the basis of the information relating to the contents acquired in operation S66. For example, without limitation, the processor 21 generates the third image by arranging the contents acquired in operation S66 according to a desired (or alternatively, predetermined) positional relationship. The third image may be identical to the first image, or may be different from the first image. For example, without limitation, the third image may be an image generated according to the algorithm for generating the first image, or may be an image generated according to a different algorithm from the one for generating the first image.

At least one of the contents arranged in the third image may not be equivalent to that in the contents included in the first Talkroom, and may be, for example, without limitation, a content obtained by applying processing on the contents included in the first Talkroom. In operation S68, the terminal 20 outputs, to the display 28, the third image generated by the processor 21, and displays the third image on the display region 28A.

In the present example embodiment, the program P2 is an information processing program to be executed by a terminal of a user who is included in a second group including a plurality of users, the information processing program causing (1) displaying a second image including a second content among contents transmitted and received among terminals corresponding to the second group on a display region of the terminal, the second content being associated with a first content in a first image including contents transmitted and received among terminals corresponding to a first group including a plurality of users, and (2) on the basis of input by the user of the terminal to the second image displayed on the display region, displaying a third image including the first content associated with the second content on the display region. For example, without limitation, the program P2 causes a processor 21 (for example, without limitation, a computer or CPU) to execute (1) displaying a second image including a second content among contents transmitted and received among terminals corresponding to the second group on a display region of the terminal, the second content being associated with a first content in a first image including contents transmitted and received among terminals corresponding to a first group including a plurality of users, and (2) on the basis of input by the user of the terminal to the second image displayed on the display region, displaying a third image including the first content associated with the second content on the display region.

The aforementioned terminal 20 displays, on the display region, a third image including the first content associated with the second content, on the basis of input by the user of the terminal to the second image displayed on the display region. Thus, the user of the terminal 20 can recognize, through the third image, at least a portion of the first content associated with the second content. For example, without limitation, in cases where the terminal 20 that transmitted the second content is equivalent to the terminal 20 displaying the third image on the basis of input to the second image, the user can easily check the first content. For example, without limitation, the third image may include content transmitted before the first content and/or a content transmitted after the first content. In this case, the user can recognize the flow and the background history of contents including the first content, thus the user's convenience is improved.

Ninth Example Embodiment

Figure 21:
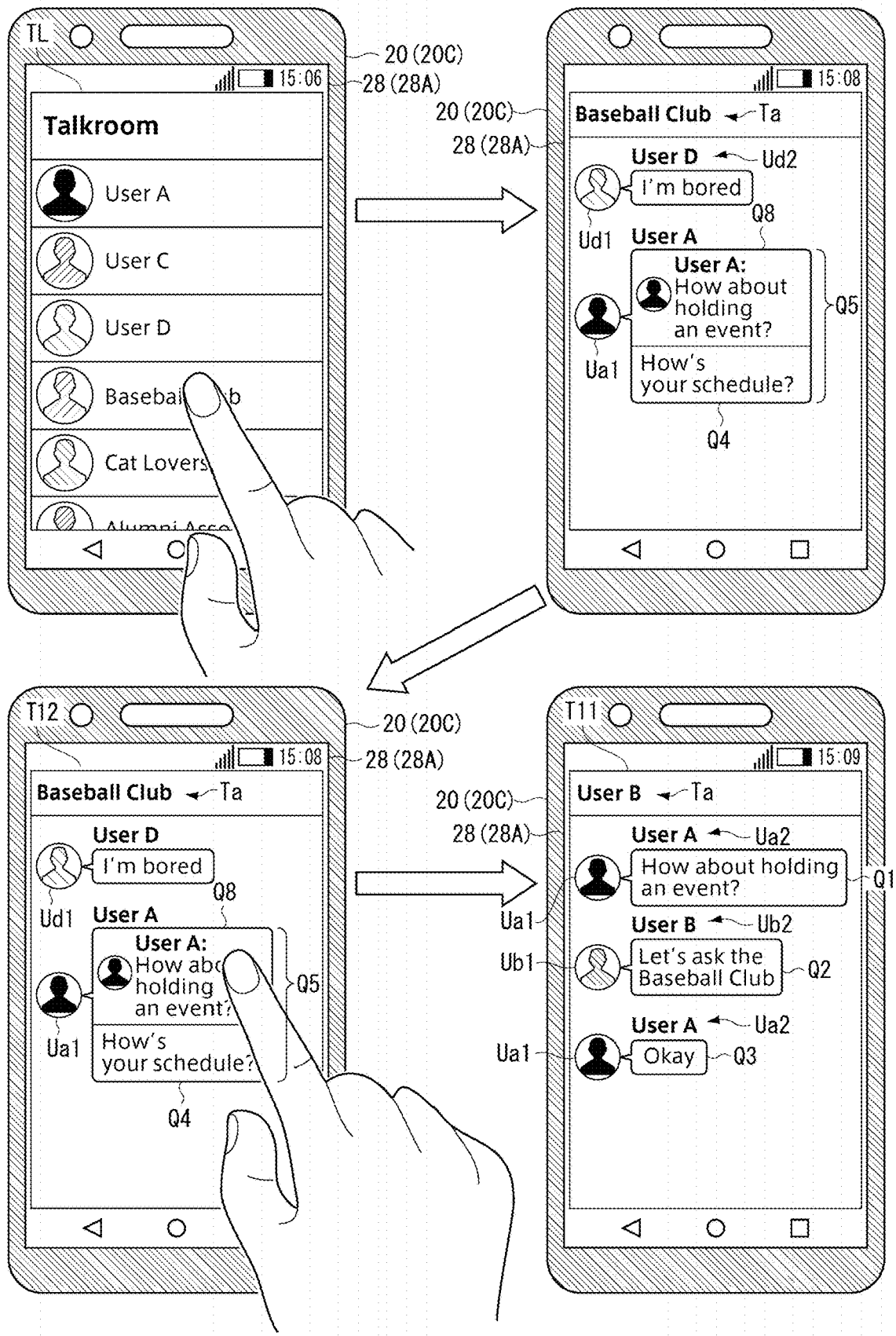
FIG. 21 is a diagram illustrating an information processing method according to a ninth example embodiment.

FIG. 21 is a diagram illustrating an information processing method according to a ninth example embodiment. First, an overview of this example embodiment will be described. The present example embodiment is different from the eighth embodiment where a second terminal (e.g., the terminal 20C in FIG. 21) that displays a second Talkroom image including a second content is different from a first terminal (e.g., the terminal 20A in FIG. 2) that transmitted the second content.

For example, without limitation, on the basis of input to a second Talkroom image T12 as illustrated in the lower-left diagram, the terminal 20 displays, on the display region 28A, a first Talkroom image T11 as illustrated in the lower-right diagram. For example, without limitation, in cases where it is detected that a desired (or alternatively, predetermined) input was made to the second Talkroom image T12, the terminal 20 displays the first Talkroom image T11 on the basis of information relating to the first content Q1. In a mode where the first Talkroom image T11 is displayed on the basis of input to the second Talkroom image T12, the information relating to the first content includes, for example, without limitation, information for specifying the first content in the messaging service. The information for specifying the first content includes, for example, without limitation, identification information of the first content. For example, without limitation, in cases of displaying the first Talkroom image T11 on the basis of input to the second Talkroom image T12, the terminal 20 displays the first Talkroom image T11 by specifying the Talkroom including the first content as the first Talkroom on the basis of the identification information of the first content.

For example, without limitation, in cases where the terminal 20 is used by a user who is not included in the first group (e.g., the terminal 20C), the terminal 20 receives, as a content to be included in the first Talkroom image T11, one or more contents, including at least a portion of the first content, from among contents included in the first Talkroom on the basis of the identification information of the first content, and generates the first Talkroom image T11 on the basis of the received contents.

For example, without limitation, in cases where there is a desired (or alternatively, predetermined) input to the second Talkroom image T12, the terminal 20 displays, on the display region 28A, the first Talkroom image T11 illustrated in the lower-right diagram, without delivering a state of displaying the Talkroom list image TL illustrated in the upper-left diagram. For example, without limitation, in cases where the terminal 20 is used by a user who is not included in the first group (e.g., the terminal 20C), the terminal 20 receives, from among contents included in the first Talkroom, contents of an amount that has been set so as to be displayable on the display region 28A at once, and displays the first Talkroom image T11 on the basis of the received contents. For example, without limitation, the terminal 20 may or may not receive all the contents included in the first Talkroom.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

For example, without limitation, in FIG. 21, the user who has transmitted the information relating to the first content and the second content is the user A, whose terminal 20 is the terminal 20A. For example, without limitation, the terminal 20 in FIG. 21 is a terminal of the user C who is different from the user A, and is the terminal 20C. For example, without limitation, the first group corresponding to the first Talkroom illustrated in the upper-right diagram of FIG. 2 is constituted by the user A and the user B, and the user C, who is the user of the terminal 20C, is included in the second group but is not included in the first group.

As illustrated in the upper-left diagram of FIG. 21, for example, without limitation, the terminal 20 displays, on the display region 28A, an image TL of a list of Talkrooms associated with the subject terminal or the user thereof. For example, without limitation, Talkrooms associated with the subject terminal or the user thereof are Talkrooms including the user of the subject terminal. In cases where a Talkroom is selected via an input to the Talkroom list image TL, the terminal 20 displays an image of the selected Talkroom on the display region 28A. In the terminal 20C, for example, without limitation, the display region 28A is a display region of a touch panel and the input device 25 is an operation unit of the touch panel. In cases where the {Baseball Club} icon in the Talkroom list image TL is tapped, the terminal 20C displays, on the display region 28A, an image T12 of the Talkroom whose name Ta is {Baseball Club}, as illustrated in the upper-right diagram of FIG. 21.

In the Talkroom image T12, reference sign Q8 indicates a content based on the information relating to the first content Q1. The information relating to the first content Q1 has been transmitted from the terminal 20A of user A. For example, without limitation, the terminal 20C receives the information relating to the first content Q1 via the server 10. For example, without limitation, the terminal 20 receives, identification information of the first content Q1 and at least a portion of the first content Q1 as the information relating to the first content Q1. On the basis of at least a portion of the received first content Q1, the terminal 20 generates a second Talkroom image T12 including content Q8 relating to the first content Q1.

On the basis of input to the second Talkroom image T12 displayed on the display region 28A, the terminal 20C displays a third image (in FIG. 21, the first Talkroom image T11 illustrated in the lower-right diagram) including the first content Q1 associated with the second content Q4. For example, without limitation, the terminal 20C displays the first Talkroom image T11 on the basis of input to the citation content Q5 included in the second Talkroom image T12 in the lower-left diagram. For example, without limitation, in cases where the display region 28A of the terminal 20C is a display region of a touch panel and the input device 25 thereof is an operation unit of the touch panel, the terminal 20C displays the first Talkroom image T11 in cases where it is detected that the citation content Q5 included in the second Talkroom image T12 has been tapped.

For example, without limitation, the command for executing a process of switching the image displayed on the display region 28A from the second Talkroom image T12 to the first Talkroom image T11 is associated with a desired (or alternatively, predetermined) input to the second Talkroom image T12. In the example of FIG. 21, the desired (or alternatively, predetermined) input is tapping of the citation content Q5. For example, without limitation, in cases where it is detected that there has been a desired (or alternatively, predetermined) input to the second Talkroom image T12, the terminal 20C switches the state of the display region 28A on which the second Talkroom image T12 is displayed to a state where the first Talkroom image T11 is displayed on the display region 28A, without delivering a state of displaying the Talkroom list image TL on the display region 28A. The desired (or alternatively, predetermined) input may be input other than tapping, and may be, for example, without limitation, input made by a mouse operation as the input device 25, input of audio using the microphone 26, input of an image captured by the camera 27, or input via other input devices.

For example, without limitation, in cases where it is detected that there has been a desired (or alternatively, predetermined) input to the second Talkroom image T12, the terminal 20C transmits the identification information of the first content Q1 to a device storing the first content Q1. The device storing the first content Q1 may be, for example, without limitation, a terminal 20 of a user who is included in the first group (e.g., terminal 20A, terminal 20B, etc.) and/or the server 10.

For example, without limitation, the terminal 20C transmits the information relating to the first content Q1 (e.g., the identification information of the first content Q1), and, in response to transmitting the information relating to the first content Q1, receives information of content(s) to be included in the third image. For example, without limitation, the server 10 stores, in the storage 13, the content information D7 including a content included in the first Talkroom. In cases of receiving the identification information of the first content Q1 transmitted by the terminal 20C, the server 10 transmits one or more contents, including the first content Q1, on the basis of the content information D7. In cases of receiving contents transmitted from the server 10, the terminal 20C generates a third image by arranging the received contents according to a desired (or alternatively, predetermined) positional relationship.

It should be noted that the server 10 may not store content information D7 including contents included in the first Talkroom. In this case, for example, without limitation, the server 10 may acquire one or more contents, including the first content Q1, from the terminal 20A or terminal 20B retaining the contents included in the first Talkroom, and may transmit the acquired contents to the terminal 20C. The server 10 may, for example, without limitation: transmit, to the terminal 20A, information requesting the transmission of contents included in the first Talkroom, receive the contents included in the first Talkroom as a response to the request, and transmit the received contents included in the first Talkroom to the terminal 20C.

It should be noted that, in cases where the amount of contents included in each Talkroom exceeds an amount that can be displayed on the display region 28A at once, for example, without limitation, the terminal 20C extracts, using the processor 21, an amount of contents that can be displayed at once on the display region 28A from the contents included in the Talkroom, and displays an image of the Talkroom including the extracted contents. For example, without limitation, the processor 21 generates an image of the Talkroom such that the content transmitted most recently is arranged at the bottom of the display region 28A and that the contents are arranged in reverse-chronological order, from the most-recent content toward above, on the basis of the timings that the respective contents were transmitted. Further, for example, without limitation, on the basis of input to the Talkroom image, the terminal 20C changes the contents to be included in the Talkroom image.

For example, without limitation, in cases where it is detected that the Talkroom image has been flicked upward in the longitudinal direction on the touch panel serving as the input device 25 and the display 28, the processor 21 generates an image of the Talkroom so as to include a content transmitted earlier than the currently displayed content. The terminal 20C then displays, on the display region 28A, the image of the Talkroom generated by the processor 21. On the other hand, in cases where it is detected that the Talkroom image has been flicked downward in the longitudinal direction, the processor 21 generates an image of the Talkroom so as to include a content transmitted later than the currently displayed content. The terminal 20C then displays, on the display region 28A, the image of the Talkroom generated by the processor 21. For example, without limitation, it is possible to display, in the display region 28A of the terminal 20C, a Talkroom image including a desired content by user operation to scroll the display via the input device 25 as the operation unit of the touch panel.

In cases where the amount of contents included in the first Talkroom exceeds an amount that can be displayed on the display region 28A at once, the contents to be included in the first Talkroom image T11 is, for example, without limitation, selected from among the contents included in the first Talkroom. The contents to be included in the first Talkroom image T11 may be selected either by the terminal 20A, the server 10, or the terminal 20C. The third image to be displayed by the terminal 20C on the display region 28A on the basis of a desired (or alternatively, predetermined) input to the second Talkroom image T12 may be identical to the first image, or may be different from the first image.

As described above, the terminal 20C displaying the third image on the basis of input to the second image may be a terminal other than the terminal 20A of the user who has transmitted the second content. In this case, the user of the terminal 20C can recognize, through the third image, at least a portion of the first content associated with the second content. For example, without limitation, the third image includes a content transmitted before the first content and/or content transmitted after the first content. In this case, the user can recognize the flow and the background history of contents including the first content, thus the user's convenience is improved.

For example, without limitation, the second image displayed on the terminal 20 (e.g., the terminal 20C) of a user who is different from the user who has transmitted the second content may be different from the second image displayed on the terminal 20 (e.g., the terminal 20A) of the user who has transmitted the second content. Also, for example, without limitation, the third image displayed on the terminal 20 (e.g., the terminal 20C) of a user who is different from the user who has transmitted the second content may be different from the third image displayed on the terminal 20 (e.g., the terminal 20A) of the user who has transmitted the second content. Examples of the second and third images will be described below with reference to FIGS. 22 and 23.

Figure 22:
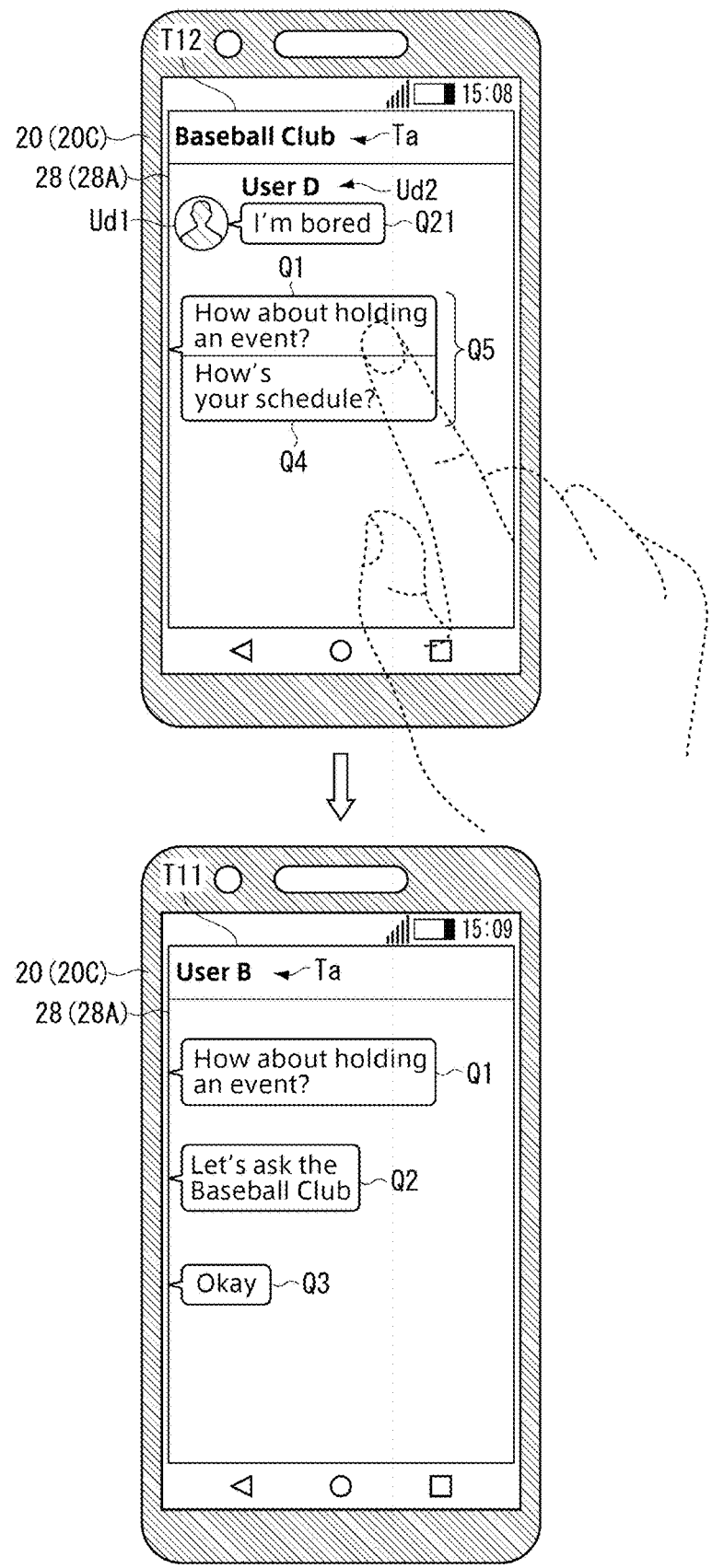
FIG. 22 is a diagram illustrating processes relating to the displaying of a second image and a third image.

FIG. 22 is a diagram illustrating processes relating to the displaying of second and third images. In the upper diagram of FIG. 22, reference sign Q21 indicates content included in the second Talkroom image T12. Different from the second content Q4 associated with the first content Q1, the content Q21 is a third content that is not associated with another content. The third content Q21 is, for example, without limitation, content that does not cite another content. The third content Q21 and information relating to a user who has transmitted the third content Q21 are displayed in a set on the display region 28A. The information relating to the user is, for example, without limitation, information for specifying the user who has transmitted the content.

In FIG. 22, the user that has their terminal transmitted the third content Q21 is the user D, and the information relating to the user includes, for example, without limitation, an icon of the user D and the user's name. For example, without limitation, the processor 21 of the terminal 20C arranges, within the second Talkroom image T12 according to a desired (or alternatively, predetermined) positional relationship, the third content Q21 and the information (e.g., the icon Ud1 and the user's name Ud2) relating to the user who has transmitted the third content Q21. Further, the processor 21 makes a setting not to display the information relating to the user who has transmitted the second content Q4, among the contents included in the second Talkroom image T12, on the display region 28A. For example, without limitation, the processor 21 of the terminal 20C does not arrange, with respect to the second content Q4, the information relating to the user who has transmitted the second content Q4 in the second Talkroom image T12.

The lower diagram of FIG. 22 is, for example, without limitation, a diagram illustrating a third image (in this example, the first Talkroom image T11) in case where the processor 21 makes a setting not to display the information relating to the user who has transmitted the second content Q4. In the first Talkroom image T11 displayed on the basis of the second Talkroom image T12, the processor 21 makes a setting to display no information relating to the users who has transmitted a content on the display region 28A. In the first Talkroom image T11 illustrated in the lower-right diagram of FIG. 21, the user who has transmitted the first content Q1 is the user A. In this first Talkroom image T11, the information relating to the user is, for example, without limitation, the icon Ua1 of the user A and the user's name Ua2. The icon Ua1 and the user's name Ua2 are arranged according to a desired (or alternatively, predetermined) positional relationship with respect to the first content Q1. On the other hand, in the first Talkroom image T11 illustrated in the lower diagram of FIG. 22, the processor 21 makes a setting not to display the information relating to the user who has transmitted the first content Q1 on the display region 28A. For example, without limitation, the processor 21 of the terminal 20C does not arrange, within the first Talkroom image T11, information relating to the users who has transmitted a content included in the first Talkroom. In this case, for example, without limitation, the terminal 20C may or may not receive the information relating to the users who has transmitted a content included in the first Talkroom.

Figure 23:
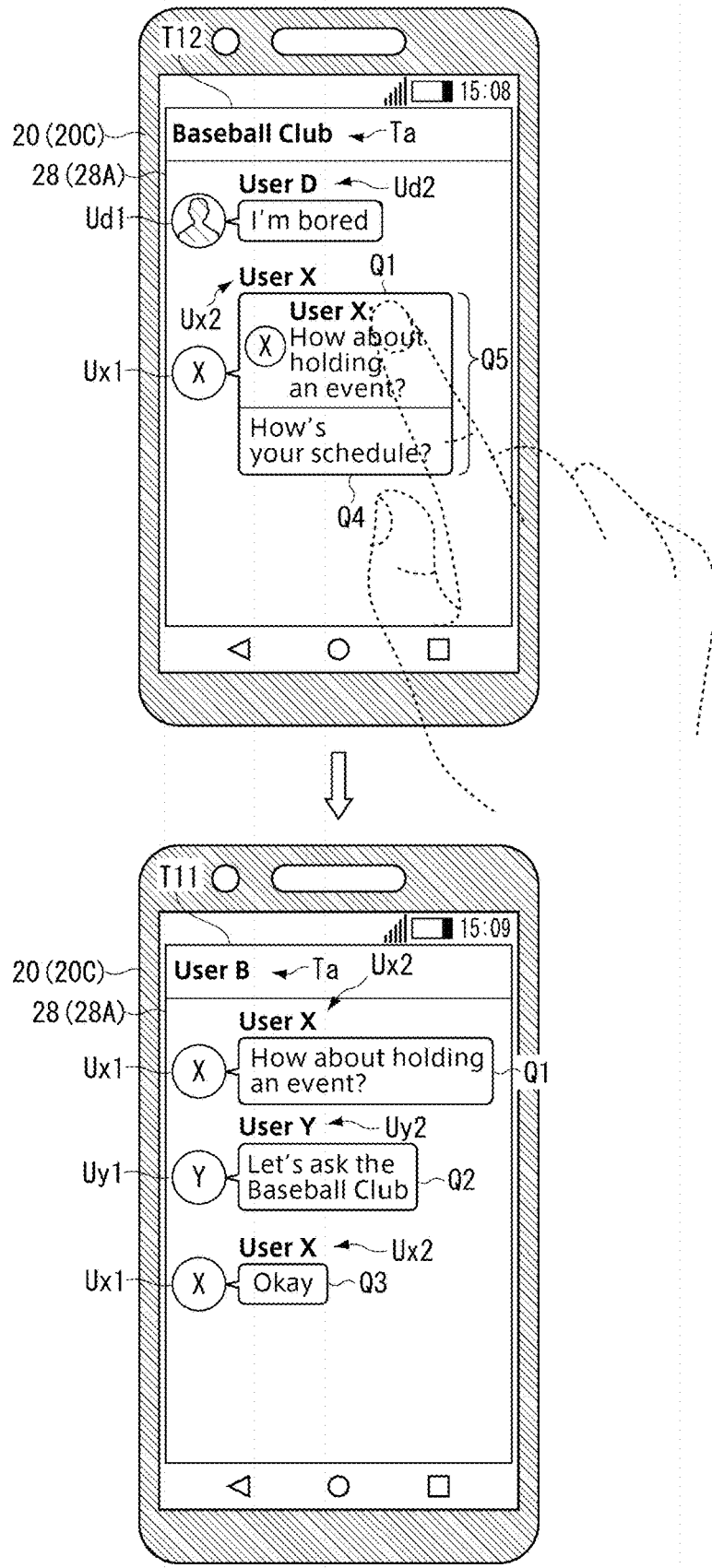
FIG. 23 is a diagram illustrating processes relating to the displaying of a second image and a third image.

FIG. 23 is a diagram illustrating processes relating to the displaying of second and third images. The processor 21 makes a setting not to display the information relating to the user who has transmitted the second content Q4, among the contents included in the second Talkroom image T12 illustrated in the upper diagram of FIG. 23, on the display region 28A. For example, without limitation, the processor 21 of the terminal 20C does not arrange the information relating to the user who has transmitted the second content Q4 in the second Talkroom image T12. Further, instead of the information relating to the user who has transmitted the second content Q4, the second Talkroom image T12 includes information that does not specify the user who has transmitted the second content Q4. The information that does not specify the user is, for example, without limitation, an icon Ux1 and user name Ux2 assigned by the terminal 20C. For example, without limitation, the processor 21 of the terminal 20C generates the second Talkroom image T12 by arranging the second content Q4, the icon Ux1, and the user name Ux2 according to a desired (or alternatively, predetermined) positional relationship.

The lower diagram of FIG. 23 is, for example, without limitation, a diagram illustrating a third image (in this example, the first Talkroom image T11) in case where information that does not specify the user is displayed instead of the information relating to the user who has transmitted the second content Q4. In the first Talkroom image T11 displayed on the basis of the second Talkroom image T12, the processor 21 makes a setting not to display information relating to users that have their terminal have transmitted a content on the display region 28A. This first Talkroom image T11 includes information that does not specify users, instead of information relating to users that have their terminal have transmitted the respective contents. The information that does not specify users is, for example, without limitation, an icon Ux1 and user name Ux2 for the user A illustrated in the lower-right diagram of FIG. 21, and an icon Uy1 and user name Uy2 for the user B. The icons Ux1 and Uy1 are respectively set in a one-to-one correspondence with the users (in this example, the users A and B) in the first group corresponding to the first Talkroom, but the correspondence with the users is not shown. Also, the user names Ux2 and Uy2 are respectively set in a one-to-one correspondence with the users (in this example, the users A and B) in the first group corresponding to the first Talkroom, but the correspondence with the users is not shown.

In cases where the processor 21 makes a setting not to display the information relating to the user who has transmitted the second content on the display region 28A as described in FIGS. 22 and 23, it is difficult for other user to specify the user when transmitting the information relating to the first content via a terminal 20. For example, without limitation, this information processing method allows users to cite a content of other users, thereby contributing to sharing of information. In cases where the processor 21 makes a setting not to display information relating to users that have their terminal have transmitted the respective contents when displaying the third image on the basis of input to the second image, it is possible to reduce concerns of users in the first Talkroom, that information relating to the users will be known to other users who viewed the third image, thereby improves the users' convenience. In cases where information that does not specify users is displayed instead of the information relating to the users, dispersal of information relating to the users can be suppressed, and the context, etc. of a content included in the third image can be grasped easily.

Tenth Example Embodiment

Figure 24:
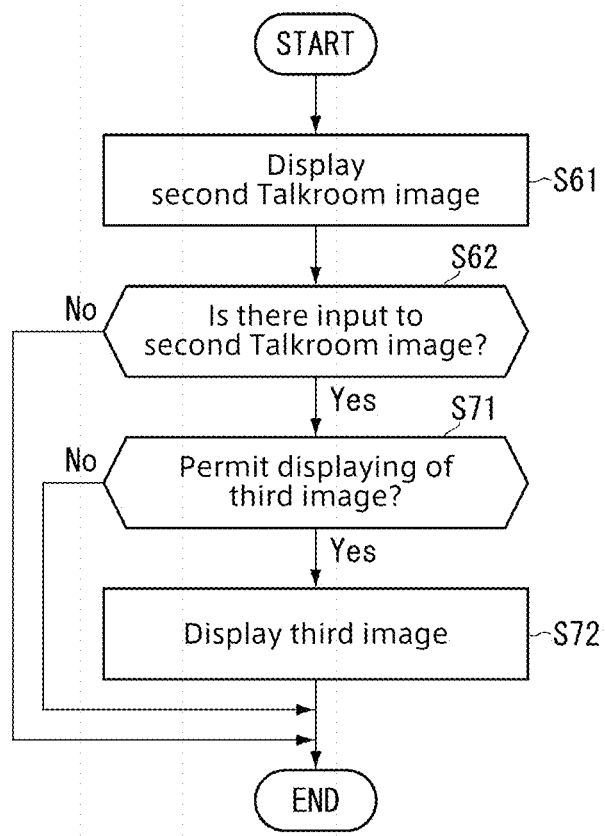
FIG. 24 is a flowchart illustrating an information processing method according to a tenth example embodiment.

FIG. 24 is a flowchart illustrating an information processing method according to a tenth example embodiment. First, an overview of this example embodiment will be described. The present example embodiment is, for example, without limitation, a configuration wherein it is determined whether or not to permit displaying of a first Talkroom image based on input to a second Talkroom image by a user. For example, without limitation, in cases where the user of the subject terminal satisfies a desired (or alternatively, predetermined) condition when a desired (or alternatively, predetermined) input to a second Talkroom image is detected, the terminal 20 displays a first Talkroom image on the display region 28A. The aforementioned desired (or alternatively, predetermined) condition is, for example, without limitation, a condition that the user who has transmitted the second content is equivalent to the user of the subject terminal. For example, without limitation, the third image is displayed on the display region 28A in cases where the user who has transmitted the second content is equivalent to the user of the terminal 20.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

In FIG. 24, the processes of operations S61 and S62 are the same as those in FIG. 19. Therefore, explanation thereon is omitted or simplified. In cases where the processor 21 determines that there is input to the second Talkroom image in step S62 (operation S62: Yes), the terminal 20 determines whether or not to permit displaying of the third image in operation S71. For example, without limitation, the processor 21 determines to permit displaying of the third image (operation S71: Yes) in cases where the user who has transmitted the second content is equivalent to the user of the subject terminal. The processor 21 executes the process of operation S71 on the basis of, for example, without limitation, the content information D3 illustrated in FIG. 3(C). In the example of FIG. 3(C), the second content is a content whose {Content ID} is {tr01c01}, and the {Transmission User ID} thereof is {User A}. In this case, the processor 21 compares the user ID of the user of the subject terminal and {User A} which is the {Transmission User ID} corresponding to the second content, and determines whether or not the two match.

In cases where the processor 21 determines to permit displaying of the third image (operation S71: Yes), the terminal 20 displays the third image in operation S72. In cases where the user who has transmitted the second content and the user of the subject terminal are equivalent, the user is included in the first group corresponding to the first Talkroom, and, for example, without limitation, the terminal 20 stores the content information D3, including a content included in the first Talkroom, in the storage 24. In operation S72, for example, without limitation, the processor 21 generates the third image on the basis of the content information D3 (see FIG. 3(B)) stored in the storage 24. The processor 21 then controls the display 28 to display the generated third image on the display region 28A.

In cases where the processor 21 determines that there is no input to the second Talkroom image in operation S62 (operation S62: No), or in cases where the processor 21 determines not to permit displaying of the third image in operation S71 (operation S71: No), the terminal 20 ends the series of processes relating to the displaying of the third image.

For example, without limitation, the aforementioned terminal 20 displays the third image on the display region 28A in cases where the user who has transmitted the second content is equivalent to the user of the terminal 20. For example, without limitation, this information processing method prevents the third image from being displayed on a terminal 20 of a user who is different from the user who has transmitted the second content, and thus suppresses dispersal of information included in the third image to unintended users. Thus, the user of the terminal 20 can view the first content associated with the second content without worrying about unintended dispersal of information, and thus, the user's convenience is improved.

Eleventh Example Embodiment

Figure 25:
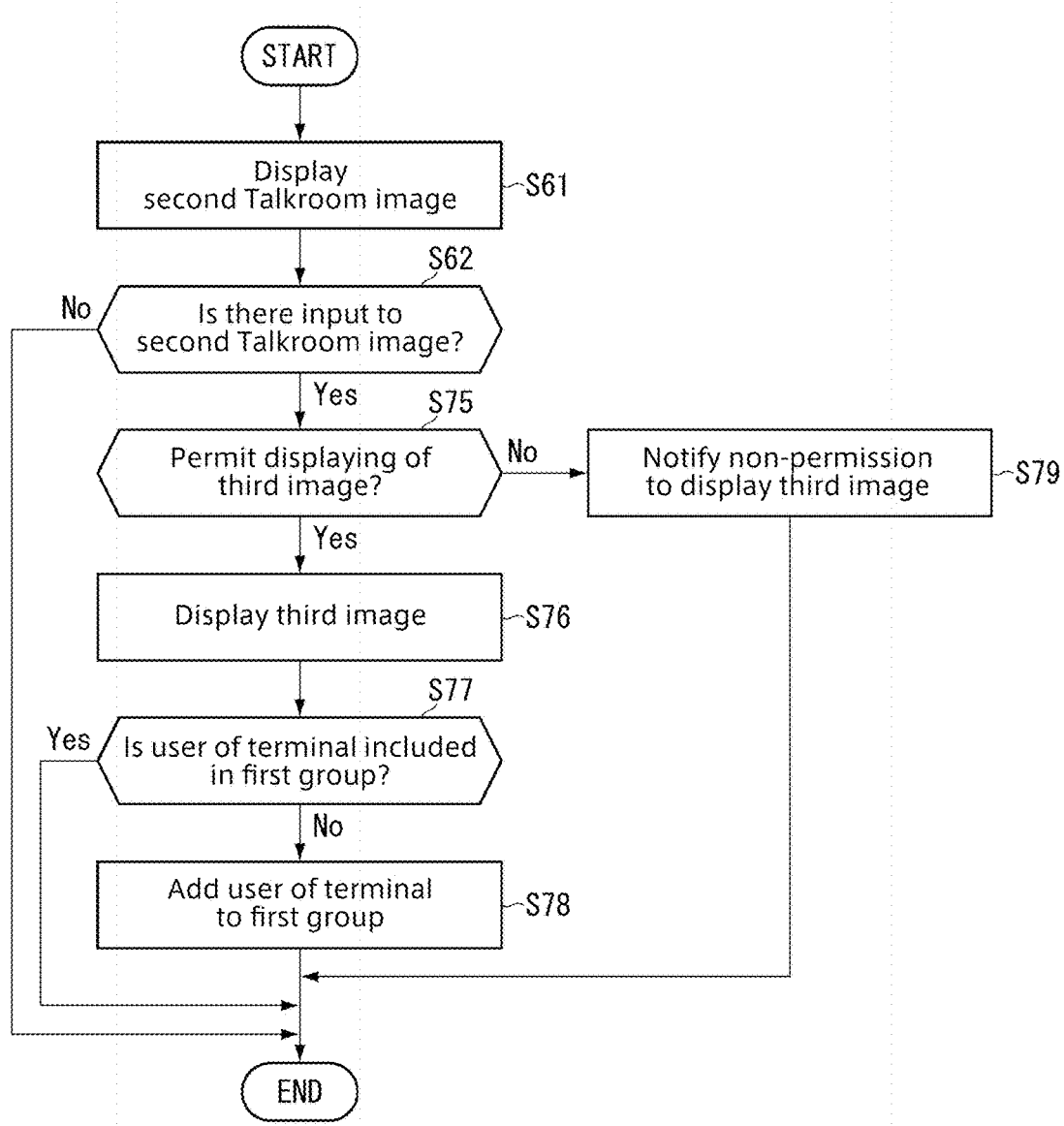
FIG. 25 is a flowchart illustrating an information processing method according to an eleventh example embodiment.

FIG. 25 is a flowchart illustrating an information processing method according to an eleventh example embodiment. First, an overview of this example embodiment will be described. The eleventh embodiment is, for example, without limitation, a configuration wherein, on the basis of input to a second Talkroom image, a first Talkroom image is displayed on a terminal of a user who is not included in a first group. For example, without limitation, in cases where users included in a first group and users included in a second group satisfy a desired (or alternatively, predetermined) condition, the terminal 20 displays a first Talkroom image. For example, without limitation, in cases where the first group includes N3 or more users, different from the user of the subject terminal, from among the users included in the second group, the terminal 20 displays the first Talkroom image. For example, without limitation, the aforementioned N3 is a discretionary value of 1 or greater, and is a value set in advance. For example, without limitation, the first Talkroom image is displayed on the display region 28A in cases where the first group includes one or more users, different from the user of the terminal, from among the users included in the second group.

The present example embodiment is also a configuration wherein, for example, without limitation, in cases of displaying a first Talkroom image on the basis of input to a second Talkroom image by a user who is not included in a first group, such a user is added to the first group. For example, in FIG. 21, user C of the terminal 20C is a user who is not included in the first group corresponding to the first Talkroom but is a user included in the second group corresponding to the second Talkroom. For example, without limitation, in cases where there is a desired (or alternatively, predetermined) input to the second Talkroom image T12, the terminal 20C transmits information requesting the transmission of a content included in the first Talkroom. The information requesting the transmission of a content includes, for example, without limitation, identification information of the first content. In cases where the server 10 receives the information requesting the transmission of a content and, in response thereto, transmits a content included in the first Talkroom, the server 10 adds, for example, without limitation, the user C of the terminal 20C to the first group. The information requesting the transmission of a content may, for example, without limitation, be transmitted to a terminal 20 (e.g., terminal 20A or terminal 20B) included in the first group via the server 10. In this case, the terminal 20 of a user included in the first group may add the user C of the terminal 20C to the first group.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

In FIG. 25, the processes of operations S61 and S62 are the same as those in FIG. 19. Therefore, explanation thereon is omitted or simplified. In cases where the processor 21 determines that there is input to the second Talkroom image in operation S62 (operation S62: Yes), the terminal 20 determines whether or not to permit displaying of the third image in operation S75. For example, without limitation, in cases where the first group includes N2 or more users, different from the user who has transmitted the second content, from among the users included in the second group, the processor 21 determines to permit displaying of the third image. The aforementioned N2 is a value discretionarily set from among integers of 1 or greater.

In this example, it is assumed that users A and B constitute the first group, and the user A is the user who has transmitted the second content. It is also assumed that users A, B, C, and D constitute the second group. In cases where the user of the subject terminal is user C, then users B, C, and D are the users, different from the user who has transmitted the second content, from among the users included in the second group, and among these users, the user B is included in the first group. Thus, the processor 21 of the terminal 20C of the user C determines to permit displaying of the third image.

In cases where the processor 21 determines to permit displaying of the third image (operation S75: Yes), the terminal 20 displays the third image in operation S76. In cases where the user of the subject terminal is included in the first group, for example, without limitation, the processor 21 generates the third image on the basis of the content information D3 stored in the storage 24. The third image is, for example, without limitation, the first Talkroom image including the first content. On the other hand, in cases where the user of the subject terminal is not included in the first group, for example, without limitation, the processor 21 generates the third image on the basis of a content transmitted from the server 10 or from terminals 20 of users included in the first group. The processor 21 controls the display 28 to display the generated third image on the display region 28A.

Further, in operation S77, the processor 21 determines whether or not the user of the subject terminal is included in the first group. In cases where it is determined that the user of the subject terminal is not included in the first group (operation S77: No), the processor 21 adds the user of the subject terminal to the first group in operation S78. At least a portion of the processes of operations S77 and S78 may, for example, without limitation, be included in the process of operation S76. For example, without limitation, in cases where it is determined that the user of the subject terminal is included in the first group, the processor 21 may generate the third image on the basis of the content information D3 stored in the storage 24. On the other hand, for example, without limitation, in cases where it is determined that the user of the subject terminal is not included in the first group, the terminal 20 may receive a content to be included in the third image from the server 10 or from terminals 20 of users included in the first group. In this case, for example, without limitation, the terminal 20 may transmit request information requesting the transmission of a content to be included in the third image, and the server 10 having received the request information, or a terminal 20 of a user included in the first group, may execute a process for adding, to the first group, the user of the terminal 20 that transmitted the request information.

In cases where the processor 21 determines not to permit displaying of the third image in operation S75 (operation S75: No), for example, without limitation, the terminal 20 notifies non-permission to display the third image in operation S79. For example, without limitation, the terminal 20 may display a message such as "Third image cannot be displayed" on the display region 28A, or may output, from the speaker 29, a sound such as an alarm or a voice stating that "Third image cannot be displayed". In some example embodiments, the process of operation S75 may not be included.

In any of the following cases, the terminal 20 ends the series of processes relating to the displaying of the third image based on input to the second image: in cases where the processor 21 determines that there is no input to the second Talkroom image in operation S62 (operation S62: No) in cases where it determines in operation S77 that the user of the subject terminal is included in the first group (operation S77: Yes) after the process of operation S78, or after the process of operation S79.

The aforementioned terminal 20 displays the third image in cases where, for example, without limitation, the first group includes M or more users, different from the user who has transmitted the second content, from among the plurality of users included in the second group. Stated differently, the terminal 20 displays the third image in cases where there are overlapping users, other than the user who has transmitted the second content, between the first group and the second group. Thus, the terminal 20 can, for example, without limitation, display the third image including the first content, which is transmitted and received among terminals corresponding to the first group relating to the second group. It is thus possible, for example, to share information while inhibiting unintended dispersal of information.

Further, the user of the terminal 20 is registered into the first group in cases where the user of the terminal 20 is not included in the first group but the third image is to be displayed on the basis of input to the second content by the user of the terminal 20. This information processing method contributes to the inhibition of unintended dissemination of information, because the user of the terminal 20 displaying the third image will be included in the first group in which the first content has been transmitted and received. For example, without limitation, the terminal 20 of the user that is not included in the first group may display the third image after the user of the subject terminal is added to the first group. In some example embodiments, the user not included in the first group may be added to the first group after the terminal 20 of the user is displayed the third image.

The aforementioned whether-or-not-to-permit-displaying determination process of determining whether or not to permit displaying of the third image is, for example, without limitation, executed in operation S75 on the basis of users included in the first group and users included in the second group, but the process is not limited to this example. The processor 21 may, for example, without limitation, execute the whether-or-not-to-permit-displaying determination process on the basis of the types of Talkrooms described in FIG. 17. For example, without limitation, the processor 21 may determine to permit displaying of the third image including the first content in cases where the type of the first Talkroom, including the first content, is {Public}. This whether-or-not-to-permit-displaying determination process may be executed instead of the process of operation S75, may be executed separately from the process of operation S75, or may not be included.

In cases where displaying of the third image is not permitted, the terminal 20 may, for example, without limitation, change the form of the first content included in the second image. FIG. 26 is a diagram illustrating processes relating to the displaying of a second image in cases where the displaying of a third image is not permitted.

In the upper diagram of FIG. 26, the second Talkroom image T12 includes first information Q5 on the first content. The first information Q5 has a smaller amount of information compared to the first content Q1 illustrated in the lower-right diagram of FIG. 21. The first information Q5 is, for example, without limitation, information based on the information relating to the first content. The first information Q5 may be, for example, without limitation, information made by shortening the first content Q1, information made by compressing the first content Q1, or information made by omitting a portion of the first content Q1. In cases where displaying of the third image (for example, the first Talkroom image T11) based on input by the user of the subject terminal with respect to the second Talkroom image T12 is not permitted, the terminal 20 displays, for example, without limitation, a second Talkroom image T12 including second information Q6, as illustrated in the lower diagram of FIG.

26. The second information Q6 is information having a larger amount of information relating to the first content than the first information. The second information Q6 is, for example, without limitation, information based on the information relating to the first content. The second information Q6 is, for example, without limitation, identical to the first content Q1.

In cases where the terminal 20 displays the second image including first information Q5 having a smaller amount of information compared to the first content Q1 as described above, it is possible, for example, without limitation, to display information relating to the first content Q1 in a compact manner. Thus, for example, without limitation, the number of contents displayed on the display region 28A at once by the terminal 20 can be increased, and thus, the amount of information provided to the user can be increased.

Further, for example, without limitation, in cases where displaying of the third image (for example, the first Talkroom image T11) based on input by the user of the subject terminal with respect to the second Talkroom image T12 is not permitted, the terminal 20 displays a second Talkroom image T12 including second information Q6 having a larger amount of information relating to the first content than the first information Q5. This information processing method contributes to the inhibition of unintended dispersal of a content other than the first content among the contents included in the first Talkroom, and it can also be convenient for a user, to which displaying of the third image is not permitted, by providing more information relating to the first content.

Twelfth Example Embodiment

Figure 27:
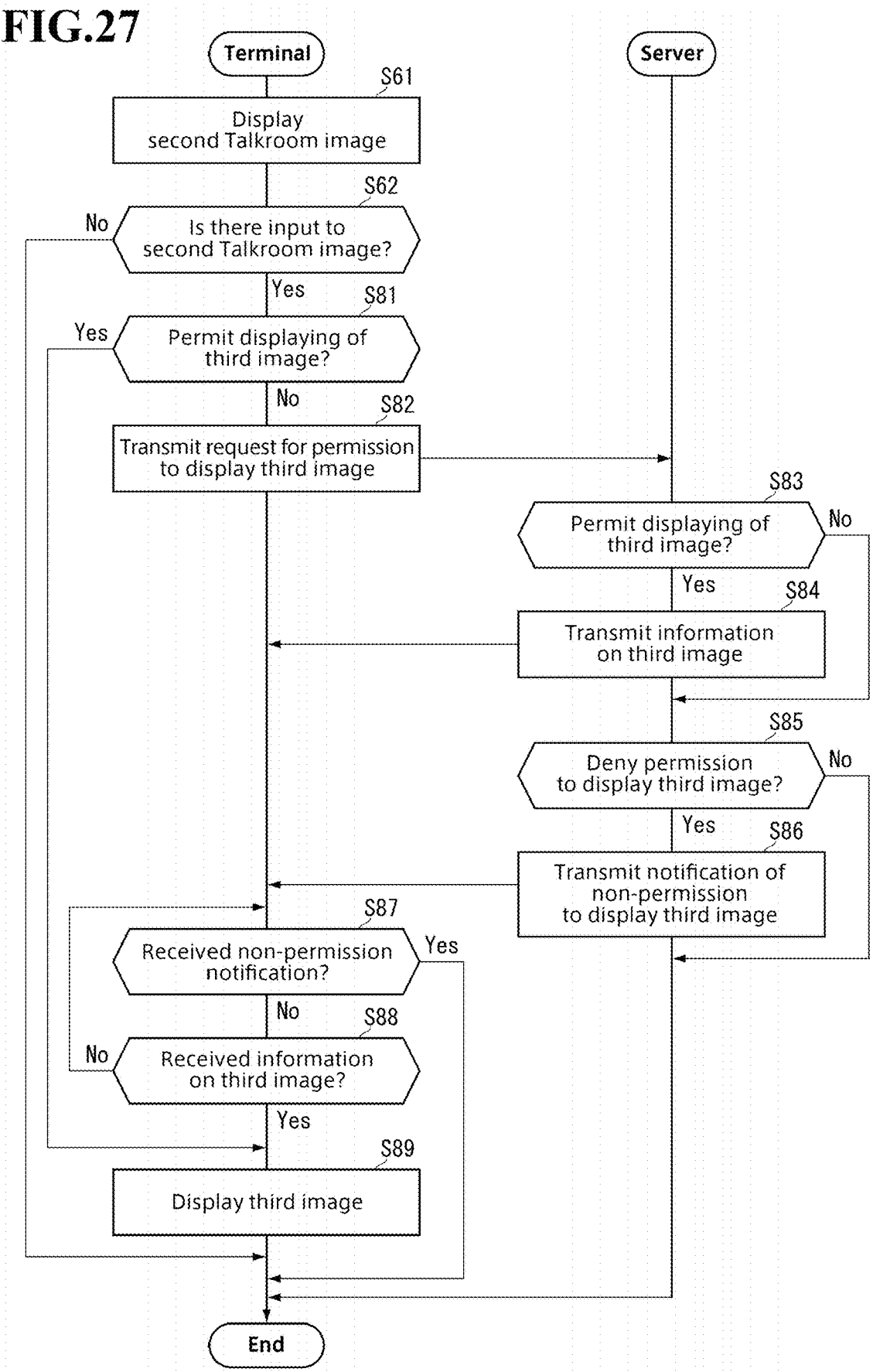
FIG. 27 is a flowchart illustrating an information processing method according to a twelfth example embodiment.

FIG. 27 is a flowchart illustrating an information processing method according to a twelfth example embodiment. First, an overview of this example embodiment will be described. The present example embodiment is different from the foregoing embodiment where a terminal 20 transmits information requesting permission to display the first Talkroom image. In the following description, information requesting permission to display the first Talkroom image is referred to as a display permission request, and the terminal 20 transmitting the display permission request is referred to as a third terminal, as appropriate. For example, without limitation, in cases where the server 10 receives a display permission request transmitted from a third terminal, the server 10 transmits, in response to the display permission request, information based on a determination result regarding determination as to whether or not the third terminal is permitted to display the first Talkroom image. For example, without limitation, in cases where displaying of the first Talkroom image is permitted, the aforementioned information based on the determination result may include a content to be included in the first Talkroom image. In cases where the aforementioned information based on the determination result is received, the third terminal displays, on the display region 28A of the subject terminal, the first Talkroom image on the basis of this information.

Also, the present example embodiment is, for example, without limitation, a mode wherein whether or not to permit displaying of the first Talkroom image on the basis of input to the second Talkroom image is determined according to a plurality of conditions. The terminal 20 determines whether or not to permit displaying of the first Talkroom image on the display region 28A of the subject terminal. For example, without limitation, the terminal 20 displays the first Talkroom image in cases where the subject terminal determines to permit displaying of the first Talkroom image, whereas the terminal 20 transmits a display permission request in cases where the subject terminal determines not to permit displaying of the first Talkroom. For example, without limitation, a device other than the third terminal that received the display permission request (for example, the server 10 or the terminal 20 that transmitted the second content) determines whether or not to permit the third terminal to display the first Talkroom image. On the basis of a response to the display permission request, the third terminal displays the first Talkroom image.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

In FIG. 27, the processes of operations S61 and S62 are the same as those in FIG. 19. Therefore, explanation thereon is omitted or simplified. In cases where the processor 21 determines that there is input to the second Talkroom image in operation S62 (operation S62: Yes), the terminal 20 determines whether or not to permit displaying of the third image in operation S81. For example, without limitation, the processor 21 determines to permit displaying of the third image (operation S81: Yes) in cases where the user who has transmitted the second content is equivalent to the user of the subject terminal. In cases where it is determined not to permit displaying of the third image (operation S81: No), the terminal 20 transmits a request for permission to display the third image.

The server 10, in cases of receiving the permission request transmitted by the terminal 20, determines whether or not to permit displaying of the third image in operation S83. For example, without limitation, in cases where the first group includes M or more users, different from the user who has transmitted the second content, from among the users included in the second group, the server 10 determines to permit displaying of the third image. In cases where it is determined to permit displaying of the third image (operation S83: Yes), the server 10 transmits information relating to the third image in operation S84. The information relating to the third image is, for example, without limitation, a content permitted to be included in the third image. For example, without limitation, the server 10 transmits the information relating to the third image as a notification to permit displaying of the third image.

In cases where it is determined not to permit displaying of the third image (operation S83: No), the server 10 determines whether or not to deny permission to display (which means, for example, without limitation, to prohibit to display) the third image in operation S85. The server 10 determines to deny permission to display the third image in cases where it is determined not to permit displaying of the third image in operation S83. In cases where it is determined to deny permission to display the third image (operation S85: Yes), the server 10 transmits, in operation S86, a non-permission notification indicating that displaying of the third image is not permitted.

The processes of operations S83 to S86 may, for example, without limitation, be executed by the terminal 20 which is permitted to display the first Talkroom image, or by the terminal 20 and the server 10. The aforementioned terminal 20 which is permitted to display the first Talkroom image is, for example, without limitation, one or more of terminals 20 of users included in the first group corresponding to the first Talkroom.

In operation S87, the processor 21 of the terminal 20 determines whether or not a non-permission notification has been received. In cases where it is determined that a non-permission notification has not been received (operation S87: No), the processor 21 determines, in operation S88, whether or not the information relating to the third image has been received. In cases where it is determined that the information relating to the third image has not been received (operation S88: No), the processor 21 returns to operation S87 and repeats the process.

In cases where the processor 21 determines to permit displaying of the third image in operation S81 (operation S81: Yes), or in cases where the processor 21 determines that the information relating to the third image has been received in operation S88 (operation S88: Yes), the terminal 20 displays the third image in operation S89. For example, without limitation, in cases where the processor 21 determines to permit displaying of the third image in operation S81 (operation S81: Yes), the terminal 20 displays the third image on the basis of content information stored in the storage 24. In some example embodiments, the terminal 20 displays the third image on the display region 28A on the basis of receipt, by the communication unit (for example, without limitation, the communication I/F 22), of a response to the request for permission. For example, without limitation, in cases where the processor 21 determines that the information relating to the third image has been received (operation S88: Yes), the third image is displayed on the basis of the received information relating to the third image.

example, without limitation, in cases where it is determined that a non-permission notification has been received in operation S87, the terminal 20 displays, on the display region 28A, information relating to whether or not to permit displaying of the third image. For example, without limitation, in cases where it is determined that a non-permission notification has been received, the terminal 20 displays a message such as "Third image cannot be displayed" on the display region 28A. In some example embodiments, in cases where it is determined that a non-permission notification has been received, the terminal 20 may, for example, without limitation, output an alarm sound or a voice stating that "Third image cannot be displayed" from the speaker 29.

For example, without limitation, the aforementioned information processing method involves determining, according to a plurality of conditions, whether or not to permit displaying of the first Talkroom image on the basis of input to the second Talkroom image. This information processing method can, for example, without limitation, minutely set conditions for permitting transmission of the information relating to the first content, and thus, it is possible to share information among a plurality of users while preventing unintended leakage of information. For example, without limitation, in cases where the content Q8 based on the first content as illustrated in the lower-left diagram of FIG. 21 is selected, the terminal 20 permits displaying of the first Talkroom image T11 and displays the first Talkroom image T11 in cases where the user of the terminal 20 that transmitted the second content Q4 associated with the first content is equivalent to the user of the subject terminal. In this case, the user can view the first Talkroom image T11 promptly, thereby excellent user convenience is provided. On the other hand, in cases where the user of the terminal 20 that transmitted the second content Q4 associated with the first content is different from the user of the subject terminal, the terminal 20 displays the first Talkroom image on the basis of a response to a request for permission to display the first Talkroom image. This information processing method provides, for example, without limitation, a possibility of displaying the first Talkroom image at a terminal 20 whose user is different from the user of the terminal 20 that transmitted the second content Q4, and thus, the user's convenience is improved.

Further, for example, without limitation, the terminal 20 transmits, via the communication unit of the terminal 20, a request for permission to display the third image, and displays, on the display region 28A, the third image on the basis of receipt, via the communication unit, of a response to the request for permission. This information processing method can, for example, without limitation, reduce the processing load of the terminal 20, because the terminal 20 does not need to determine whether or not to permit displaying of the third image. Further, with this information processing method, for example, without limitation, even when the terminal 20 does not have enough information necessary for determining whether or not to permit displaying of the first Talkroom image, the terminal 20 can display the first Talkroom image in accordance with a response to a display permission request. This increases the possibility that the terminal 20 is able to display the first Talkroom image, thus the user's convenience is improved. Further, according to this information processing method, for example, without limitation, whether or not to permit displaying of the third image is determined in a device (for example, without limitation, the server 10) being external to the terminal 20 that is to display the third image. Thus, it is possible to inhibit unauthorized viewing of the first Talkroom.

It should be noted that, for example, without limitation, the terminal 20 may not determine whether or not to permit displaying of the first Talkroom image on the display region 28A of the subject terminal. In FIG. 27, for example, without limitation, the terminal 20 determines whether or not to display the third image in operation S81, but this process may not be performed. For example, without limitation, the terminal 20 may transmit a display permission request in operation S82, without performing the process of operation S81. In this case, the server 10, for example, without limitation, may execute determination corresponding to operation S81. The server 10 may, for example, without limitation, determine whether or not the user of the terminal 20 that transmitted the display permission request is equivalent to the user of the terminal 20 that transmitted the second content. For example, without limitation, this determination may be at least a portion of the process of operation S83, or may be a process executed separately from operation S83.

Figure 28A:
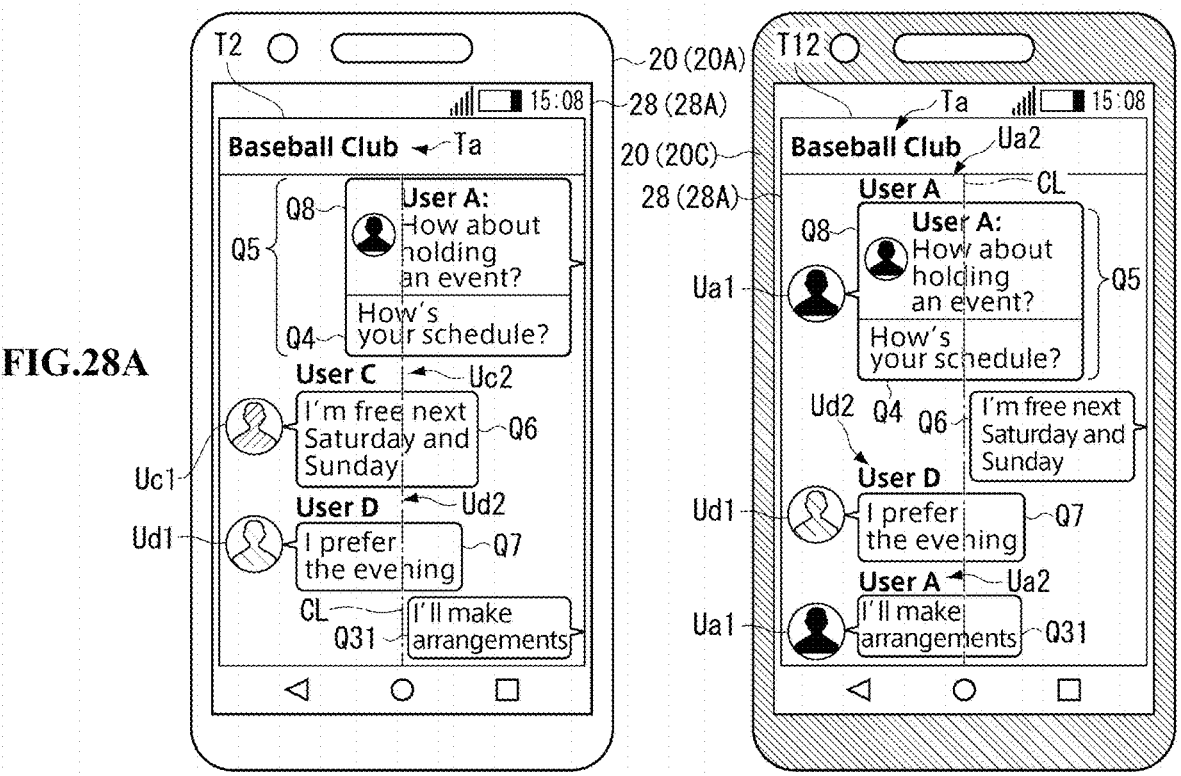
FIGS. 28A and 28B are diagrams illustrating processes relating to the displaying of a second image including a content for which displaying of a third image is permitted and processes relating to the displaying of a second image including a content for which displaying of a third image is not permitted.
Figure 28B:
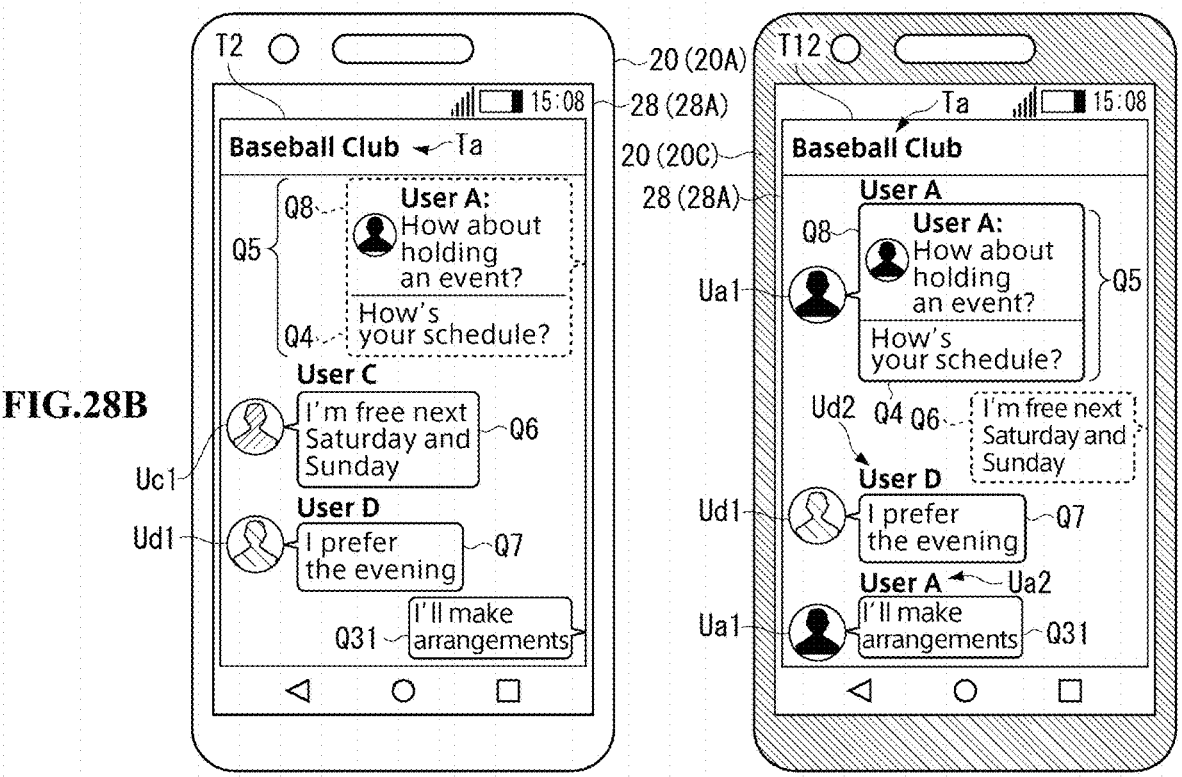

FIGS. 28A and 28B are diagrams respectively illustrating processes relating to the displaying of a second image including a content for which displaying of a third image is permitted and processes relating to the displaying of a second image including a content for which displaying of a third image is not permitted. In this example, it is considered that displaying of a third image is permitted on the basis of input to a second image including a second content in cases where the user who has transmitted the second content is equivalent to the user of the subject terminal.

The left diagram of FIG. 28A is a diagram illustrating a second Talkroom image T2 displayed on a terminal 20A. In the second Talkroom image T2, the second content Q4 is a content inputted by user A to be transmitted, and is a content for which it is permitted to display a third image on the display region 28A of the terminal 20A. The reference sign Q31 is a content inputted via the terminal 20A. The content Q31 is not associated with any other contents, and is different from the second content Q4.

The content Q31 inputted via the terminal 20A and the second content Q4 for which displaying of a third image is permitted are displayed on the display region 28A so as to line up the content Q31 and the content Q4 in a first direction with respect to the second Talkroom image T2, which is the second image. For example, without limitation, the first direction is the longitudinal direction of the second Talkroom image T2, and a second direction intersecting with the first direction is the lateral direction of the second Talkroom image T2. For example, without limitation, as regards the content Q31 and the second content Q4, the positions of one end thereof (the right end in FIG. 28) in the second direction (the lateral direction in FIG. 28A) of the second Talkroom image T2 are substantially the same. For example, without limitation, the position of the aforementioned one end of the content Q31 and that of the second content Q4 in the second direction (the lateral direction in FIG. 28A), are both set on one side (on the right side in FIGS. 28A and 28B) with respect to the center line CL of the second Talkroom image T2.

The right diagram of FIG. 28A is a diagram illustrating a second Talkroom image T12 displayed on a terminal 20C. In the second Talkroom image T12, the second content Q4 is a content for which it is not permitted to display a third image, because the user A who has transmitted the second content is different from the user C that is the user of the subject terminal. Content Q6 is a content inputted via the terminal 20C. For example, without limitation, the position of one end, in the second direction (the lateral direction in FIG. 28A), of the content Q6 inputted via the subject terminal is set on one side (on the right side in FIG. 28A) with respect to the center line CL of the second Talkroom image T12. For example, without limitation, as regards the contents Q7 and Q31 and the second content Q4, which were transmitted by object terminals, the positions of one end thereof (the left end in FIG. 28A) in the second direction (the lateral direction in FIG. 28A) of the second Talkroom image T12 are substantially the same. For example, without limitation, the position of one end, in the second direction (the lateral direction in FIG. 28A), of each of the contents Q7 and Q31 and the second content Q4, which were transmitted by object terminals, is set on the opposite side (on the left side in FIG. 28A) from the content Q6 inputted via the subject terminal, with respect to the center line CL of the second Talkroom image T12.

In FIG. 28B, the reference signs are the same as those in FIG. 28A. In the second Talkroom image T2 displayed on the terminal 20A, the second content Q4 for which displaying of a third image is permitted is displayed in a manner different from the second content Q4 for which displaying of a third image is not permitted in the second Talkroom image T12 that is displayed on the terminal 20C. For example, without limitation, each content is displayed as an item wherein the content body is placed within a frame (for example, a frame in the shape of a speech balloon). The second content Q4 for which displaying of a third image is permitted is displayed, for example, without limitation, in a manner such that the color and/or brightness of its frame are/is different from the contents Q6 and Q7 transmitted from object terminals. For example, without limitation, the second content Q4 has a first color (e.g., green) within its frame, whereas the contents Q6 and Q7 have a second color (e.g., white) different from the first color within their frames. For example, without limitation, the second content Q4 for which displaying of a third image is permitted may be displayed according to the same display form as the content Q31 inputted via the subject terminal, or may be displayed according to a different display form from the content Q31 which has been inputted via the subject terminal but is different from the second content.

In the second Talkroom image T12 displayed on the terminal 20C, the second content Q4 for which displaying of a third image is not permitted is displayed in a manner different from the content Q6 inputted via the subject terminal. For example, without limitation, each content is displayed as an item wherein the content body is placed inside a frame (for example, a frame in the shape of a speech balloon). The second content Q4 for which displaying of a third image is not permitted is displayed, for example, without limitation, in a manner such that the color and/or brightness of its frame are/is different from the content Q6 inputted via the subject terminal. For example, without limitation, the content Q6 has a first color (e.g., green) inside its frame, whereas the second content Q4 has a second color (e.g., white) different from the first color inside its frame. For example, without limitation, the second content Q4 for which displaying of a third image is not permitted may be displayed according to the same display format as the contents Q7 and Q31 transmitted from object terminals or may be displayed according to a different display format from the content Q6 which has been inputted via the subject terminal but is different from the second content.

For example, without limitation, a content inputted via the subject terminal and the second content for which displaying of a third image is permitted are displayed by the terminal 20 on the display region 28A so as to line up the inputted content and the second content in the first direction with respect to the second Talkroom image. With this information processing method, a content that is in a similar positional relationship with a content inputted via the subject terminal within the second Talkroom image can be visually recognized by the user as a second content for which displaying of a third image is permitted. Thus, the information processing method reduces the time and trouble for a user to judge whether or not a third image can be displayed, thus contributing to improvement of the user's convenience.

As illustrated in FIG. 28A, in cases where the position, in the second direction of the second image, of the second content for which displaying of a third image is permitted is different from the position of a content for which displaying of a third image is not permitted, a user can visually grasp whether or not displaying of a third image is permitted. Further, as illustrated in FIG. 28B, in cases where the display form, in the second image, of the second content for which displaying of a third image is permitted is different from the display form of a content for which displaying of a third image is not permitted, a user can visually grasp whether or not displaying of a third image is permitted. This information processing method can prevent a user from inputting a request to display a third image with respect to a content for which displaying of a third image is not permitted. Thus, this information processing method contributes, for example, to improvement in the user's convenience and reduction in the load on the terminal.

Thirteenth Example Embodiment

FIG. 29 is a diagram illustrating an information processing method according to a thirteenth example embodiment. First, an overview of this example embodiment will be described. The present example embodiment is, for example, without limitation, a configuration wherein, after a first Talkroom image is displayed on the basis of input to a second Talkroom image, the second Talkroom image is displayed on the basis of input to the first Talkroom image. For example, without limitation, in cases where there is input to the content Q8 based on a first content as illustrated in the upper-left diagram of FIG. 29, the terminal 20 displays a first Talkroom image T1 including the first content Q1 as illustrated in the upper-right diagram. For example, without limitation, in cases where there is input to the first content Q1 in the first Talkroom image T1 that has been displayed on the basis of input to the second Talkroom image T2 as illustrated in the lower-left diagram, the terminal 20 displays the second Talkroom image T2 as illustrated in the lower-right diagram.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

In the upper-left diagram of FIG. 29, for example, without limitation, the terminal 20 displays a second Talkroom image T2, as a second image, on the display region 28A. Then, for example, without limitation, on the basis of input to the second Talkroom image T2, the terminal 20 displays a first Talkroom image T1, as a third image, on the display region 28A, as illustrated in the upper-right diagram. After the first Talkroom image T1 is displayed on the display region 28A on the basis of input to the second Talkroom image T2 by the user of the terminal 20, the terminal 20 displays the second Talkroom image T2 on the display region 28A on the basis of input to the terminal by the user of the terminal 20. For example, without limitation, the second image is displayed on the display region 28A on the basis of input via the input device 25 of the terminal 20 with respect to the first content in the third image. For example, without limitation, in cases where the display region 28A is a display region of a touch panel and the input device 25 is an operation unit of the touch panel, the terminal 20 displays the second Talkroom image T2, as illustrated in the lower-right diagram, in cases where it is detected that the first content Q1 in the first Talkroom image T1 has been tapped, as illustrated in the lower-left diagram.

For example, without limitation, when switching the image to be displayed on the display region 28A, the processor 21 of the terminal 20 stores, in the storage 24, history information relating to the history of images displayed on the display region 28A. For example, without limitation, when the image displayed on the display region 28A is to be switched from the second Talkroom image T2 to the first Talkroom image T1, the processor 21 stores, in the storage 24, information relating to a content included in the previously-displayed second Talkroom image T2. Further, for example, without limitation, when the image displayed on the display region 28A is to be switched from the first Talkroom image T1 to the second Talkroom image T2, the terminal 20 references the history information and reproduces the previously-displayed second Talkroom image T2, and displays the reproduced second Talkroom image T2 on the display region 28A. For example, without limitation, in cases where there is input to the third image to request displaying of the second image, the terminal 20 displays the second image without delivering the Talkroom list image TL as illustrated in the upper-left diagram of FIG. 2.

In the aforementioned terminal 20, after the third image (for example, without limitation, the first Talkroom image) is displayed on the display region 28A on the basis of input by the user of the subject terminal with respect to the second content, the second Talkroom image is displayed on the display region 28A on the basis of input to the subject terminal by the user of the subject terminal. According to this information processing method, for example, without limitation, after a third image is displayed after a second image is displayed on the display region 28A of the terminal 20, the user can display the second image easily. For example, without limitation, in cases where a user who views the second content Q4 included in the second Talkroom image T2, to know the background history of the second content, the user can make the terminal 20 display the first Talkroom image T1 and can check the first content Q1 or contents before/after the first content, and can then easily return the display at the terminal 20 back to the second Talkroom image T2. This information processing method contributes to improvement in the user's convenience. Further, for example, without limitation, this terminal 20 can reduce user operations at the time of switching the display from the third image to the second image, which thereby reduces the load on the terminal 20.

Further, for example, without limitation, the terminal 20 displays the second Talkroom image on the display region 28A on the basis of input to the first content in the third image by the input unit 23A of the subject terminal. In this information processing method, for example, without limitation, the first content is a content associated with the second content, and the user can display the second Talkroom image according to an input to such a first content. Thus, the inputting method for displaying the third image is easy to understand, and the user's convenience is improved. Further, for example, without limitation, this information processing method can reduce entry mistakes to the terminal 20 at the time of displaying the third image, and thereby reduce the load on the terminal 20.

In the example of FIG. 29 of the information processing method according to the present example embodiment, after the first Talkroom image T1 is displayed on the basis of input to the second Talkroom image T2, the second image T2 is displayed on the basis of input to the first Talkroom image T1. Methods according to the present inventive concepts, however, are not limited to this example. The terminal 20 may, for example, without limitation, display the second Talkroom image T2 on the display region 28A on the basis of input to a first Talkroom image T1 displayed on the basis of input to a Talkroom list image TL. In cases where, for example, without limitation, the first Talkroom image T1 includes information Th ({Cited} in FIG. 8(B)) indicating that information relating to the first content Q1 has been transmitted as illustrated in FIG. 8(B), the user can recognize that the first content Q1 has been cited. The terminal 20 may, for example, without limitation, display the second Talkroom image T2, as illustrated in the lower-right diagram of FIG. 29, on the basis of input to the first content Q1, or the information Th, included in the first Talkroom image T1.

The terminal 20 may display, on the display region 28A, a list indicating the history of images displayed on the display region 28A, and may display, on the display region 28A, the image selected by the user from the list. The terminal 20 may, for example, without limitation, display a list wherein the names of Talkrooms, which correspond to Talkroom images displayed on the display region 28A, are lined up in the order the contents were displayed. For example, without limitation, by selecting, from the list, the name of the Talkroom corresponding to the Talkroom image that was displayed before the previous image (i.e., two images ago), the user can re-display, on the display region 28A of the terminal 20, the Talkroom image that was displayed on the terminal 20 two images ago.

When the second image is displayed on the basis of a desired (or alternatively, predetermined) input to the third image, the manner for making the desired (or alternatively, predetermined) input is not limited to the example illustrated in FIG. 29. For example, without limitation, the terminal 20 may display a third image including an icon such as {Back}, and may display the second image in cases where tapping of the icon is detected. The desired (or alternatively, predetermined) input may be input other than tapping, and may be, for example, without limitation, input via a mouse operation as the input device 25, input of audio using the microphone 26, input of an image captured by the camera 27, or input via other input devices.

Fourteenth Embodiment

Figure 30:
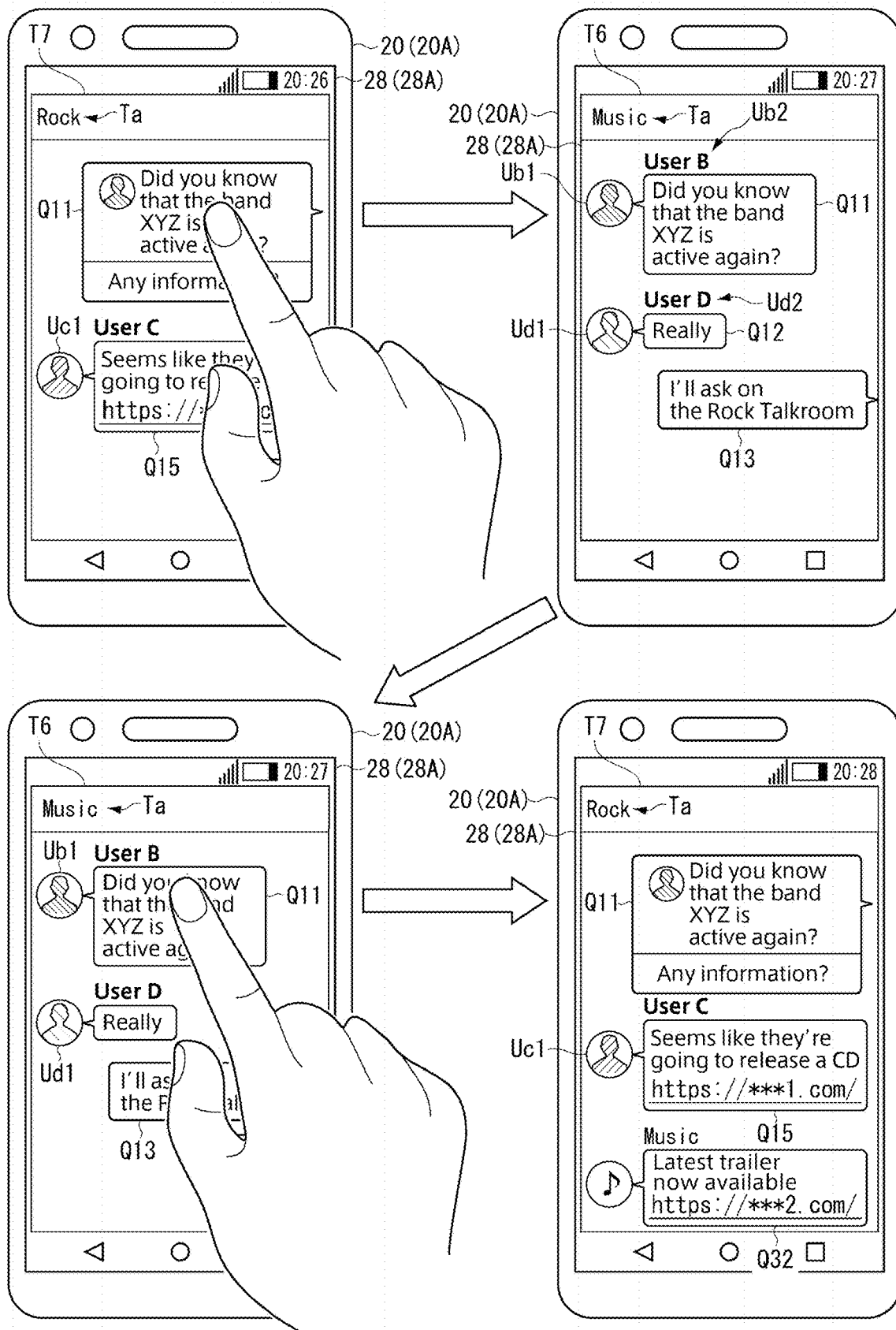
FIG. 30 is a diagram illustrating an information processing method according to a fourteenth example embodiment.

FIG. 30 is a diagram illustrating an information processing method according to a fourteenth example embodiment. First, an overview of this example embodiment will be described. The present example embodiment is, for example, without limitation, a configuration wherein information relating to a Talkroom is displayed on the display region 28A in cases where an image of a first Talkroom is displayed on the basis of input to an image of a second Talkroom. For example, without limitation, in cases where a first Talkroom image T6 is displayed on the basis of input to a second Talkroom image T7, a terminal 20 displays a second Talkroom image T7 including, for example, an advertisement relating to the first Talkroom. For example, without limitation, in cases where the server 10 detects that a terminal 20 has displayed a first Talkroom image T6 on the basis of input to a second Talkroom image T7, the server 10 generates a content Q32 relating to the first Talkroom. For example, without limitation, the server 10 transmits the generated content Q32 to the respective terminals 20 of users in the second group.

Next, the present example embodiment will be described in further detail. The description on the present example embodiment is applicable to the other example embodiments as appropriate. In this example embodiment, features similar to those in the foregoing embodiments are accompanied by the same reference signs and explanation thereon is omitted or simplified, as appropriate.

In the upper-left diagram of FIG. 30, the terminal 20 displays, on the display region 28A, a second Talkroom image T7 as a second image. On the basis of input to the second Talkroom image T7, the terminal 20 displays, on the display region 28A, a first Talkroom image T6 as a third image, as illustrated in the upper-right diagram. After the first Talkroom image T6 is displayed on the display region 28A on the basis of input to the second Talkroom image T7 by the user of the terminal 20, the terminal 20 displays the second Talkroom image T7 on the display region 28A, as illustrated in the lower-right diagram, on the basis of input to the terminal by the user of the terminal 20, as illustrated in the lower-left diagram.

The terminal 20 first displays, on the display region 28A, the first Talkroom image T6 on the basis of input to the second Talkroom image T7 by the user of the terminal 20, then displays the second Talkroom image T7 on the display region 28A on the basis of input to the terminal by the user of the terminal 20, and then the terminal 20 displays the second Talkroom image T7 including information relating to the first group corresponding to the first Talkroom. In the lower-right diagram, the reference sign Q32 indicates a content including information relating to the first group. In this example, the Talkroom corresponding to the first group is the Talkroom named {Music}. For example, without limitation, the content Q32 includes, as information relating to the {Music} Talkroom, information in line with the theme of the {Music} Talkroom. For example, without limitation, the content Q32 is a content generated and transmitted by the server 10.

For example, without limitation, the aforementioned terminal 20 displays, on the display region 28A, a second image including information relating to the first group in cases where the second image is displayed again on the basis of input to the third image. In cases where the second image is displayed again on the basis of input to the third image, for example, without limitation, a topic being discussed in the second group may be related to the first group, and thus, the terminal 20 can provide, to users included in the second group, information relating to the first group as information relating to the topic being discussed in the second group. Thus, the users included in the second group are, for example, relieved of the time and trouble to search the Internet for information derived from the information relating to the first content, and thus, the users' convenience is improved. Further, the terminals 20 are, for example, relieved of processes required for the users to search the Internet for information derived from the information relating to the first content.

The technical scope of the present disclosure is not limited to the configurations described in the foregoing example embodiments. One or more elements described in the foregoing example embodiments may be omitted. The elements described in the foregoing example embodiments may be employed in combination as appropriate. To the extent permitted by laws and regulations in the country/region in which the technique according to the present disclosure is to be implemented, the entire disclosure of all documents cited in the foregoing example embodiments and elsewhere is incorporated herein by reference.

What is claimed is:

1. An information processing method to be carried out by a terminal of a user, the user being different from a first user and a second user, the user being included in a first talk room to which the first user and the second user belong, the information processing method comprising:
　　displaying the first talk room including a first content in a display of the terminal;
　　based on an input of the user with respect to the first content displayed in the first talk room, displaying a first region and a second region in the first talk room, the first region configured to allow the user to input a content, the second region configured to display a specific portion of the first content, the second region being different from the first region;
　　based on an input of a second content by the user to the first region of the first talk room and a selection input of a second talk room by the user, transmitting the second content and a third content including the specific portion of the first content to the second talk room, and displaying the second talk room including the second content and the third content; and
　　based on an input of the user with respect to the third content displayed in the second talk room, controlling, by a controller of the terminal, the display to display the first talk room including the first content and not including the second content.

2. The method of claim 1, wherein the first content is transmitted by a first terminal of the first user.

3. The method of claim 2, further comprising:
causing the terminal of the user to display the second talk room including the second content based on the input by the user to the first region, the second content being associated with the third content and a user name of the first user.

4. The method of claim 1, further comprising:
causing the terminal to display the first content and a group name indicating the first talk room in the display.

5. The method of claim 1, wherein the third content is same as the first content.

6. The method of claim 1, wherein at least a piece of information included in the first content is omitted in the third content.

7. The method of claim 6, wherein the second content is displayed below the third content in the display.

8. The method of claim 1, wherein the third content and the second content are displayed as a fourth content, which is a pair of the third content and the second content, in the display.

9. The method of claim 1, wherein the first content, the second content, and the third content are transmitted via a server.

10. A non-transitory computer readable medium storing a computer program for execution by a controller of a terminal of a user that, when executed by the controller, causes the terminal to perform an information processing method, the user being included in a first talk room to which a first user and a second user belong, the user being different from the first user and the second user, the information processing method comprising:
displaying the first talk room including a first content in a display of the terminal;
based on an input of the user with respect to the first content displayed in the first talk room, displaying a first region and a second region in the first talk room, the first region configured to allow the user to input a content, the second region configured to display a specified portion of the first content, the second region being different from the first region;
displaying a second talk room different from the first talk room in the display based on an input of a second content by the user to the first region of the first talk room and a selection input of the second talk room by the user, the second talk room including the second content and a third content, the third content including the specified portion of the first content; and
based on an input made by the user with respect to the third content displayed in the second talk room and, controlling, by the controller of the terminal, the display to display the first talk room including the first content and not including the second content.

11. A terminal of a user, the user included in a first talk room to which a first user and a second user belong, the user being different from the first user and the second user, the terminal comprising:
a display; and
a controller,
wherein the controller is configured to cause the display to,
display the first talk room including a first content,
based on an input of the user with respect to the first content displayed in the first talk room, display a first region and a second region in the first talk room, the first region configured to allow the user to input a content, the second region configured to display a specific portion of the first content and to not allow the user to input a content, the second region being different from the first region,
display a second talk room different from the first talk room based on an input of a second content by the user to the first region of the first talk room and a selection input of the second talk room by the user, the second talk room including the second content and a third content, the third content including the specific portion of the first content, and
display the first talk room including the first content and not including the second content, based on an input of the user with respect to the third content.

* * * * *